United States Patent
Matsumoto

(10) Patent No.: US 7,710,921 B2
(45) Date of Patent: May 4, 2010

(54) TRANSMITTED PACKET REPLENISHMENT SYSTEM AND TRANSMITTED PACKET REPLENISHING METHOD

(75) Inventor: Yuji Matsumoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1018 days.

(21) Appl. No.: 10/981,031

(22) Filed: Nov. 4, 2004

(65) Prior Publication Data

US 2005/0213540 A1 Sep. 29, 2005

(30) Foreign Application Priority Data

Mar. 26, 2004 (JP) ............................. 2004-093809

(51) Int. Cl.
*H04H 1/00* (2006.01)
(52) U.S. Cl. ...................... 370/331; 370/238; 370/248; 370/338
(58) Field of Classification Search ................ 370/331, 370/338, 349, 252, 395.52, 231, 238, 248; 709/245, 239
See application file for complete search history.

(56) References Cited

U.S. PATENT DOCUMENTS

| | | | |
|---|---|---|---|
| 5,940,371 A | 8/1999 | Mitts et al. | |
| 6,324,207 B1 | 11/2001 | Kanterakis et al. | |
| 6,539,225 B1 | 3/2003 | Lee | |
| 2002/0012320 A1* | 1/2002 | Ogier et al. ................ | 370/252 |
| 2002/0045450 A1 | 4/2002 | Shimizu et al. | |
| 2002/0143993 A1* | 10/2002 | Jung ........................... | 709/245 |
| 2003/0233594 A1* | 12/2003 | Earl .............................. | 714/4 |
| 2004/0071120 A1* | 4/2004 | Grech ......................... | 370/338 |
| 2004/0136348 A1* | 7/2004 | Han ............................ | 370/338 |
| 2006/0182034 A1* | 8/2006 | Klinker et al. .............. | 370/238 |

FOREIGN PATENT DOCUMENTS

| | | |
|---|---|---|
| EP | 1300991 | 4/2003 |
| EP | 1 345 463 A2 | 9/2003 |
| JP | 9-186704 | 7/1997 |
| JP | 10-308775 | 11/1998 |
| JP | 2002-223467 | 8/2002 |

OTHER PUBLICATIONS

European Search Report dated Jan. 21, 2008, from corresponding European Application 04025994.7.
Caceres R et. al., "Improving the performance of reliable transport protocols in mobile computing environments", IEEE Journal on Selected Areas in Communication, IEEE Service Center, Piscataway, NJ, US, vol. 13, No. 5, Jun. 1, 1995, p. 850-857.

(Continued)

*Primary Examiner*—Charles N Appiah
*Assistant Examiner*—Michael T Vu
(74) *Attorney, Agent, or Firm*—Katten Muchin Rosenman LLP

(57) ABSTRACT

In a mobile IP network, a mobile node transmits data to a corresponding node. The transmitted data is stored in a transmitted data holding unit in the mobile node. The mobile node manages replenishment information indicating an operation relating to the retransmission of a packet. The mobile node retrieves a packet specified according to the replenishment information from the transmitted data holding unit when handover occurs, and transmits (retransmits) the packet.

21 Claims, 45 Drawing Sheets

OTHER PUBLICATIONS

Canfeng Chen et. al., "Simulation study of TCP behavior over redundant source routing in ad hoc networks", Wireless Communications and Networking Conference, 2004.WCNC.2004 IEEE Service Center, Piscataway, NJ, US, IEEE, vol. 2, Mar. 21, 2004, p. 1258-1263.

European Search Report and Annex to the European Search Report dated Mar. 12, 2008 for corresponding European Patent Application EP 04 02 5994.

Communication pursuant to Article 94(3) EPC dated Jul. 23, 2008, from the corresponding European Application.

Notice of Rejection Ground mailed Oct. 21, 2008, from the corresponding Japanese Application.

Communication pursuant to Article 94(3) EPC date Nov. 26, 2009 from the corresponding European Application No.: 04 025 994.7.

* cited by examiner

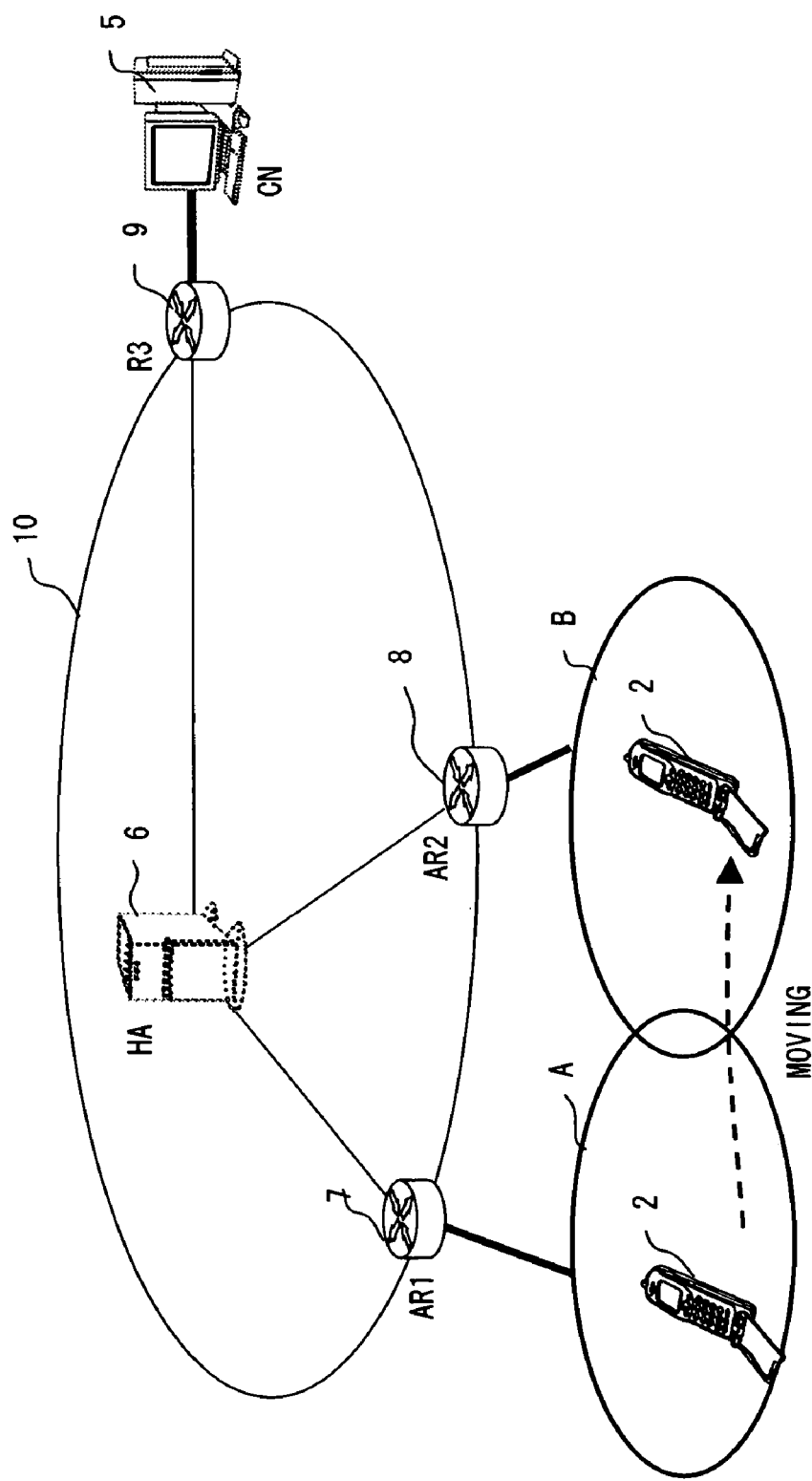
F I G. 1

| | |
|---|---|
| MEDIUM 1 | SELECTION MODE |
| MEDIUM FIXED INFORMATION ||
| NUMBER OF RETRANSMITTED DATA | GUARANTEE TIME |
| NEGOTIATION INFORMATION ||
| DESTINATION IDENTIFICATION INFORMATION (IP ADDRESS, ETC.) ||
| NUMBER OF RETRANSMITTED DATA | GUARANTEE TIME |
| ~ ||
| MEDIUM n | SELECTION MODE |
| MEDIUM FIXED INFORMATION ||
| NUMBER OF RETRANSMITTED DATA | GUARANTEE TIME |
| NEGOTIATION INFORMATION ||
| DESTINATION IDENTIFICATION INFORMATION (IP ADDRESS, ETC.) ||
| NUMBER OF RETRANSMITTED DATA | GUARANTEE TIME |

FIG. 19

| PRESENCE/ABSENCE OF DUPLICATE DETECTION FUNCTION ||
|---|---|
| MEDIUM 1 | SELECTION MODE |
| MEDIUM FIXED INFORMATION ||
| FINAL HOLDING DATA ||
| NUMBER OF RETRANSMITTED DATA | GUARANTEE TIME |
| NEGOTIATION INFORMATION ||
| NUMBER OF RETRANSMITTED DATA | GUARANTEE TIME |
| MEDIUM 2 | SELECTION MODE |
| ~ ||
| MEDIUM n | SELECTION MODE |
| MEDIUM FIXED INFORMATION ||
| FINAL HOLDING DATA ||
| NUMBER OF RETRANSMITTED DATA | GUARANTEE TIME |
| NEGOTIATION INFORMATION ||
| NUMBER OF RETRANSMITTED DATA | GUARANTEE TIME |

FIG. 20

| MEDIUM |
|---|
| RADIO WAVE INTENSITY REPLENISHMENT SELECTION FLAG |
| REPLENISHMENT INFORMATION TRANSMISSION START RADIO WAVE THRESHOLD |
| RADIO WAVE INTENSITY PROTECTIVE NUMBER: m STAGES |
| REPLENISHMENT START RADIO WAVE INTENSITY THRESHOLD |
| RADIO WAVE INTENSITY PROTECTIVE NUMBER: n STAGES |

FIG. 28

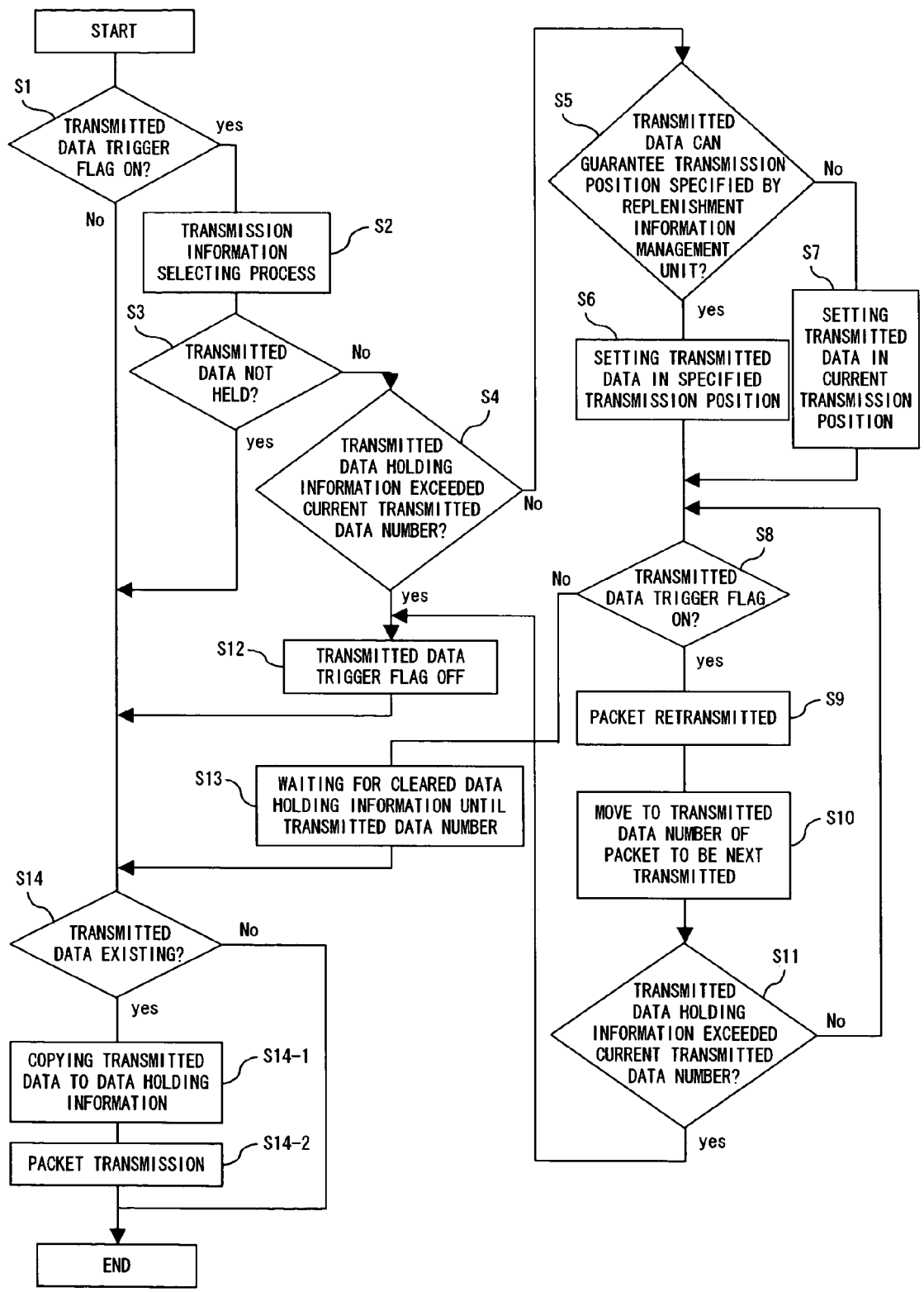
F I G. 3 3 B

TRANSMITTED PACKET REPLENISHMENT SYSTEM AND TRANSMITTED PACKET REPLENISHING METHOD

BACKGROUND OF THE INVENTION

1. Field of the Invention

The present invention relates to a packet replenishing method used when a packet is transmitted or received over a wireless communications network, and a mobile node, a relay node, and a receiving terminal used in the wireless communications network.

2. Description of the Related Art

FIG. 1 shows an example of the configuration of an existing IPv6 network. A home agent (mobile support device, HA) 6, access routers 7 and 8, and a router 9 are connected to the Internet 10. A mobile node (MN) 2 transmits data to a corresponding node CN) 5. The mobile node 2 belongs to a wireless network A and communicates with the corresponding node 5 through the access router 7. After the mobile node 2 transfers to belong to a wireless network B, it performs communications through the access router 8.

FIG. 2 is an explanatory view showing an operation performed when handover occurs. First in (1), when the mobile node 2 enters the wireless network A before the transfer, it receives a router advertisement RA1. In (2), the mobile node 2 generates a care of address CoA-7. In (3), the mobile node 2 makes position registration for a home agent HA6. The home agent HA6 manages home address HoA-2 of the mobile node 2. In (4), the home agent HA6 associates the home address HoA-2 of the mobile node 2 with the care of address CoA-7 using the binding cache, thereby managing the information that the mobile node 2 belongs to the wireless network A. In (5), the mobile node 2 transfers from the wireless network A to the wireless network B under the access router 8, thus bringing about handover.

In (6), the mobile node 2 receives a router advertisement RA2 from the access router 8. In (7), the mobile node 2 generates a care of address CoA-8. In (8), the mobile node 2 makes position registration for the home agent HA6. In (9), the home agent HA6 associates the home address HoA-2 of the mobile node 2 with the care of address CoA-8 generated by the mobile node 2 in (7) using the binding cache of the mobile node 2 and manages them.

FIG. 3 is an explanatory view showing the problem of the conventional technology performed when handover occurs. (1) through (4) shown in FIG. 3 are the operations similar to those in (1) through (4) shown in FIG. 2.

(5) shown in FIG. 3 is data to be transmitted by the mobile node 2 to the corresponding node 5 in several transmitting operations. Numbers 1 through 7 in (5) are sequential numbers of packets storing divided transmitted data, and transmitted in the ascending order.

In (6), the mobile node 2 sequentially transmits packets storing transmitted data. In this process, the mobile node 2 is assumed to have transmitted the packets up to the packet 3. (7) indicates the data received by the corresponding node 5. The corresponding node 5 receives the packets 1 and 2, and waits for the packet 3.

By the transfer of the mobile node 2, the handover of (8) occurs. Since the handover has occurred during the transmission of the packet 3, the packet 3 does not reach the corresponding node 5. The operations (9) through (12) performed when the handover occurs are similar to the operations (6) through (9) shown in FIG. 2.

In FIG. 3, after the processes (9) through (12) are performed, the mobile node 2 starts transmitting data to the corresponding node 5 again in (13). The mobile node 2 recognizes that it has transmitted the packets up to the packet 3. Therefore, the packets are transmitted from the packet 4 in (13).

(14) refers to the data received by the corresponding node 5 in the operations up to the operation (13). When it is recognized that the corresponding node 5 has not received the packet 3, flow control is performed when a packet loss has occurred between the mobile node 2 and the corresponding node 5 in (15).

As the first method of preventing the above-mentioned flow control disclosed by the Japanese Patent Application Laid-open No. Hei 10-308775, there is a well-known method of starting accumulating transmitted packets on the terminal side if it is determined that handover is required when a mobile node transfers, and transmitting the accumulated packets after the handover terminates and the communications are resumed. The first method is explained below by referring to FIG. 4.

The operations (1) through (4) shown in FIG. 4 are the same as the operations (1) through (4) shown in FIG. 3.

(5) refers to the data to be transmitted. In (6), the mobile node 2 transmits the packets 1 and 2 through the access router 7 which provides the wireless network A. (7) refers to the corresponding node 5 receiving the packets 1 and 2.

The handover occurs in (8). At this time, the mobile node 2 buffers the packet 3 and the subsequent packets in the packets indicated in (5), and stops the transmission of packets. The operations in (9) through (12) to be performed when the handover has occurred are the same as the operations (6) through (9) shown in FIG. 3.

After the completion of the processes in (9) through (12) after the mobile node 2 transfers to the wireless network B, the packet 3 and the subsequent packets buffered in (8) above are transmitted to the corresponding node 5. Thus, a loss of a packet can be avoided.

As the second method of preventing the flow control from being performed when the handover occurs as disclosed by Japanese Patent Application Laid-open No. 2002-223467, there is a well-known method of stopping the transmission of a packet when the packet numbers transmitted by performing dynamic delay ACK control when the handover occurs are inverted. The process is explained below by referring to FIG. 5.

Most of the procedure shown in FIG. 5 is the same as the procedure shown in FIG. 3. However, in the procedure shown in FIG. 5, it is assumed that there is a delay difference between the wireless network A and the wireless network B. In this example, the delay difference between the wireless network A and the home agent HA6 is assumed to be larger than that between the wireless network B and the home agent HA6. (1) through (7) shown in FIG. 5 are similar to (1) through (7) shown in FIG. 3. When the handover occurs, the mobile node 2 transmits the packets having data 1 through 3 from the wireless network A to the corresponding node 5. On the other hand, the corresponding node 5 receives only data 1 and 2. The handover occurs in (8). In (9) through (12), the operations up to performing position registration are the same in the wireless network B as those shown in FIG. 3.

In (13), the transmission of packets is started from the wireless network B after the transfer. Based on the delay difference between the wireless network A and the wireless network B, the packet transmitted from the wireless network B side is received the corresponding node 5 earlier than the packet transmitted from the wireless network A side. For example, assume that there is the delay difference of two packets. At this time, when the corresponding node 5 detects that packets have not been received in a correct order, it requests the mobile node 2 to retransmit the packets. However, since the retransmission of packets lowers the throughput of the communications, the problem has to be avoided in the following method.

That is, in (14), when handover occurs, the corresponding node 5 delays the transmission of ACK ("Acknowledgement") when packets are received. In FIG. 5, for example, the transmission of ACK is delayed by three packets. Thus, although the order of the packets received by the delay difference in the wireless network is inverted, a retransmission request is not immediately issued, thereby preventing the execution of the flow control.

In the above-mentioned first method, it is always necessary to expect the occurrence of handover on each mobile node. When the occurrence of handover is expected, accumulating the packets being transmitted is started, and the transmission of packets is stopped. When the process of the handover is completed, the transmission of accumulated packets is resumed. However, it is difficult to predict the occurrence of handover on each mobile node. If it should be possible, the load on the network becomes very heavy.

Although the strength of a wave becomes weak in a process other than the handover, the transmission of packets from a mobile node is stopped on the network side in case of the occurrence of handover. However, when the transmission of a packet is stopped for any reason other than the handover, there is no opportunity of resuming the transmission of packets. Therefore, the packet to be transmitted by a mobile node cannot reach a corresponding node.

In the above-mentioned second method, the degradation of throughput by executing the flow control can be avoided. However, when a packet is lost, it cannot be replenished.

SUMMARY OF THE INVENTION

The present invention aims at avoiding a loss of a packet in the wireless communications system. The present invention also aims at reducing the process relating to the replenishment of a packet or minimizing the resources used for the replenishment.

The transmitted packet replenishing method according to the present invention includes: a step of storing a packet transmitted by a mobile node in a storage device in the mobile node; a step of managing replenishment information indicating the operation relating to the retransmission of a packet in the mobile node; and a step of the mobile node transmitting a packet stored in the storage device according to the replenishment information when handover occurs.

In this method, the packet transmitted from a mobile node is stored in the storage device in the mobile node. When handover occurs, a packet transmitted in the past is retrieved from the storage device and transmitted. That is, when handover occurs, a packet transmitted in the past is retransmitted. Thus, the loss of a packet caused by the handover can be replenished. At this time, the replenishment information defines how far in the past the packets are to be retransmitted.

The above-mentioned method can further includes a step of discarding a duplicate packet received in the receiving apparatus. With the step, although duplicate packets are received, it is determined that a packet has been correctly received in an upper layer. Therefore, the packet retransmitting process is avoided in the upper layer in which a packet is processed, thereby suppressing the degradation in throughput.

Furthermore, the above-mentioned replenishment information can be set depending on the status of a network. In this case, depending on the status of the network, a requested number of packets can be retransmitted depending on the status of a network.

The transmitted packet replenishing method according to another aspect of the present invention includes in the mobile IP network: a step of the mobile node monitoring the intensity of a radio wave; a step of storing a packet transmitted by the mobile node in a storage device in the mobile node when it is detected that the intensity of a radio wave is smaller than a predetermined threshold; and a step of the mobile node transmitting a packet stored in the storage device when it is detected that the intensity of a radio wave has recovered.

In this method, when the intensity of a radio wave is reduced, the packet transmitted from a mobile node is stored in the storage device in the mobile node. When the intensity of a radio wave recovers, the packet transmitted in the past is retrieved from the storage device and transmitted. That is, when the intensity of a radio wave recovers, a packet transmitted during the period when the intensity of a radio wave is degraded is retransmitted. Thus, a loss of a packet caused by the degradation of the intensity of a radio wave can be replenished.

The present invention is not limited to the above-mentioned packet replenishing method, but can also be applied to a mobile node and a receiving apparatus in the above-mentioned packet replenishing method.

BRIEF DESCRIPTION OF THE DRAWINGS

FIG. 1 shows an example of the configuration of an existing mobile IPv6 network;

FIG. 19 shows the configuration of a transmitting terminal replenishment information management table;

FIG. 20 shows the configuration of a receiving terminal management table;

FIG. 28 shows the structure of the replenishment necessity determination table;

FIGS. 33A and 33B are flowcharts showing the basic operations of a transmitting terminal;

DESCRIPTION OF THE PREFERRED EMBODIMENTS

The preferred embodiments of the present invention are described below by referring to the attached drawings.

First Embodiment

Figure 6:
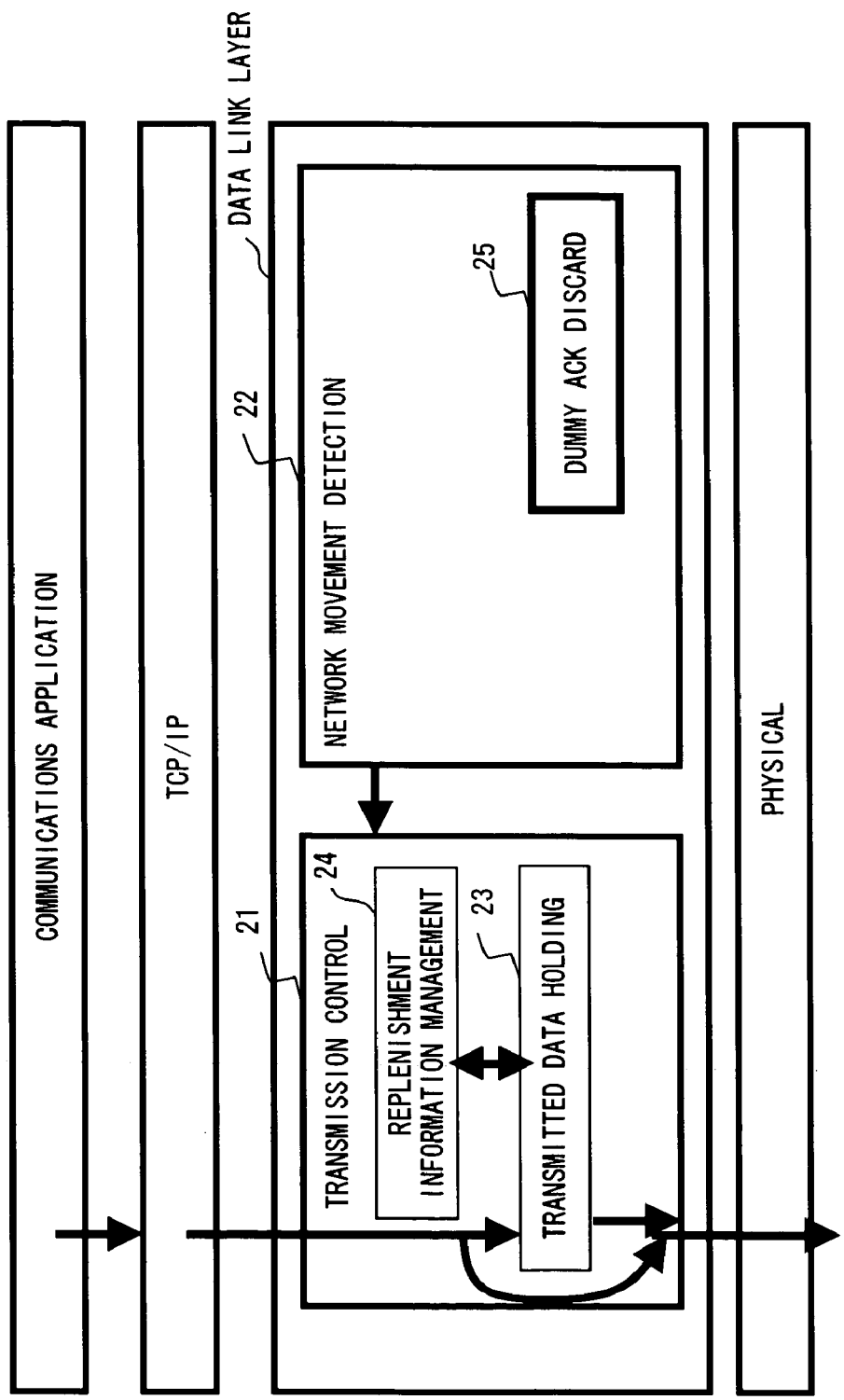
FIG. 6 shows the principle of the mobile node according to the present invention.

FIG. 6 shows the principle of the mobile node according to the present invention. A mobile node comprises a transmission control unit 21 for controlling the retransmission of a packet and a network movement detection unit 22 in a data link layer.

The transmission control unit 21 comprises a transmitted data holding unit 23 and a replenishment information management unit 24, performs a process of transmitting a normal packet, and controls the packet retransmitting process when handover occurs, etc. The transmitted data holding unit 23 temporarily stores transmitted data in a buffer, etc. according to the data transmission information received from the TCP/IP layer. The replenishment information management unit 24 manages replenishment information indicating the operations relating to the packet retransmission, and transmits (that is, retransmits) corresponding data in the data stored in the transmitted data holding unit 23 when handover occurs.

The network movement detection unit 22 recognizes the transfer of a mobile node by analyzing a router advertisement and performs position registration. The network movement detection unit 22 can further comprise a dummy ACK discard unit 25. When the dummy ACK discard unit 25 receives duplicate ACK relating to the packet retransmission, the duplicate ACK (hereinafter referred to as a dummy ACK) received in a TCP/IP layer which is an upper layer is not passed, but discarded.

Figure 2:
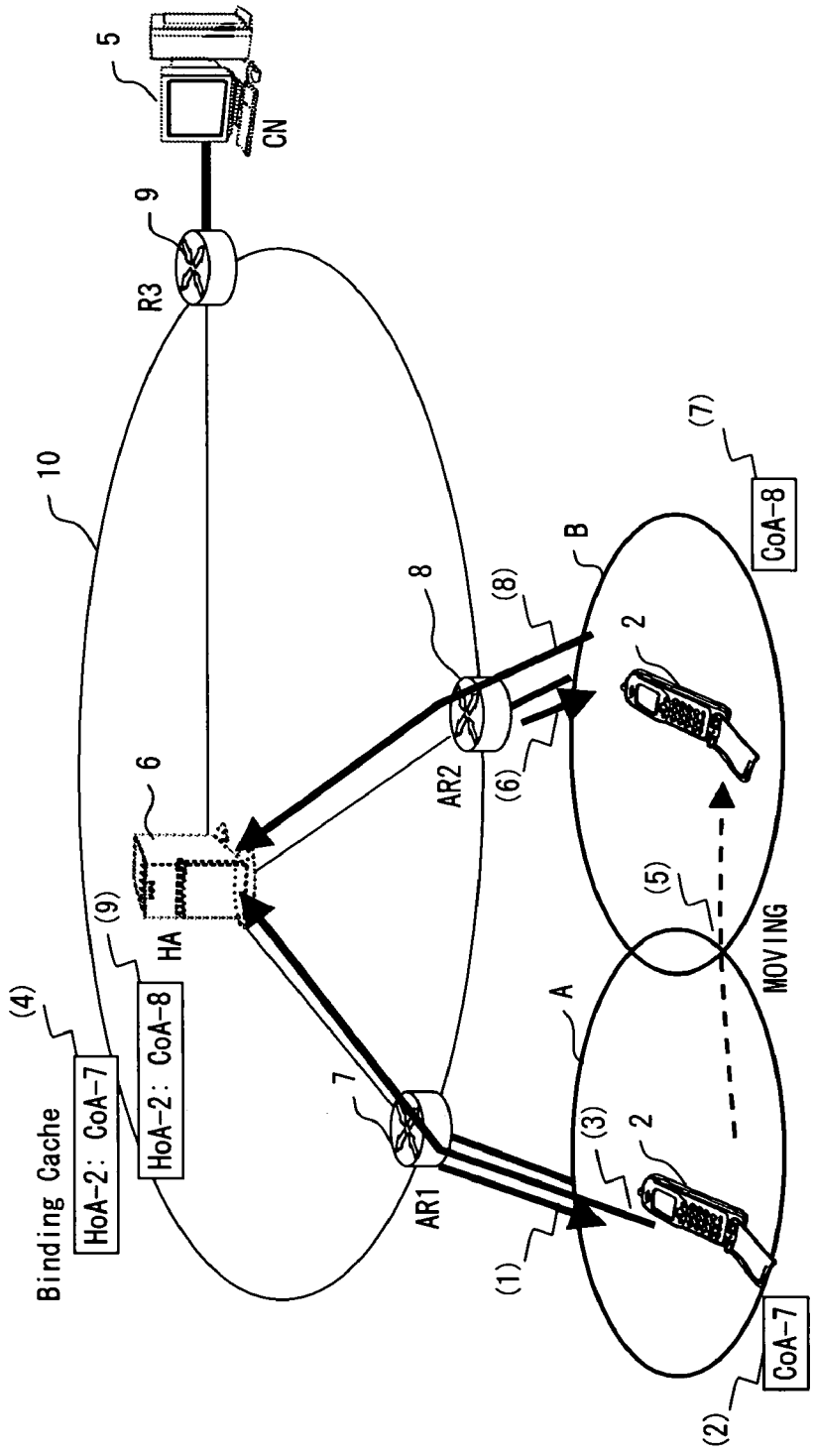
FIG. 2 is an explanatory view of an operation performed when handover occurs.
Figure 3:
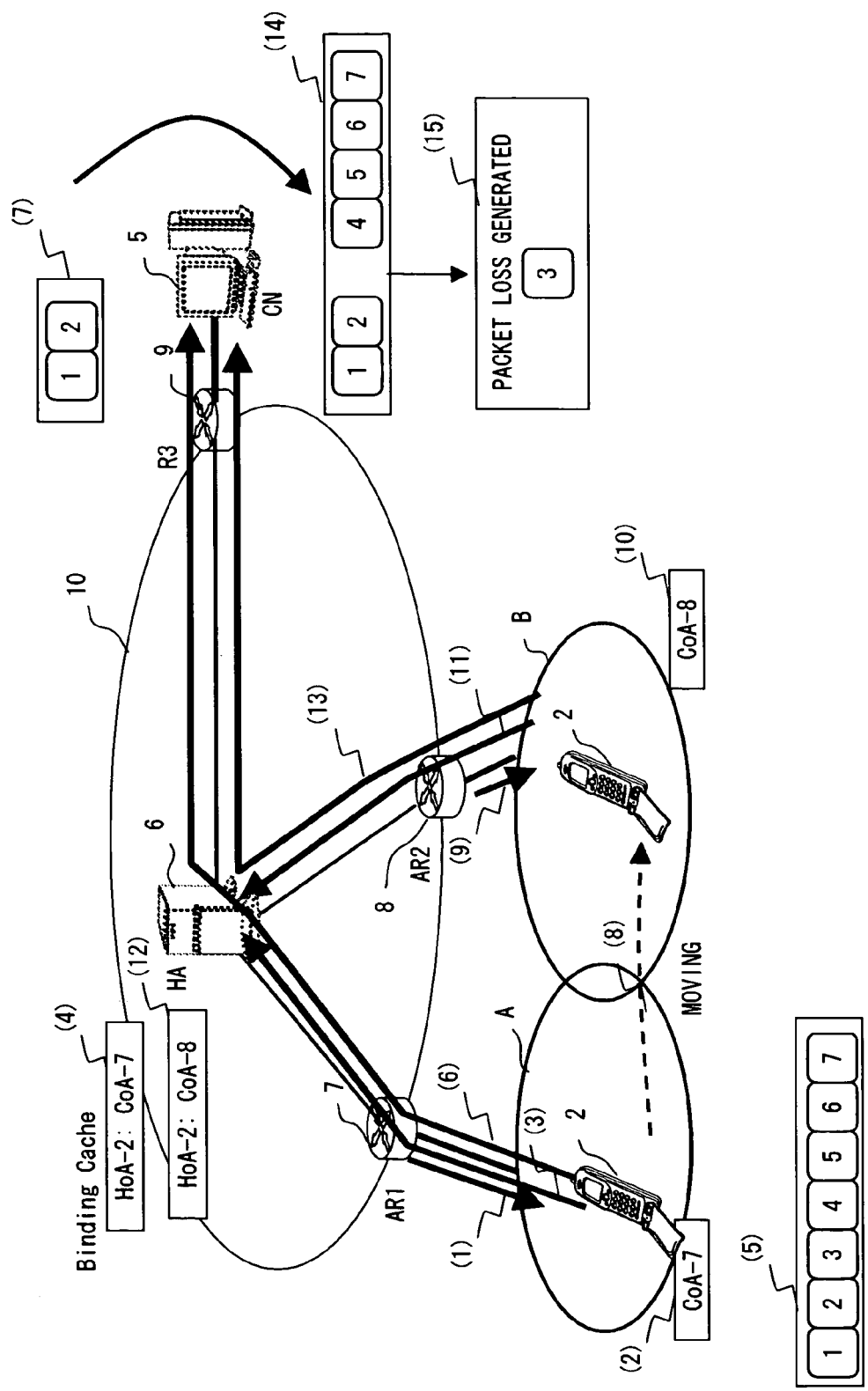
FIG. 3 is an explanatory view showing the problem of the conventional technology when handover occurs.
Figure 4:
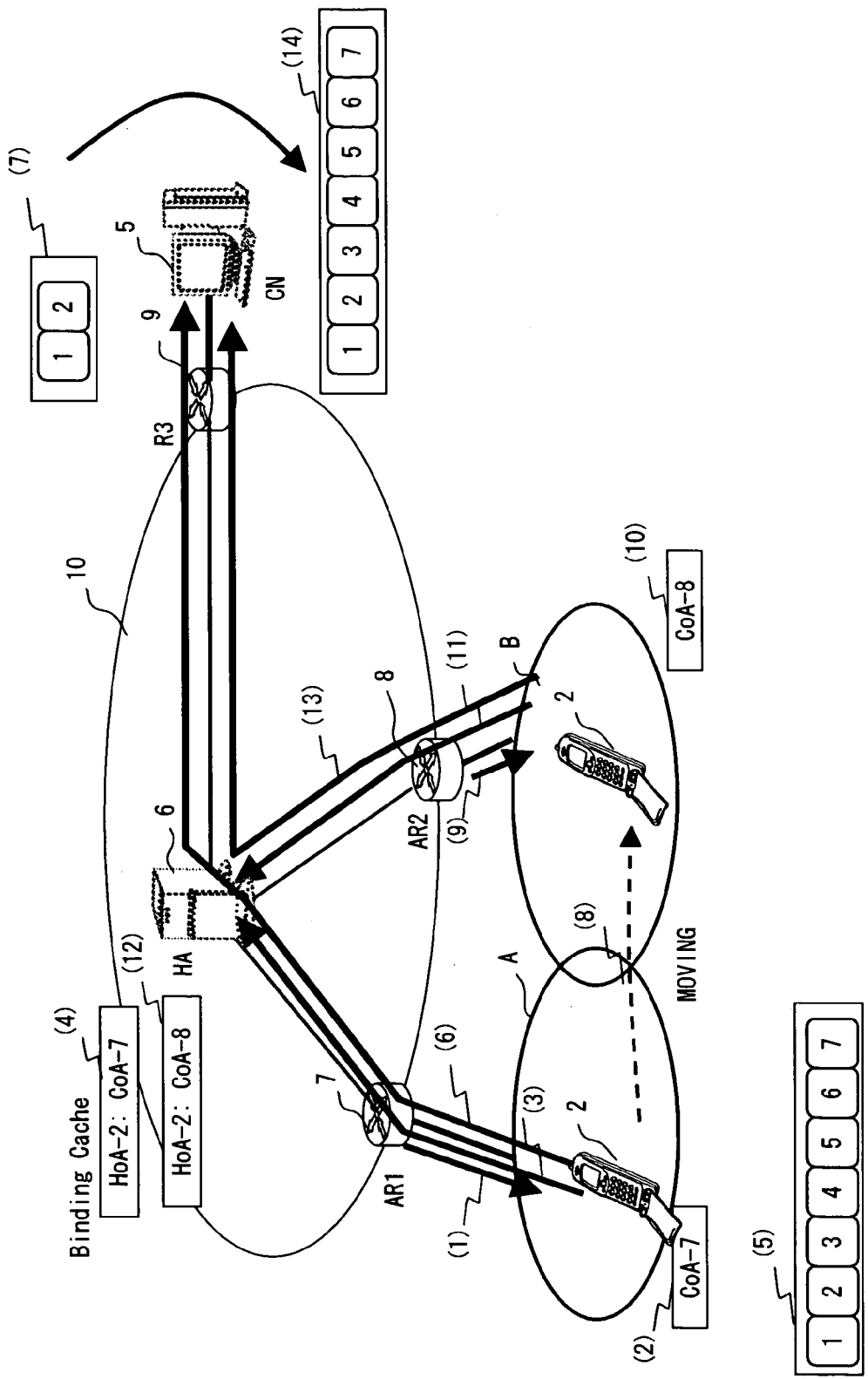
FIG. 4 is an explanatory view (1) of the conventional method of preventing a flow controlling operation when handover occurs.
Figure 5:
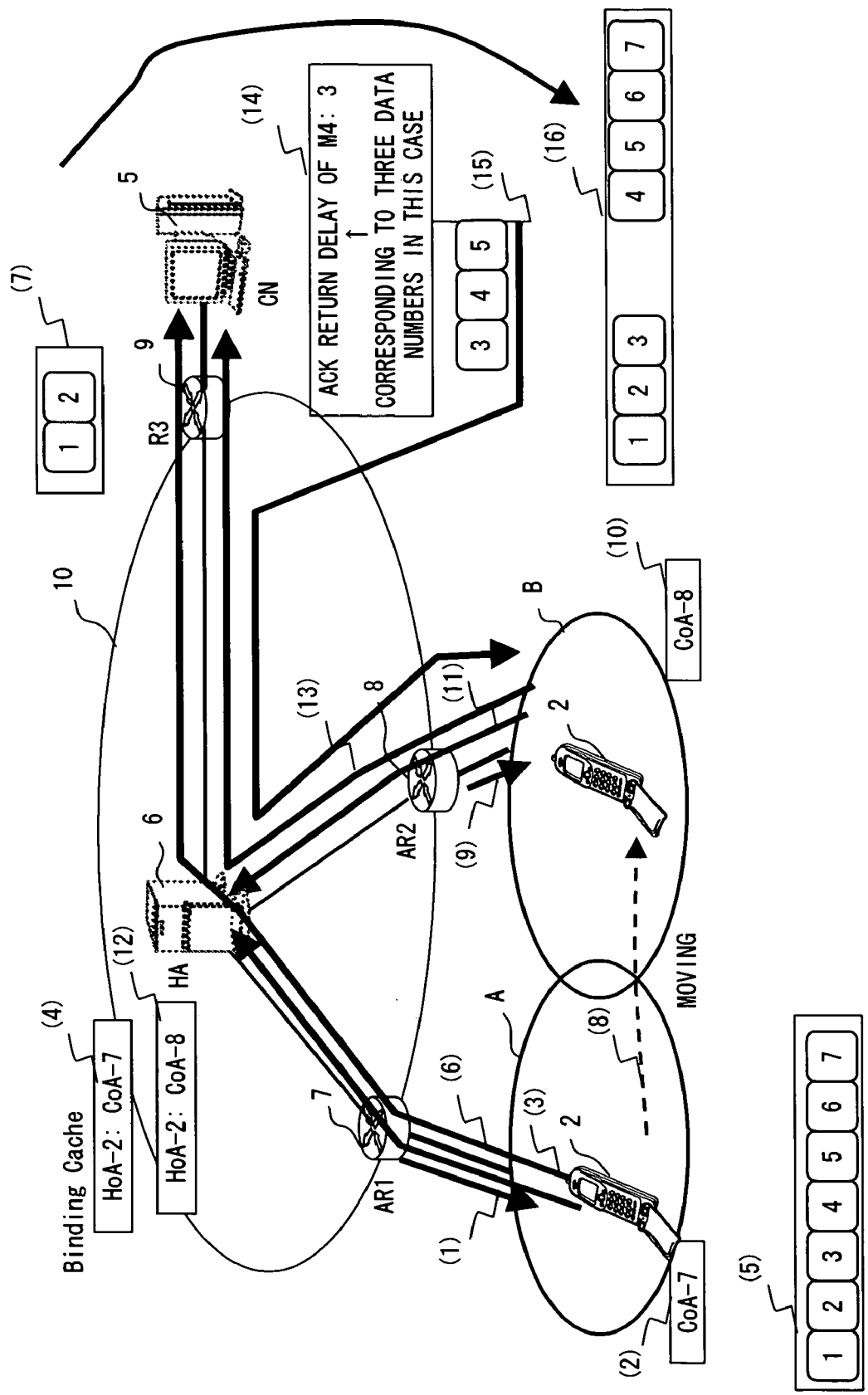
FIG. 5 is an explanatory view (2) of the conventional method of preventing a flow controlling operation when handover occurs.
Figure 7:
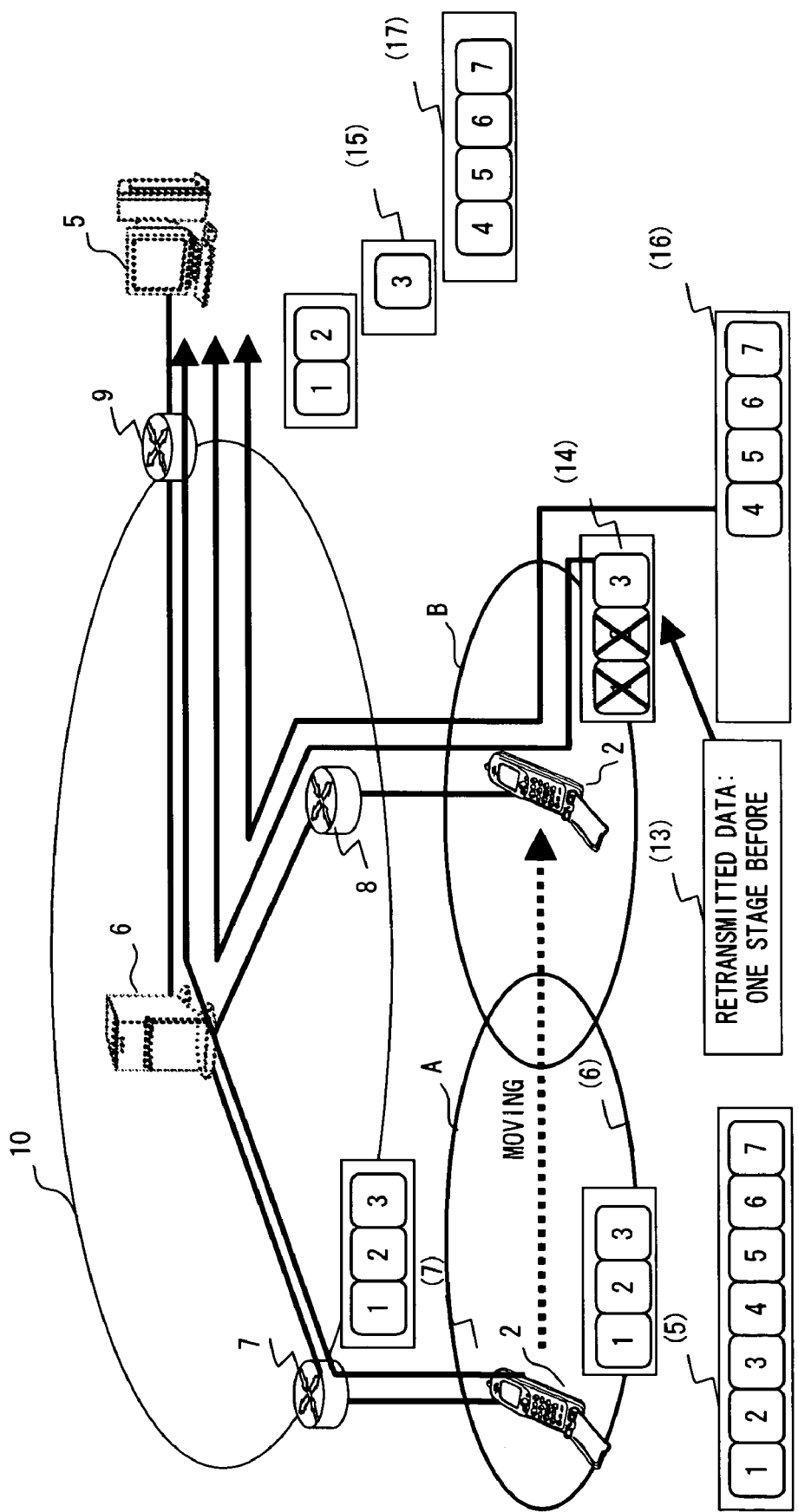
FIG. 7 is an explanatory view of the packet replenishing method according to the first embodiment of the present invention.

FIG. 7 is an explanatory view of a method of retransmitting a packet required on the transmitting side. In FIG. 7, the portions also shown in FIGS. 2 and 3 are omitted. First in (1), when the mobile node 2 enters the wireless network A before the transfer, it receives a router advertisement RA1. In (2), the mobile node 2 generates a care of address CoA-7. In (3), the mobile node 2 makes position registration for a home agent HA6. The home agent HA6 manages home address HoA-2 of the mobile node 2. In (4), the home agent HA6 associates the home address HoA-2 of the mobile node 2 with the care of address CoA-7 using the binding cache, thereby managing the position registration information that the mobile node 2 belongs to the wireless network A.

(5) refers to data to be transmitted separately in several operations from the mobile node 2 to the corresponding node 5. The numbers 1 through 7 in (5) refers to the sequence numbers of a packet storing the divided transmission data, and the data is transmitted in the ascending order.

(6) refers to a packet stored in the transmitted data holding unit 23 shown in FIG. 6, and stores a packet transmitted to the corresponding node 5 as is. FIG. 6 shows that the process of transmitting packets having the data numbers 1 through 3 has been completed in the mobile node 2. In (6), the packet stored in the transmitted data holding unit 23 is transmitted to the corresponding node 5 in (7).

In (8), handover occurs by the transfer of the mobile node 2. In this example, it is assumed that handover occurs during the transmission of the packet 3. Then, the packet 3 does not reach the corresponding node 5. In (9), when the mobile node 2 enters the wireless network B, it receives the router advertisement RA2 from the access router 8. In (10) the mobile node 2 generates a care of address CoA-8. In (11), the mobile node 2 performs the position registration for the home agent HA6. In (12), the home agent HA6 associates the home address HoA-2 of the mobile node 2 with the care of address CoA-8 generated by the mobile node 2 in (10) using the binding cache and manages them.

In (13), the replenishment information management unit 24 shown in FIG. 6, specifies "retransmission data: previous first stage" as replenishment information. At this time, the mobile node 2 has completed the process of transmitting up to the packet 3. In the normal transmitting process, the number of the packet to be transmitted next is 4. In (14), according to the replenishment information, the packet one stage before the packet having the data number 4, that is, the packet having the data number 3 is retrieved from the transmitted data holding unit 23, and then transmitted (retransmitted). In (15), in the corresponding node 5 which is a receiving apparatus, a packet having the data number 3 is received.

In (16), the data which has not been transmitted before the handover occurred is transmitted. In this process, the packet having the data number 4 and the subsequent packets are transmitted. In (17), the corresponding node 5 receives the packet having the data number 4 and the subsequent packets are received, thereby completing the data reception.

Thus, in the packet replenishing method according to the first embodiment, the transmitted data is stored in the transmitted data holding unit 23 in the mobile node 2. At this time, the data in the radio space between the mobile node 2 and the access router when handover occurs can be lost. Therefore, when handover occurs, the data of the amount specified by the replenishment information management unit 24 is read from the transmitted data holding unit 23 and retransmitted. Thus, a packet loss can be suppressed even when handover occurs.

Second Embodiment

In the second embodiment, the receiving terminal has the function of discarding a received duplicate packet. The transmitting terminal side is similar to that in the first embodiment. Therefore, the explanation is omitted here, and the operation and the effect of a receiving terminal are explained below.

Figure 8:
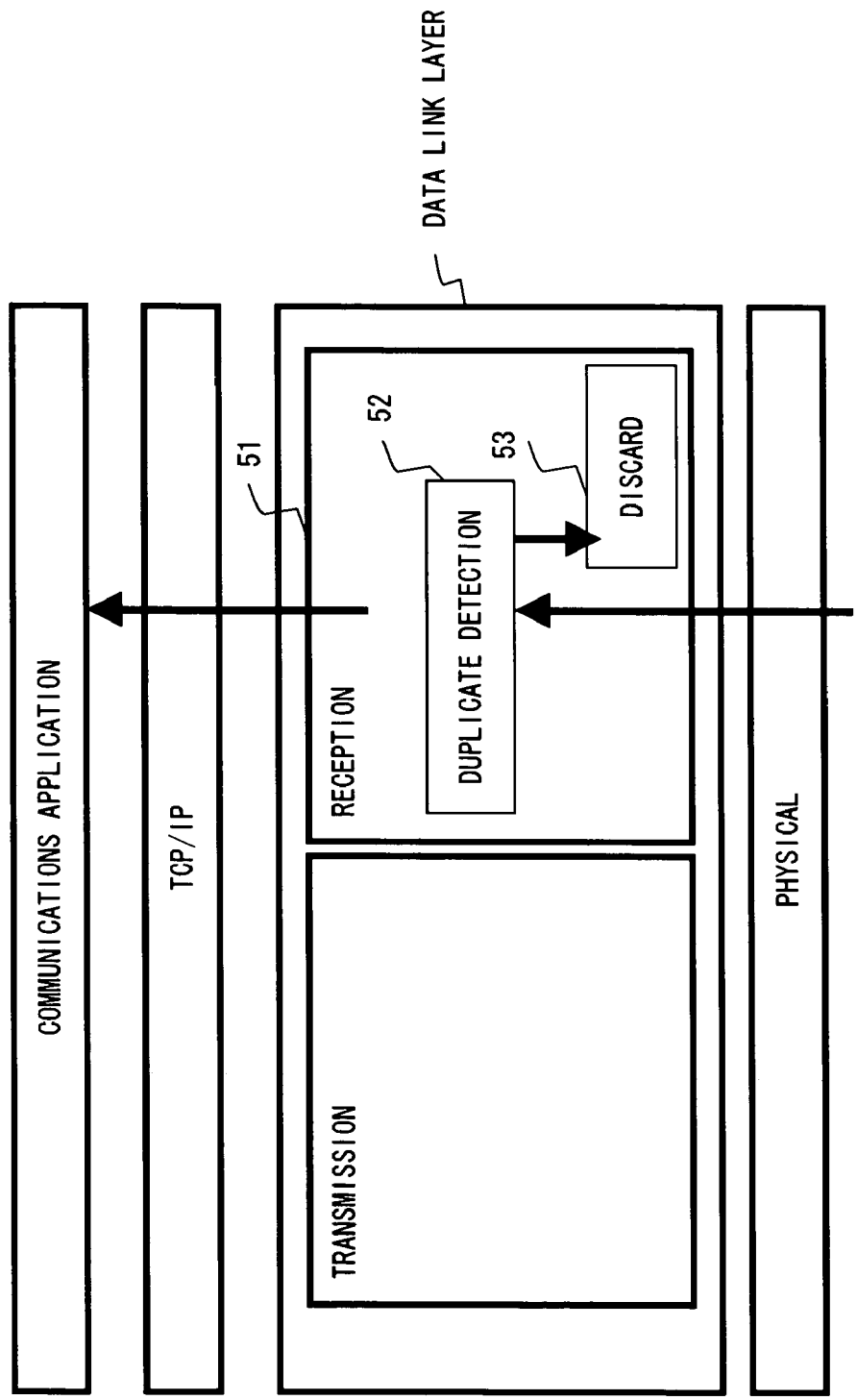
FIG. 8 shows the principle of the receiving node according to the present invention.

FIG. 8 shows the principle of the receiving terminal according to the present invention. A receiving terminal comprises receiving unit 51 for receiving data transmitted from a transmitting terminal; and a transmitting unit for transmitting data received from the TCP/IP layer or the receiving unit 51 in the data link layer. The receiving unit 51 comprises the duplicate detection unit 52 and the discard unit 53.

The duplicate detection unit 52 detects duplicate in the received data. When the duplicate received data is detected, it is reported to the discard unit 53. If there is no duplicate in the received data, the duplicate detection unit 52 passes the data to the TCP/IP layer. The discard unit 53 discards the duplicate data detected by the duplicate detection unit 52.

Figure 9:
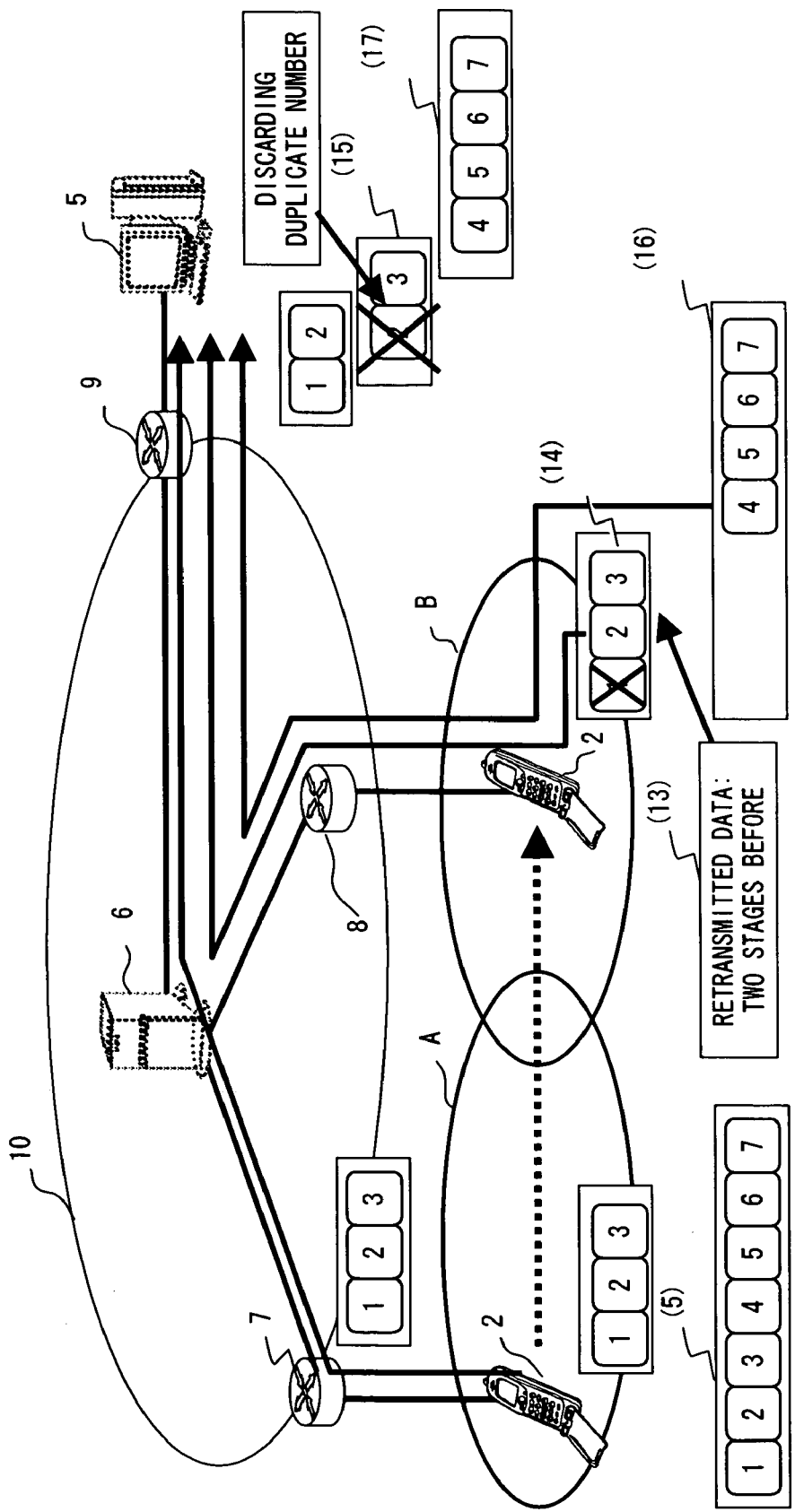
FIG. 9 is an explanatory view of the packet replenishing method according to the second embodiment of the present invention.

FIG. 9 is an explanatory view showing the method of discarding a duplicate received packet. The operation of transmitting data from the mobile node 2 to the corresponding node 5 over a network is similar to the operation according to the first embodiment, and is similarly represented by a number enclosed by parentheses in FIGS. 7 through 9. The same holds in the following explanation.

The point different from the first embodiment is that "retransmission data: previous two stages" is specified as replenishment information in (13). Based on the specification, packets are retransmitted from the packet having the data number 2 which is the second packet before the packet having the data number 4 in (14). In (15), the corresponding node 5 receives the packets having the data numbers 2 and 3.

In the corresponding node 5, the duplicate detection unit 52 shown in FIG. 8 detects a packet duplicate with the already received packet in the retransmitted packets in (14). In the example shown in FIG. 9, the packet having the data number 2 is assumed to have been received, and the discard unit 53 shown in FIG. 8 discards it. Thus, the duplicate received packet having the data number 2 is discarded. In the retransmitted packets, the packet having the data number 3 which has been lost by the handover can be replenished.

Thus, when the same packets are received as duplicate packets in the packet replenishing method according to the second embodiment, the duplicate detection unit 52 and the discard unit 53 perform the discarding process. Therefore, although the same packets are received as duplicate packets, it is determined that packets are normally received in the upper layer. Therefore, the flow control which is a retransmitting procedure is not performed in the upper layer, thereby efficiently performing communications.

Third Embodiment

Figure 10:
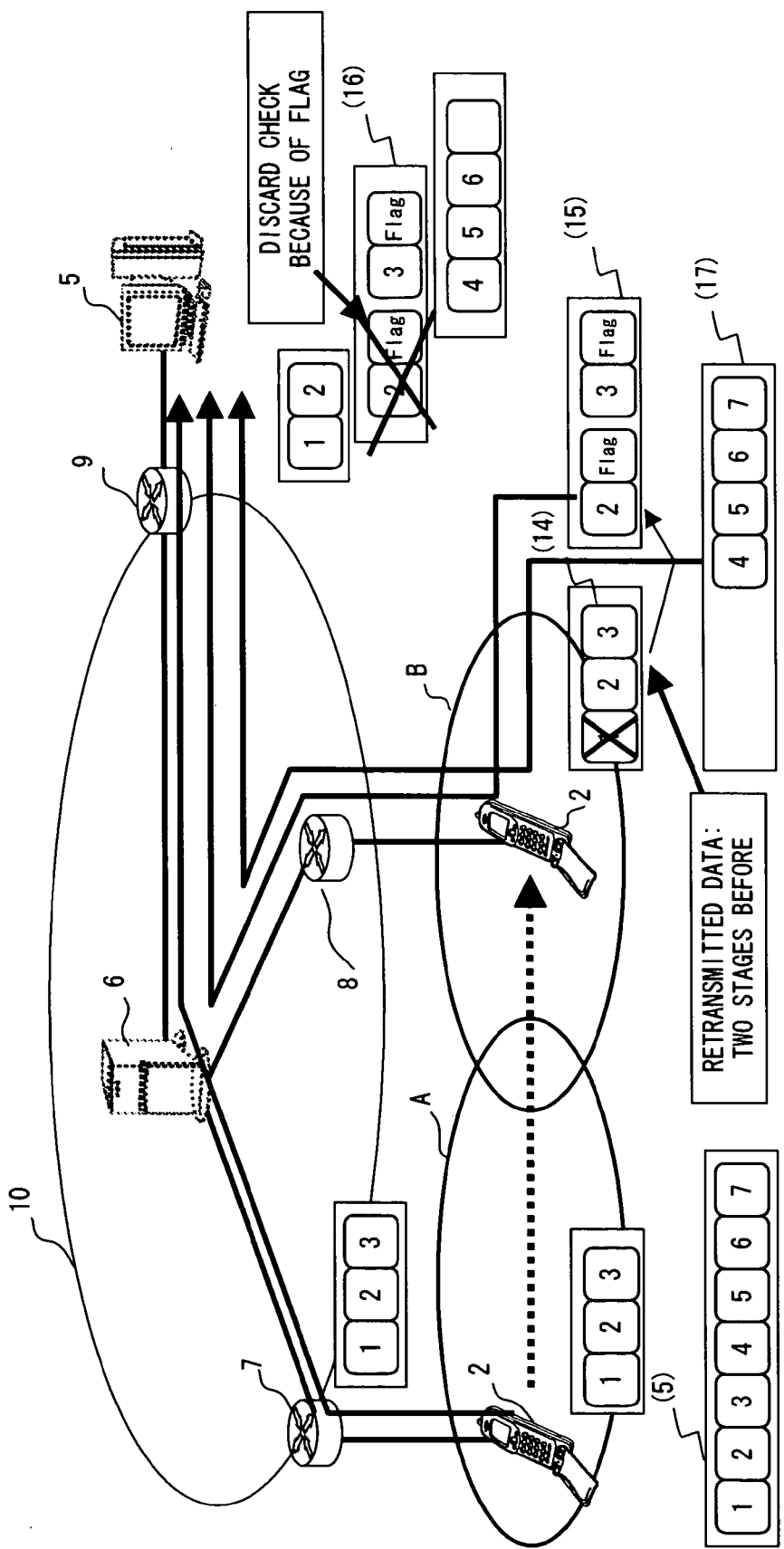
FIG. 10 is an explanatory view of the packet replenishing method according to the third embodiment of the present invention.

In the present embodiment, a receiving terminal determines whether or not the same packets have been received as duplicate packets according to the flag assigned to a transmitted packet. FIG. 10 is an explanatory view of the method of determining a duplicate packet received by a receiving terminal using a flag assigned to a transmitted packet. The packet replenishing method according to the present embodiment is explained below by mainly describing the point different from the second embodiment.

When the data stored in the transmitted data holding unit 23 shown in FIG. 6 is read and retransmitted, the duplicate transmission flag assigned to a retransmitted packet is set to a predetermined value (for example, "1") in (15). For a normal packet (a packet which is not a retransmitted packet), another value (for example, "0") is set as a duplicate transmission flag. In (16), the corresponding node 5 receives a packet provided with a duplicate transmission flag. At this time, the corresponding node 5 determines whether or not a packet is a duplicate packet only on a packet set to a predetermined value ("1" in the above-mentioned example) as a duplicate transmission flag. In this method, it is not necessary to determine on all received packets whether or not each of them are duplicate. That is, it is necessary only to determine whether or not a packet set to a predetermined value as a duplicate transmission flag is a duplicate packet. Therefore, the process by the corresponding node 5 can be reduced.

Figure 11:
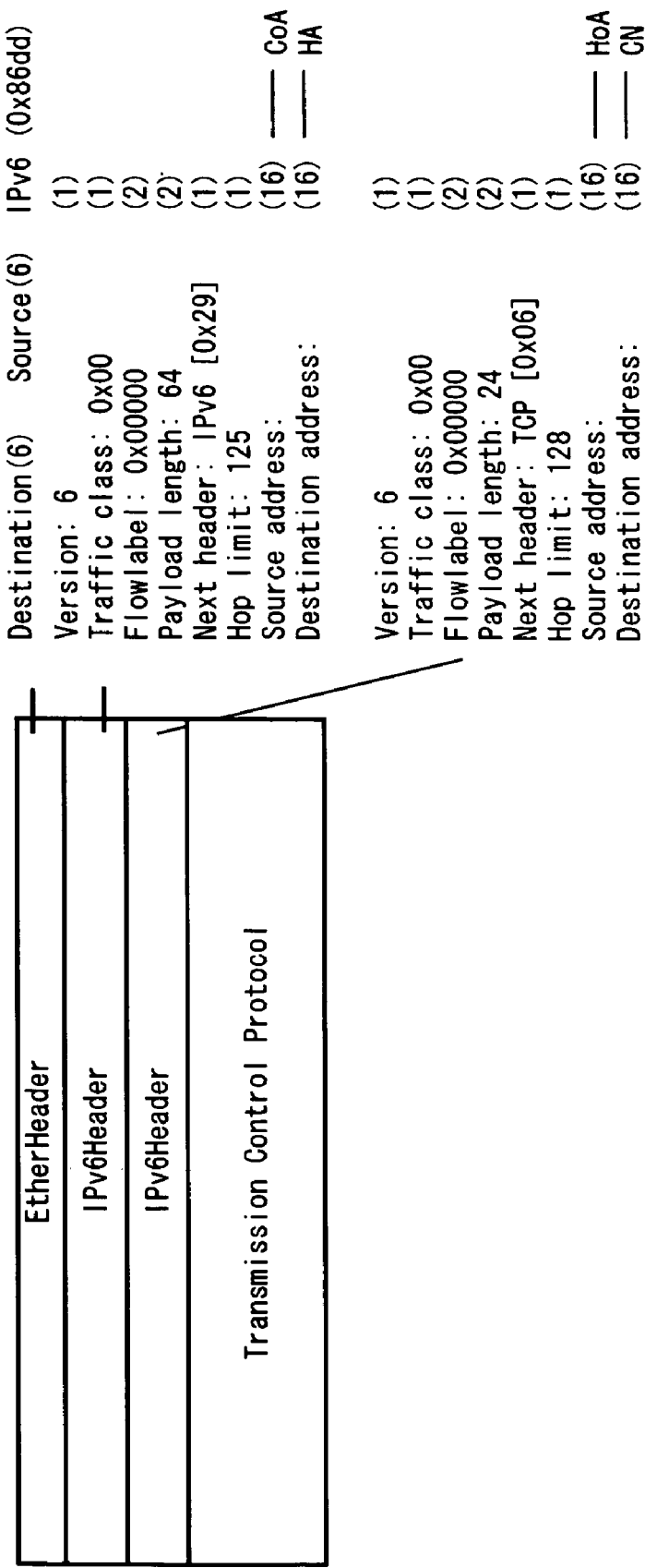
FIG. 11 shows an example of the structure of a packet to be transmitted from a mobile node to a corresponding node.
Figure 12:
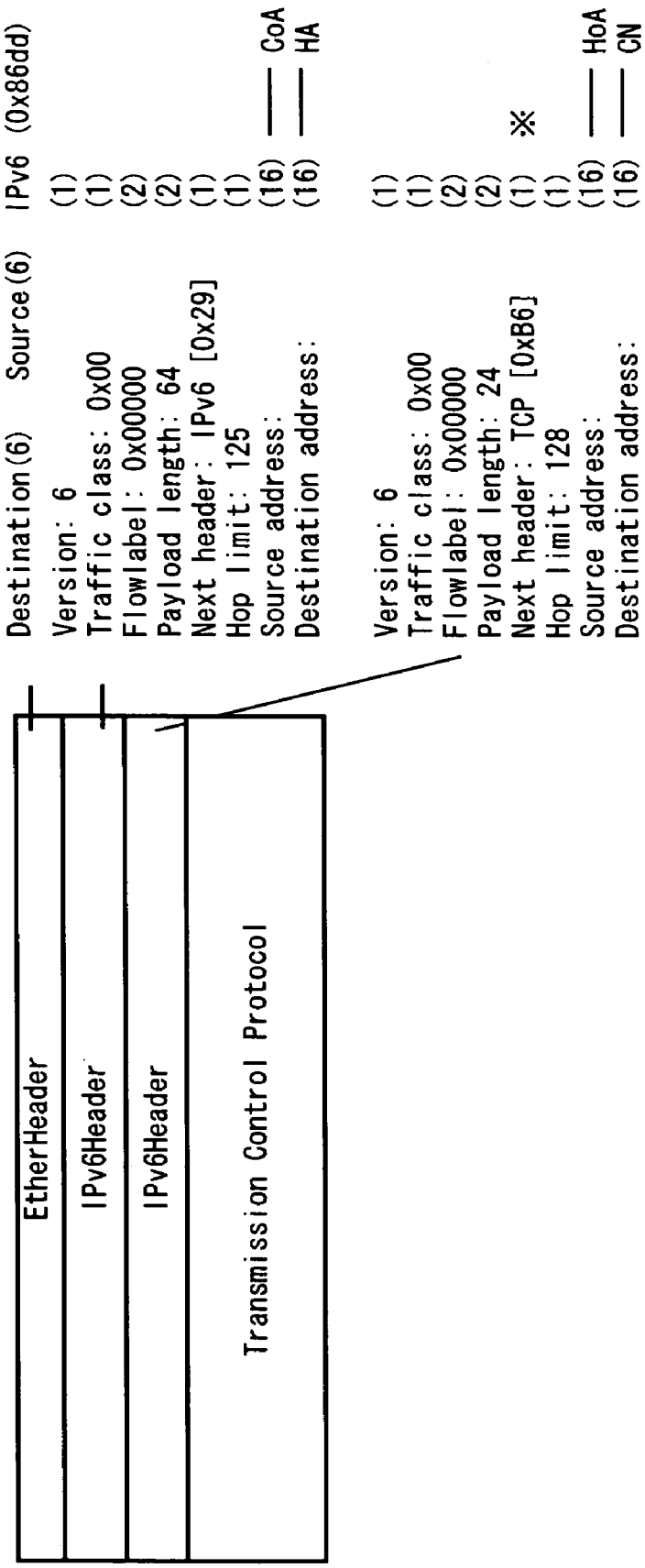
FIG. 12 shows an example (1) of a configuration including a duplicate transmission flag according to the third embodiment of the present invention.
Figure 13:
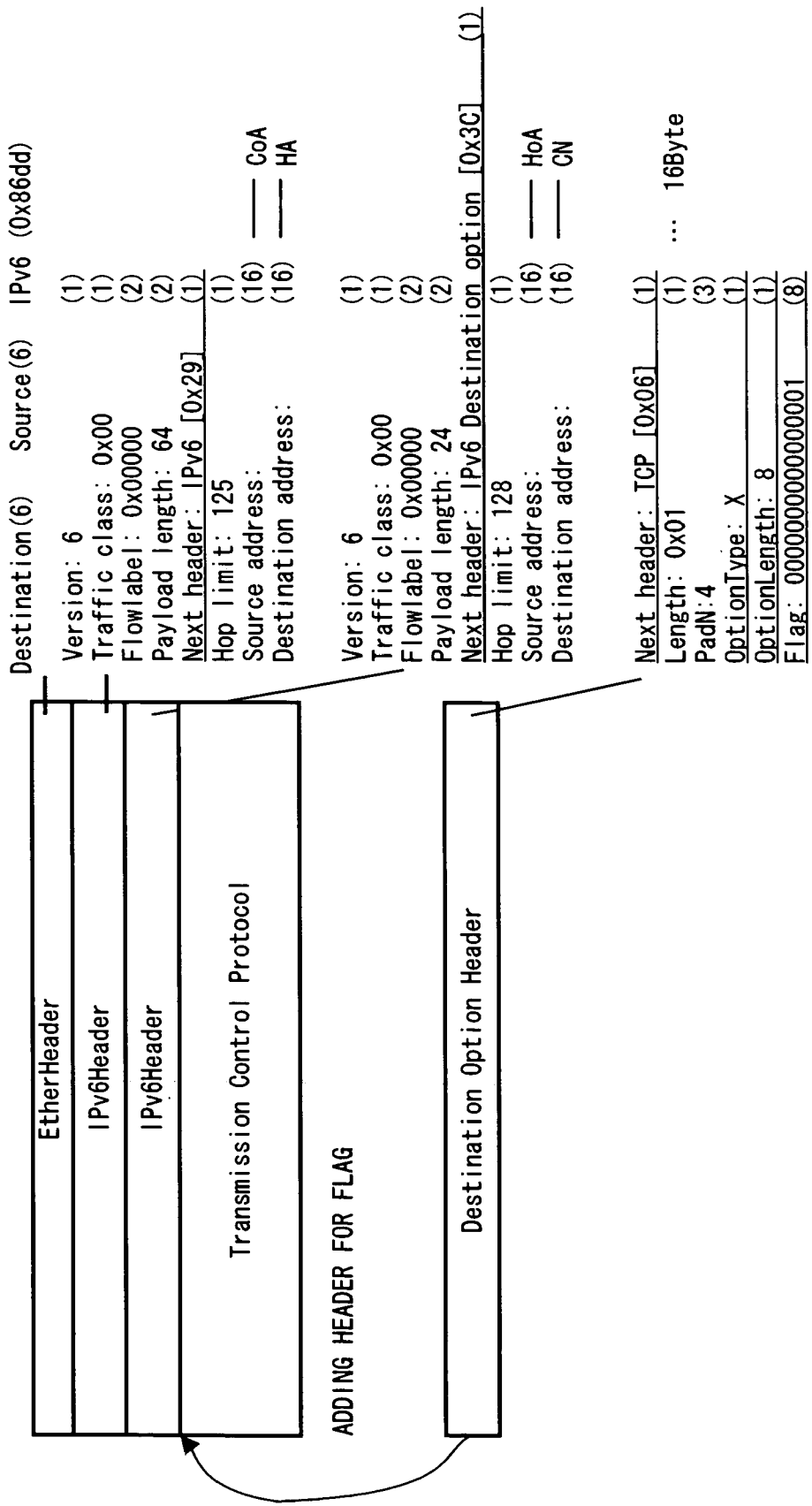
FIG. 13 shows an example (2) of a configuration including a duplicate transmission flag according to the third embodiment of the present invention.

The duplicate transmission flag is further explained in detail. FIG. 11 shows an example of the structure of a packet to be transmitted from the mobile node to the corresponding node 5. Normally, a packet transmitted to the corresponding node 5 is capsulated by a relay node 6. In this case, a duplicate transmission flag assigned to an inner packet. FIGS. 12 and 13 show a practical example of the configuration including a duplicate transmission flag.

In FIG. 12, a duplicate transmission flag is assigned using a next header in the IPv6 header in an inner packet. In a normally transmitted packet, "0x06" is stored in the next header. In a retransmitted packet in the present embodiment, the next header is set to "0xB6" obtained by adding "B0" to "0x06", and the packet is transmitted to the corresponding node. On the receiving side, when the packet storing the value of "0xB6" is received, it is recognized that is a retransmitted packet. The receiving side determines whether or not the retransmitted packet is received as a duplicate packet. At this time, when the retransmitted packet is duplicate, it is discarded. If it is not duplicate, "B0" is subtracted from the value of the next header, and the value of "0x06" is retrieved.

In FIG. 13, to assign the duplicate transmission flag, a new header is added to the packet shown in FIG. 11. For example, as shown in FIG. 13, a destination option header is added between the IPv6 header and the TCP (transmission control protocol). In FIG. 13, in the destination option header, a flag is used as a duplicate transmission flag.

Embodiment 4

In the present embodiment, the receiving apparatus determines whether of not the retransmission of packets is required. If it is not necessary, the apparatus requests the transmitting mobile node to stop retransmission of packets, thereby stopping the retransmission of packets.

Figure 14:
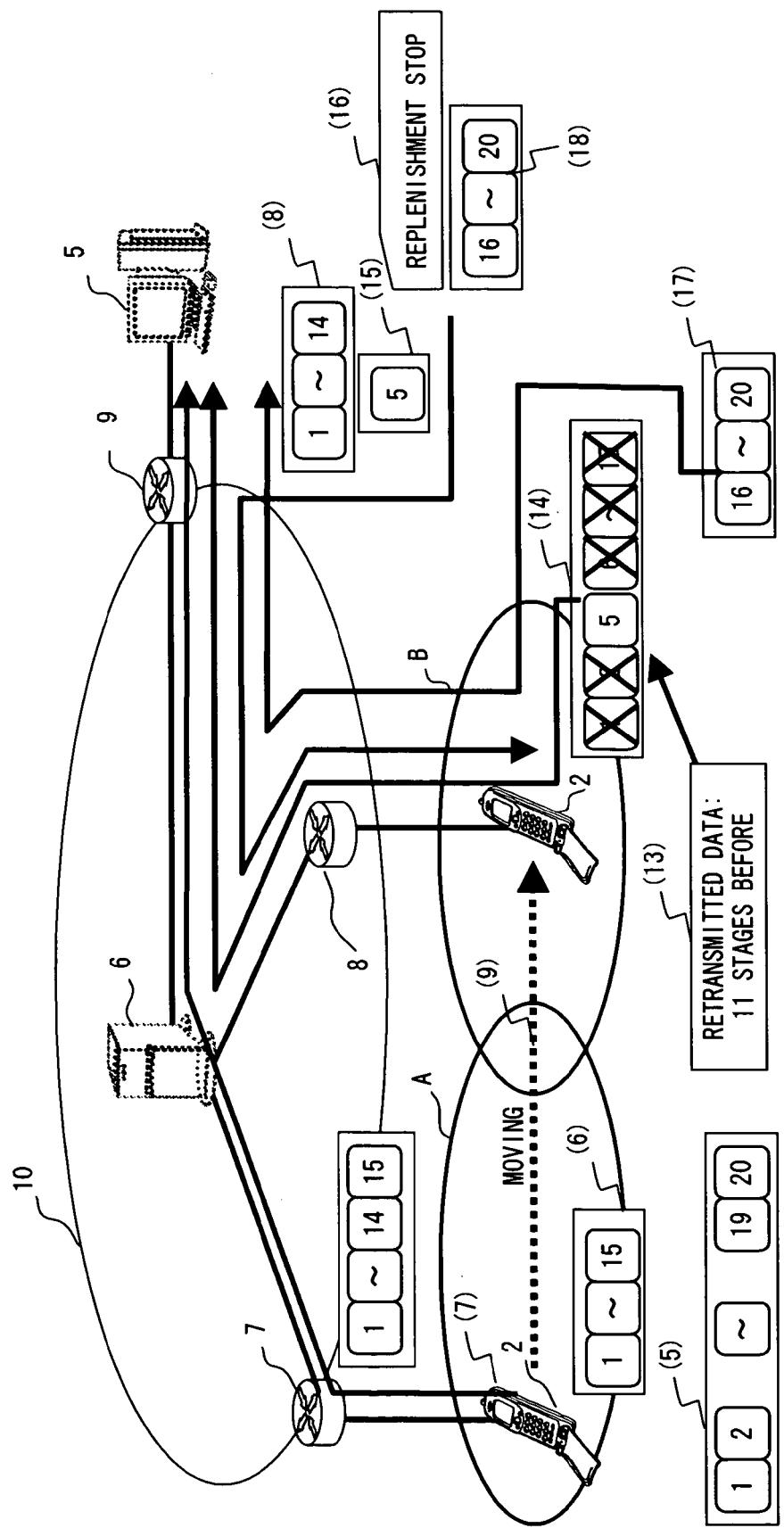
FIG. 14 is an explanatory view of the packet replenishing method according to the fourth embodiment of the present invention.

FIG. 14 is an explanatory view of the packet replenishing method according to the fourth embodiment. Since the processes up to the process of the mobile node 2 position-registered as belonging to the wireless network A are similar to those in the above-mentioned embodiment, the explanation is omitted here. (5) refers to data to be transmitted from the mobile node 2 to the corresponding node 5, and the numbers 1 through 20 in (5) respectively indicate the packets having the data numbers 1 through 20.

When the mobile node 2 transmits packets in the ascending order of the data numbers, it first sequentially stores packets in the transmitted data holding unit 23 shown in FIG. 6, and then transmits them. (6) shown in FIG. 14 indicates the status of storing the packets up to the packet having the data number 15 in the transmitted data holding unit 23. In (7), the transmission control unit 21 shown in FIG. 6 sequentially transmits the packets stored in the transmitted data holding unit 23 in the packets in (5). The receiving corresponding node 5 receives the packets having the data numbers 1 through 14 in (8) shown in FIG. 14.

At this time, by the transfer of the mobile node 2, the handover in (9) occurs. The mobile node 2 which has transferred to belong to the wireless network B performs the position registration. Relating to this, since the above-mentioned explanation holds true, the explanation is omitted here. After the completion of the position registration, the mobile node 2 starts the retransmitting process on the packets stored in the transmitted data holding unit 23 shown in FIG. 6.

In (13) shown in FIG. 14, the replenishment information management unit 24 of the mobile node 2 shown in FIG. 6 issues an instruction to retransmit packets from the packet 11 stages before. At this time, the mobile node 2 completes the transmission of packets up to the packet having the data number 15 in (7). That is, the data number of the packet to be transmitted next is 16. Therefore, in (14), packets are retransmitted from the packet having the data number 5, which is 11 stages before the packet having the data number 16.

Upon receipt of the packet having the data number 5 retransmitted by the replenishment information management unit 24 in (15), the corresponding node 5 determines whether or not the packet bas been received. In FIG. 14, the packet having the data number 5 has been received, it transmit a replenishment stop request to the transmitting mobile node 2 in (16). Upon receipt of the replenishment stop request, the mobile node 2 deletes the data stored in the transmitted data holding unit 23. After deleting the retransmission data, the packets having the data numbers 16 through 20 which has not been transmitted before are transmitted in (17). In (18), the corresponding node 5 receives the packets having the data numbers 16 through 20 transmitted by the mobile node 2, and completes the transmission of data from the mobile node 2.

Thus, in the packet replenishing method according to the fourth embodiment, the corresponding node which receives data receives retransmitted data and determines whether or not the retransmitted data has been received. If it has already been received, it requests the transmitting mobile node to stop the retransmission. In the example shown in FIG. 14, upon receipt of the packet having the data number 5 from the corresponding node, the mobile node 2 receives the replenishment stop request and suppresses the retransmission of the packets having the data numbers 6 through 15. Thus, the retransmission of unnecessary packets can be suppressed.

When the corresponding node 5 receives a retransmitted packet, the data number recognized by the corresponding node 5 as a packet to be next received in the data reception from the mobile node 2 is compared with the data number of the retransmitted packet. If the difference is smaller than a predetermined value, that is, a small value, then the stop request can be suppressed or the corresponding node 5 can place restrictions. Thus, the stop request can be prevented from being frequently issued.

Fifth Embodiment

In the present embodiment, the receiving apparatus notifies the packet transmitter of the data number (sequence number of a packet) of a necessary packet. The transmitting apparatus retransmits the packet at the notification.

Figure 15:
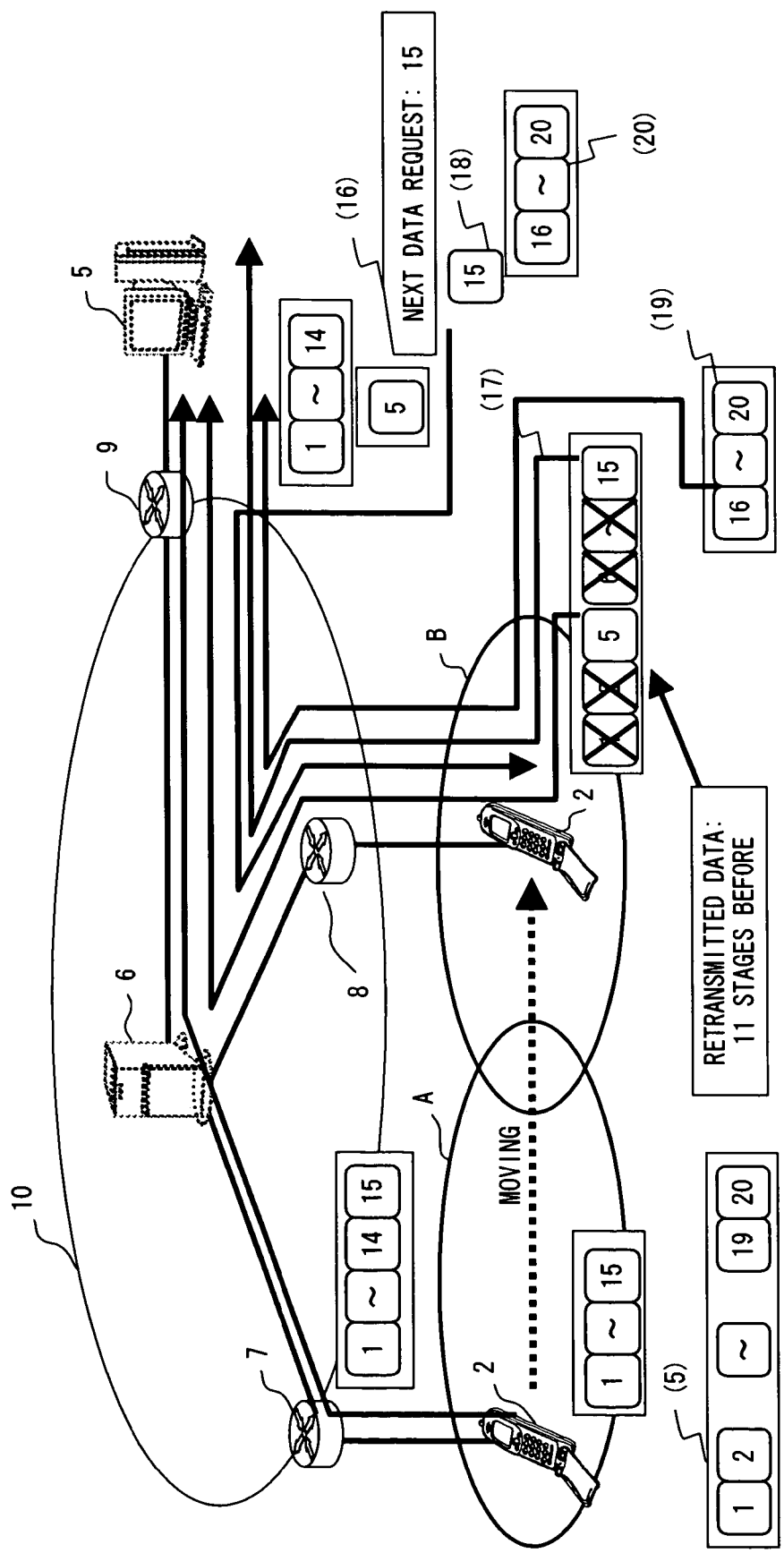
FIG. 15 is an explanatory view of the packet replenishing method according to the fifth embodiment of the present invention.

FIG. 15 is an explanatory view of the packet replenishing method according to the fifth embodiment. The operation after the processes (1) through (15) explained by referring to FIG. 14 are performed is explained below. That is, the packets having the data numbers 1 through 15 are transmitted from the mobile node 2 to the corresponding node 5, and it is assumed that handover occurs during the transmission and the packet having the data number 5 has been retransmitted. Thus, the corresponding node 5 receives the packet having the data number 5 retransmitted by the mobile node 2.

After this, according to the fourth embodiment, a replenishment stop request is transmitted from the corresponding node 5 to the mobile node 2. However, according to the fifth embodiment, the sequence number of the packet to be retransmitted is announced. For example, since the packets having the data numbers 1 through 14 have been received in the example shown in FIG. 15, the number "15" is reported to the mobile node 2 as the next sequence number to be received.

The mobile node 2 which has received the notice of the sequence number to be received next transmits the packet having the data number 15 stored in the transmitted data holding unit 23 shown in FIG. 6 in (17). In (18), the packet having the data number 15 retransmitted from the mobile node 2 at the notice of the sequence number to be received next reaches the corresponding node 5. Thereafter, in (19), the packets that have not been transmitted and have the data numbers 16 through 20 are transmitted, and these packets are received by the corresponding node 5 in (20), thereby terminating the data transmission by the mobile node 2.

Thus, in the packet replenishing method according to the fifth embodiment, when the retransmitted data is received on the data receiving side, the receiving side notifies the transmitting side of the data number of the packet required by the receiving side as the sequence number to be next received. By the receiving side giving a notice of the necessary data number to the transmitting side, the packets can be efficiently retransmitted although there is a difference between the data number recognized by the transmitting side as the completion of the transmission as when handover occurs and the data number recognized by the receiving side as the completion of the reception.

The sequence number to be received next can be the largest number in the data numbers of the packets received by the receiving side. In this case, the mobile node of the transmitting side which has received a notice transmits data in order from the data having the data number of (data number of the data of which a notice was given +1).

Sixth Embodiment

In the present embodiment, packets are retransmitted until the period specified by the receiving apparatus has passed, and the retransmission of packets is stopped at the moment at which the period passes.

Figure 16:
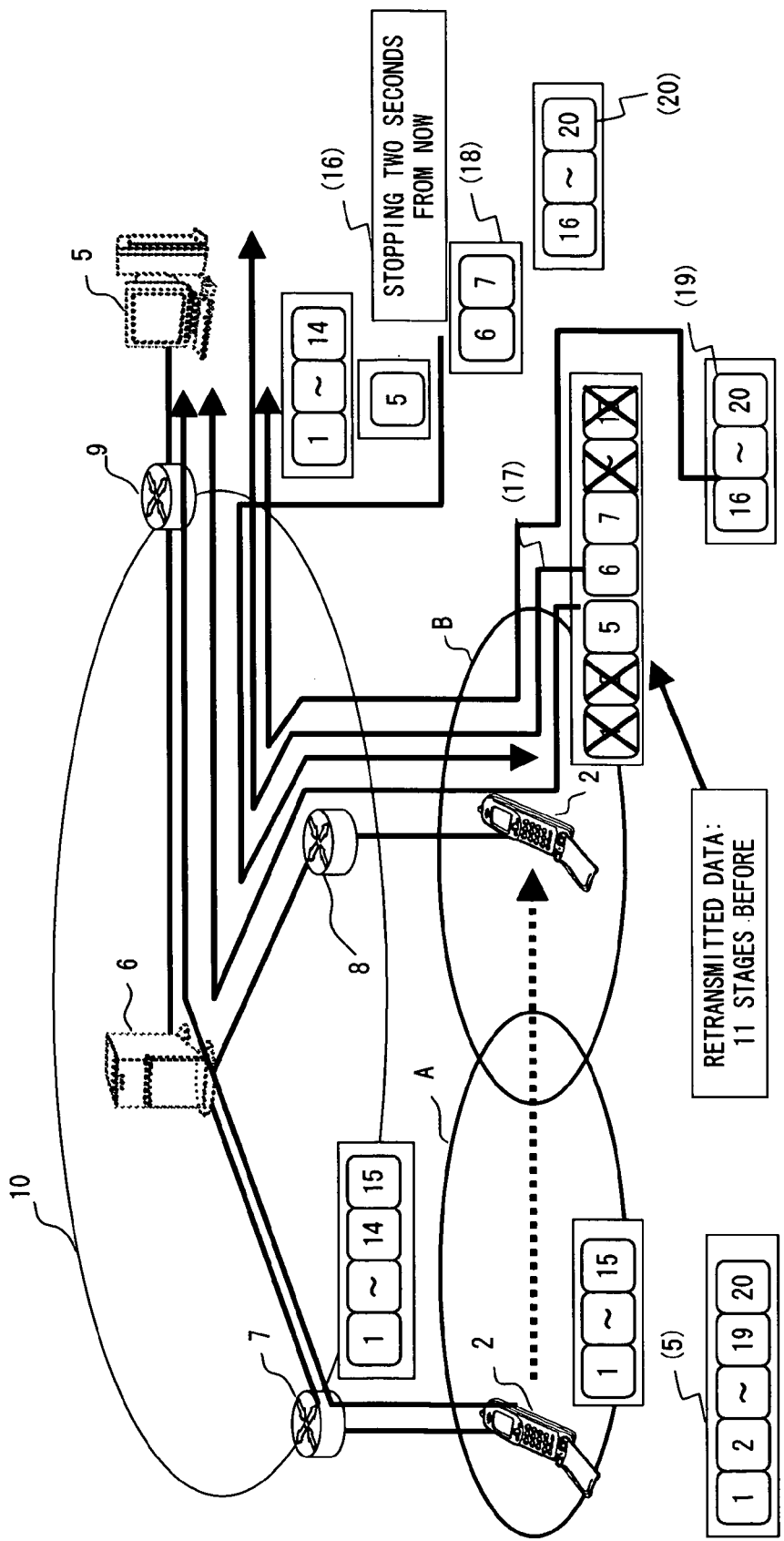
FIG. 16 is an explanatory view of the packet replenishing method according to the sixth embodiment of the present invention.

FIG. 16 is an explanatory view of the packet replenishing method according to the sixth embodiment of the present invention. In FIG. 16, the operation after the processes (1) through (15) explained above by referring to FIG. 14 have been performed is explained below. That is, the packets having the data numbers 1 through 15 are transmitted from the mobile node 2 to the corresponding node 5, and it is assumed that handover occurs and the packet having the data number 5 is retransmitted. Then, the corresponding node 5 receives the packet having the data number 5 retransmitted from the mobile node 2.

Then, in (16), the terminal on the receiving side reports the replenishment effective time (2 seconds in this case) to the mobile node 2.

Upon receipt of the notice of the replenishment effective time, the mobile node 2 activates the timer in (17), and continues the retransmission of a packet. Thus, the packets having the data numbers 6 and 7 are received by the corresponding node 5 in (18).

When the timer expires in the mobile node 2, that is, when the reported replenishment effective time passes, the mobile node 2 stops the retransmitting process. Afterwards, the mobile node 2 starts transmitting data that has not been transmitted in (19). That is, the mobile node 2 transmits the packets having the data numbers 16 through 20. In (20), the packet transmitted from the mobile node 2 is received by the corresponding node 5, thereby terminating the transmission of data.

Thus, in the packet replenishing method according to the sixth embodiment, the period in which packets are retransmitted from the receiving side to the transmitting side is specified. After the passage of the period specified by the receiving side, the mobile node stops the retransmission of packets. Packets are retransmitted in the period specified by the receiving side, and the retransmission is stopped after the passage of the period, thereby suppressing the wasteful retransmission of packets, and enabling the retransmitting process to be performed depending on the situation. Furthermore, the retransmission of packets can be performed depending on the resource of the receiving apparatus.

Seventh Embodiment

In the present embodiment, a mobile node that transmits a packet requests a corresponding node that receives the packet to specify the number of packets or the effective time based on which the determination as to whether of not data have been transmitted as duplicate data. Upon receipt of the request, the corresponding node reports the number of packets or the effective time to the mobile node using a value which can be set by the corresponding node.

Figure 17:
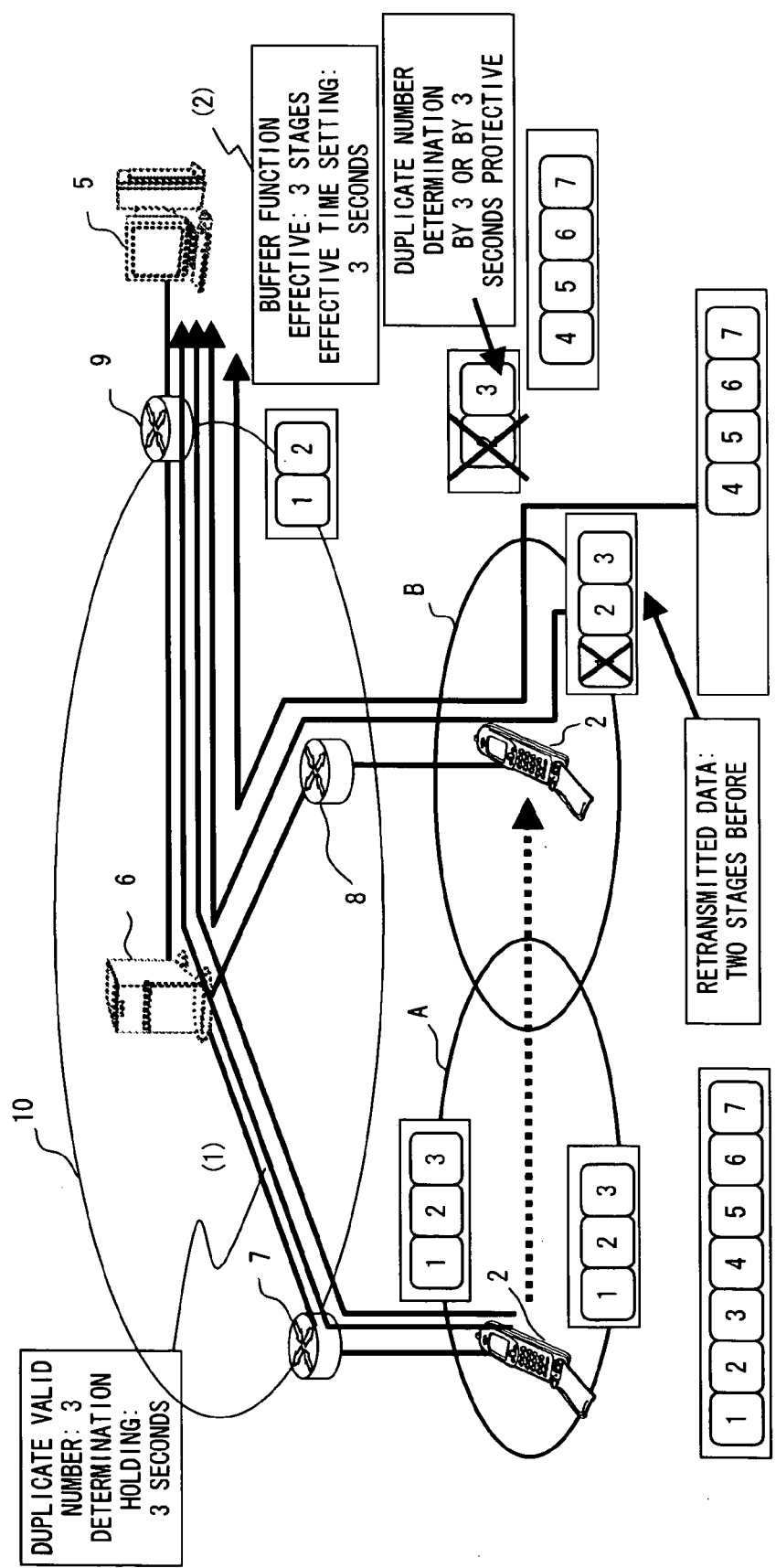
FIG. 17 is an explanatory view of the packet replenishing method according to the seventh embodiment of the present invention.

FIG. 17 is an explanatory view of the packet replenishing method according to the seventh embodiment of the present invention. In the packet replenishing method according to the present embodiment, when a packet is transmitted, the mobile node 2 transmits a duplicate protective request to the corresponding node 5 in (1). In FIG. 17, a request of "number of effective duplicates: 3, determination held: 3 seconds" is transmitted. This requests setting packets of three data numbers or the effective time of three seconds as to whether or not the retransmitted packets have been transmitted.

The corresponding node 5 that has received the duplicate protective request sets the number of packets or the effective time based on the duplicate protective request received from the mobile node 2. In FIG. 17, the buffering capability is enabled to store three packets, or the period in which it is determined whether or not received packets are duplicate packets is set to 3 seconds. The set values are reported to the mobile node 2. As for the packet retransmitting process, the processes similar to those in the first embodiment are performed.

As for the packets retransmitted with the occurrence of handover as a trigger, the number of packets set in the processes in (1) and (2), and based on which it is determined whether or not duplicate packets have been transmitted, or the effective time based on which it is determined whether or not duplicate packets have been transmitted is determined, and a duplicate packet is discarded.

In the example shown in FIG. 17, the corresponding node 5 makes settings at the duplicate protective request from the mobile node 2, but the present invention is not limited to this application. The corresponding node 5 that receives the duplicate protective request can set the above-mentioned number of packets or the value of the effective time in the range in which the process of determining the duplicate packets can be performed, and the set value can be reported to the mobile node 2.

Thus, in the packet replenishing method according to the seventh embodiment, the mobile node that transmits a packet reports the duplicate protective information indicating the time or the amount of the received packet to be buffered to the receiving apparatus. The receiving apparatus determines whether or not each packet is a duplicate packet while buffering the packet received at the duplicate protective information. Thus, the transmitting terminal can determine the process of discarding the retransmitted packet. Otherwise, the receiving apparatus sets the number of packets or the effective time based on which the operation can be guaranteed, and the set value can be returned to the mobile node. In this case, the retransmission of packets can be performed depending on the resources of the receiving apparatus.

Eighth Embodiment

According to the present embodiment, the amount of retransmitted data can be changed based on the network over which the mobile node is establishing communications.

Figure 18:
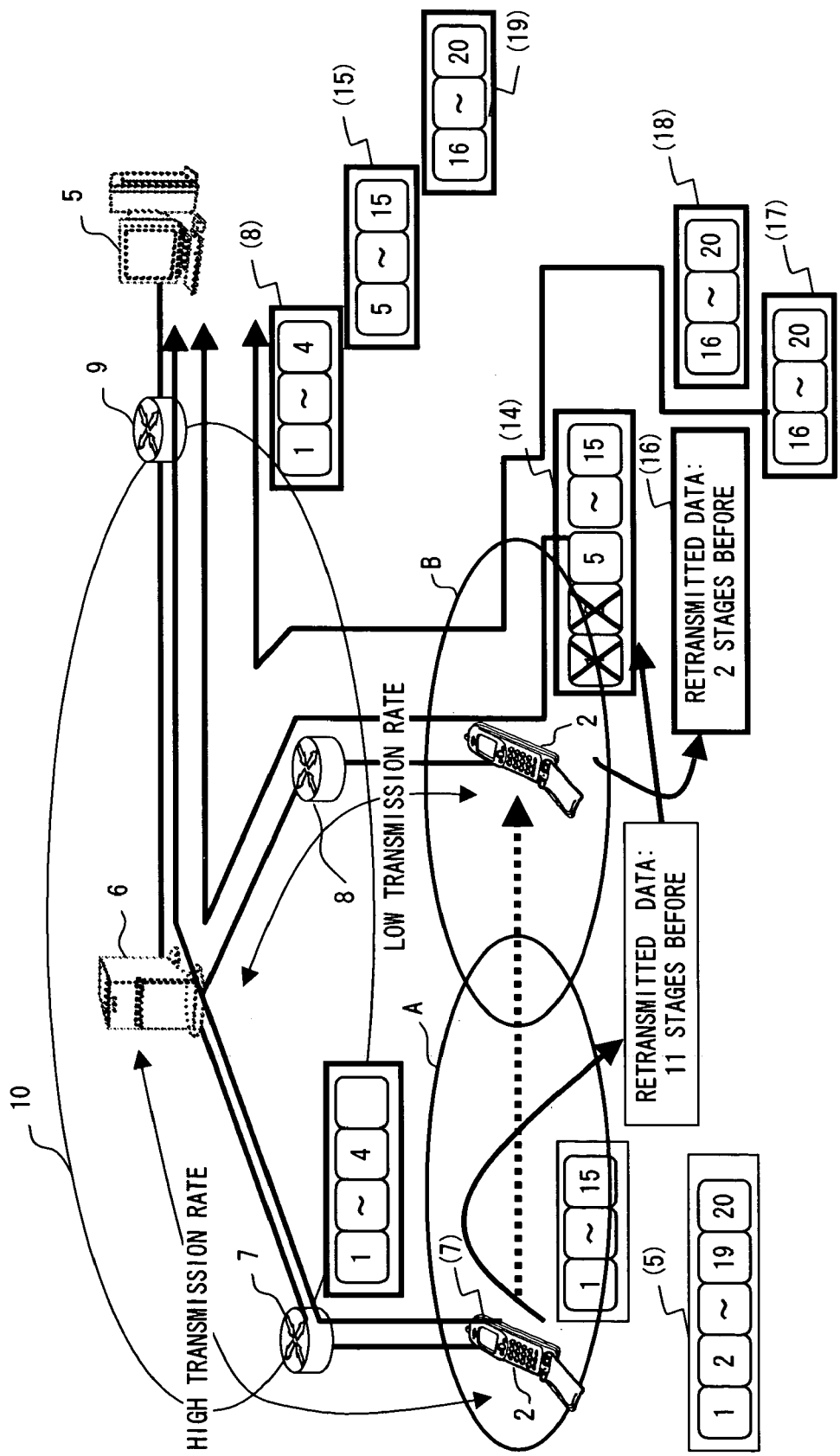
FIG. 18 is an explanatory view of the packet replenishing method according to the eighth embodiment of the present invention.

FIG. 18 is an explanatory view of the packet replenishing method according to the eighth embodiment of the present invention. In FIG. 18, there is different transmission rates between the wireless network A before the transfer and the wireless network B after the transfer, and it is assumed that the transmission route of a packet before the transfer indicates a high rate while the transmission route of a packet after the transfer indicates a low rate.

When the mobile node 2 belongs to the wireless network A, the mobile node 2 has completed the transmission of packets up to the packet having the data number 15. The mobile node 2 transfers to belong to the wireless network B, and handover occurs. When the position registration is completed in the wireless network B, the mobile node 2 starts the packet retransmitting process.

In (14), the packet stored in the transmitted data holding unit 23 in the data link layer is retransmitted based on the data read from the replenishment information management unit 24 shown in FIG. 6. In the example shown in FIG. 18, the retransmission is started with the packet having the data number 5 which is 11 stages before the packet having the data number 16 that is the header of the packets not transmitted yet. In (15), the retransmitted packets having the data numbers 5 through 15 retransmitted from the mobile node 2 are received by the corresponding node 5.

When the retransmission of packets is completed, the packet transmitted from among the packets not transmitted yet is switched from the eleventh stage to the second stage in (16) in the retransmitting process. In (17), the packets not transmitted yet having the data numbers 16 and larger are transmitted. In (18), the packets having the data numbers 16 through 20 transmitted in the process (17) are stored in the above-mentioned transmitted data holding unit 23. In (19), the packets having the data numbers 16 through 20 transmitted from the mobile node 2 are received by the corresponding node 5.

In the above-mentioned packet replenishing method, the number of stages of the retransmitted packets are switched by the transmission rate of the network, but the present invention is not limited to this application. In addition to the transmission rate, the number of stages of the retransmitted packets can be switched by the quality, etc. of the network. Furthermore, the number of stages of the retransmitted packets after the switch in (16) can depends on the wireless network B after the transfer, or depends on the network of the transfer destination. Otherwise, it can be set depending on the amount of transmitted data.

The packet replenishing method according to the present embodiment can be realized by applying an appropriate value on the mobile node 2 depending on the characteristics in the networks different in specifications from the communications in high-speed communications media network such as the wireless LAN, cable LAN, etc. to the communications using low speed media such as the communications using a mobile telephone, communications by dial connection, etc. The transmitting terminal replenishment information management table of the mobile node 2 is explained below by referring to the attached drawings.

FIG. 19 shows the configuration of the transmitting terminal replenishment information management table. The transmitting terminal replenishment information management table stores necessary information for the retransmission of packets for a network performing communications over the Internet 10 shown in FIG. 6, for example, each of the wireless networks A and B.

The media shown in FIG. 19 shows the information for identification of a medium in the media such as a wireless LAN, dial connection, etc.

The selection mode for the retransmission of packets can be "0" as a stored value indicating the media fixed information, and "1" as a stored value indicating the negotiation information. The media fixed information refers to the storage of data fixed to a medium. The negotiation information refers to the storage of data set depending on a response from a destination.

The media fixed information refers to the storage of a fixed value in one or more communications medium network stored in the transmitting terminal replenishment information management table. For example, in FIG. 19, it comprises the number of pieces of retransmitted data and the guarantee time. The number of pieces of retransmitted data stores "11" when, for example, a medium 1 is a wireless network A according to the present embodiment. The number of pieces of retransmitted data indicates the level of the data number for retransmission from the packets to be transmitted in the normal process. The guarantee time indicates the period (for example, "2 seconds") in which the retransmitting process is restricted in time.

The negotiation information refers to the storage of a value depending on the response obtained after the transmission of a message to a destination before retransmission of a packet. For example, the negotiation information in the transmitting terminal replenishment information management table shown in FIG. 19 is configured by the destination identification information, the number of pieces of retransmitted data, and the guarantee time. The destination identification information stores the information for identification of the destination when a communications medium has a plurality of destinations. For example, it can be an IP address, etc. The definition of the number of pieces of retransmitted data and the guarantee time is similar to that of the number of pieces of retransmitted data and the guarantee time of the media fixed information, and the respective values are stored depending on the response from the destination.

The transmitting terminal replenishment information management table stores the information corresponding to each medium (medium 1, 2, . . . medium n). The mobile node reads from the transmitting terminal replenishment information management table the information about the communications media in which the node is located, and sets a necessary value for the retransmission of packets.

The process of retransmitting packets by setting the number of pieces of retransmitted data or the guarantee time using the transmitting terminal replenishment information management table is described later.

FIG. 20 shows an example of a receiving terminal management table provided in the receiving terminal. The receiving terminal retrieves the parameter when a duplicate packet is detected from the table and uses it.

"Presence/absence of duplicate packet detection function" identifies whether or not a packet is to be discarded when the same packets are received as duplicate packets. The "medium" and the "selection mode" are described above by referring to FIG. 19. The "finally held data" refers to the information for identification of last received data, and is updated each time a packet is received. The "number of pieces of retransmitted data" indicates the amount of data for determination as to whether or not the received packet is a duplicate packet. The "guarantee time" indicates the time for determination as to whether or not a received packet is duplicate.

Ninth Embodiment

According to the present embodiment, when the mobile node recognizes that a packet loss occurs during the transmission of a packet from the mobile node to the corresponding node, the above-mentioned packet replenishing method is used.

Figure 21:
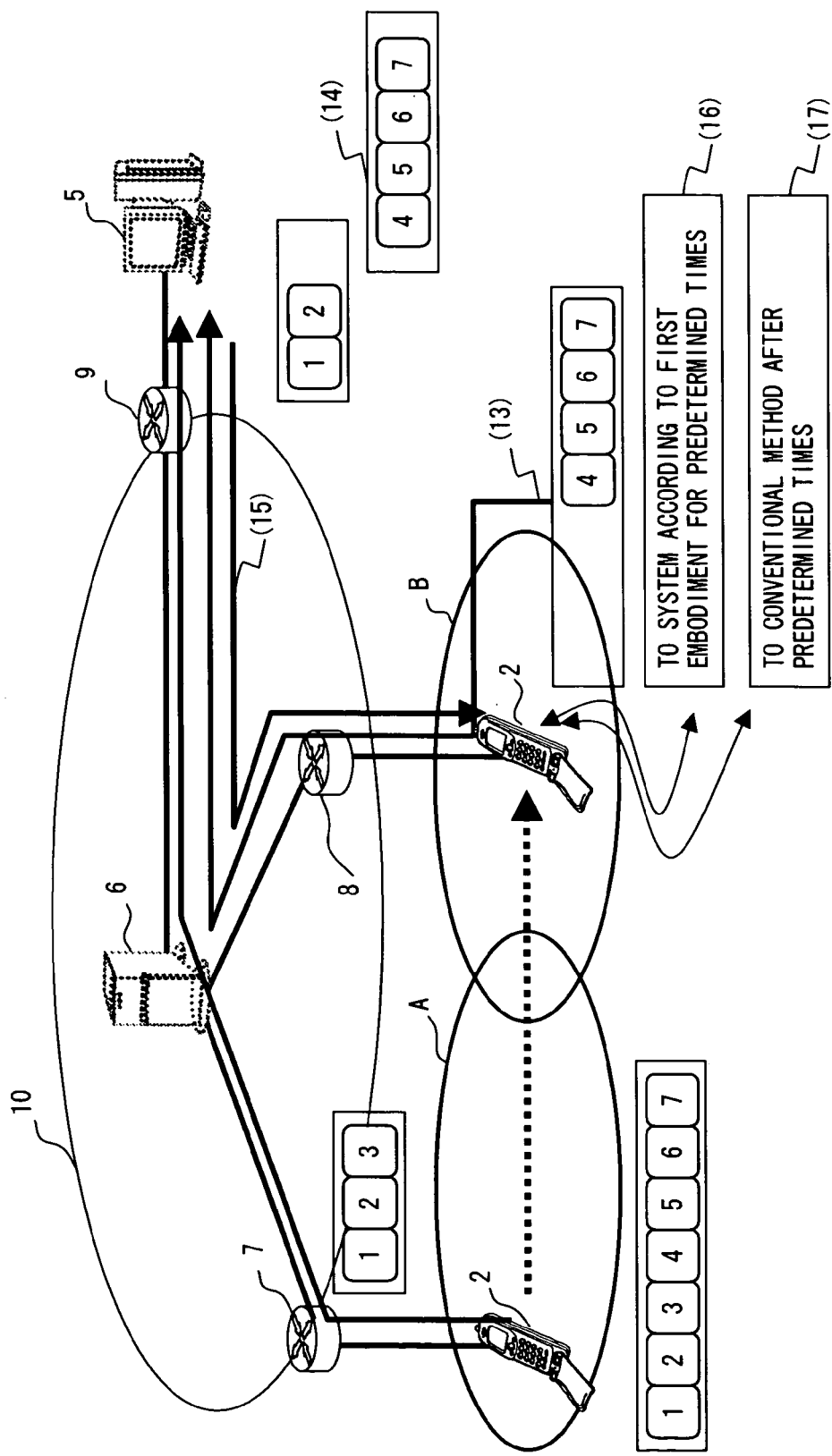
FIG. 21 is an explanatory view of the packet replenishing method according to the ninth embodiment of the present invention.

FIG. 21 is an explanatory view of the packet replenishing method according to the ninth embodiment of the present invention. When the mobile node 2 shown in FIG. 21 transmits the packets having the data numbers 1 through 3 from the wireless network A, handover occurs, and the position registration is completed in the wireless network B after the transfer. Relating to the packet having the data number 3, it is assumed that handover occurs during the transmission, and the packet does not reach the corresponding node 5.

In (13), the mobile node 2 transmits packets which have the data number 4 and the subsequent numbers and have not been transmitted yet from the wireless network B. The corresponding node 5 that receives a packet receives the packets having the data numbers 4 through 7 in (14). Since the packet having the data number 3 has not been received due to the handover, flow control is performed in (15). That is, when the corresponding node 5 recognizes that the packet having the data number 3 has not been received, the flow control is started by the control of the TCP/IP layer. Then, the corresponding node 5 requests the mobile node 2 to retransmit data.

When the flow control is performed, the mobile node 2 also recognizes that a packet has been lost. Then, in (16), the operation mode in which the above-mentioned packet replenishing method is used according to the first embodiment is entered. That is, the mobile node 2 holds the transmitted data in the transmitted data holding unit 23. When handover occurs, the data held in the transmitted data holding unit 23 is retransmitted. Afterwards, the mobile node 2 performs the retransmission of packets each time handover occurs. However, after handover occurs at a predetermined frequency, the mobile node 2 returns to the normal mode in which packets are not retransmitted although handover occurs.

Thus, in the packet replenishing method according to the ninth embodiment, when no packet loss occurs, a normal packet transmission mode in which packets are not retransmitted is performed. However, when a packet loss occurs, packets stored in the data holding unit are retransmitted each time handover occurs. Since packets are appropriately retransmitted depending on the status of transmitting a packet, the wasteful transmission of packets can be suppressed, thereby efficiently transmitting packets.

In the present embodiment, the method of the first embodiment is used as a packet replenishing method, but the present invention is not limited to this application, and any other packet replenishing method according to the other embodiment can be used.

Tenth Embodiment

According to the present embodiment, the corresponding node that receives a packet transmits a request to perform a packet retransmitting process to the mobile node that transmits a packet.

Figure 22:
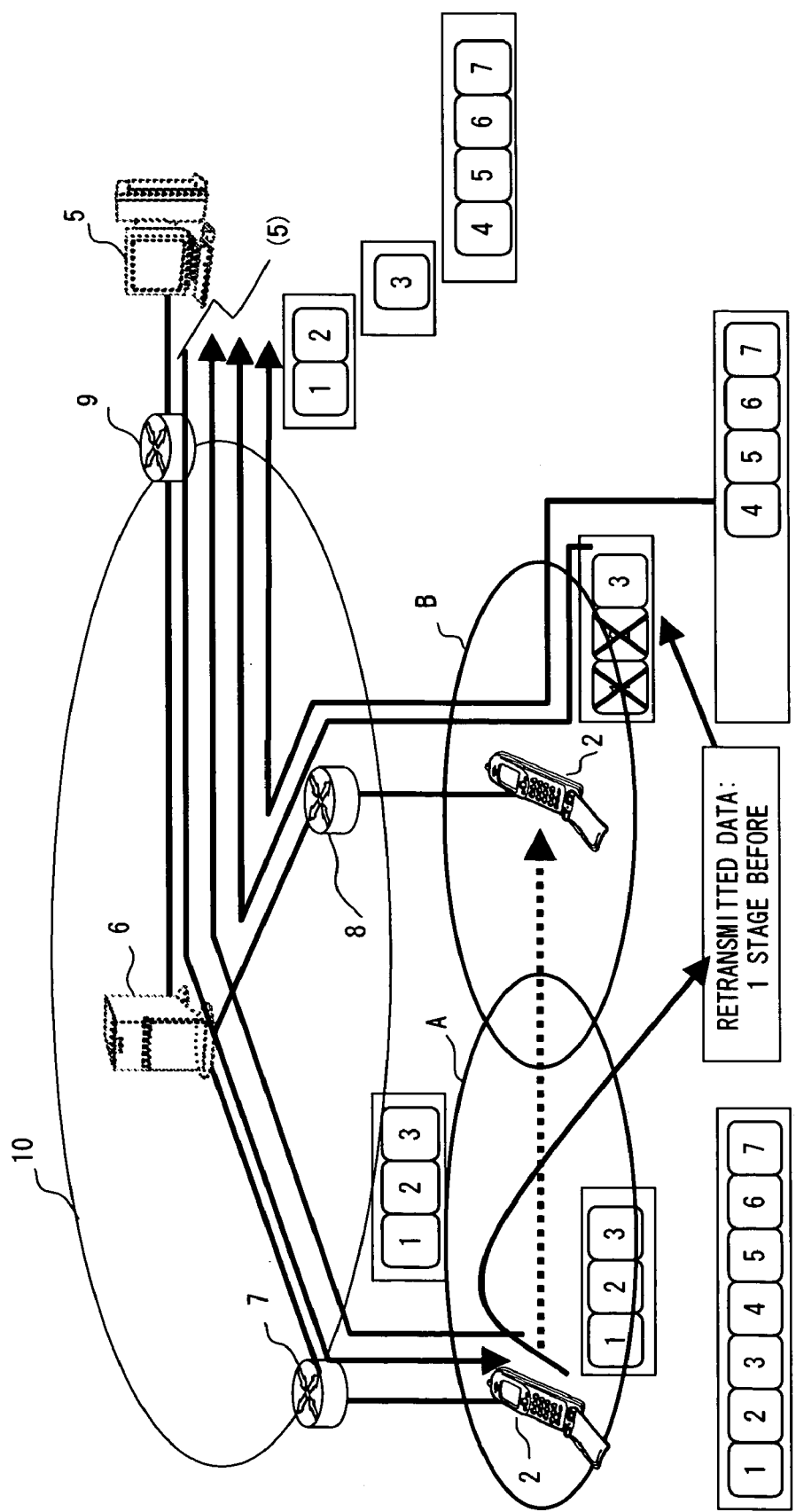
FIG. 22 is an explanatory view of the packet replenishing method according to the tenth embodiment of the present invention.

FIG. 22 is an explanatory view of the packet replenishing method according to the tenth embodiment of the present invention. The mobile node 2 that completes the position registration in the wireless network A starts communications with the corresponding node 5. (5) shown in FIG. 22 indicates the transmission of a replenishment request to replenish a packet from the corresponding node 5 to the mobile node 2 when the mobile node 2 and the corresponding node 5 start communications. The mobile node 2 that receives the replenishment request retransmits packets when handover occurs in the packet replenishing method according to the above-mentioned embodiment.

Eleventh Embodiment

In the present embodiment, the process performed by the corresponding node in the above-mentioned embodiment is performed by the relay node.

Figure 23:
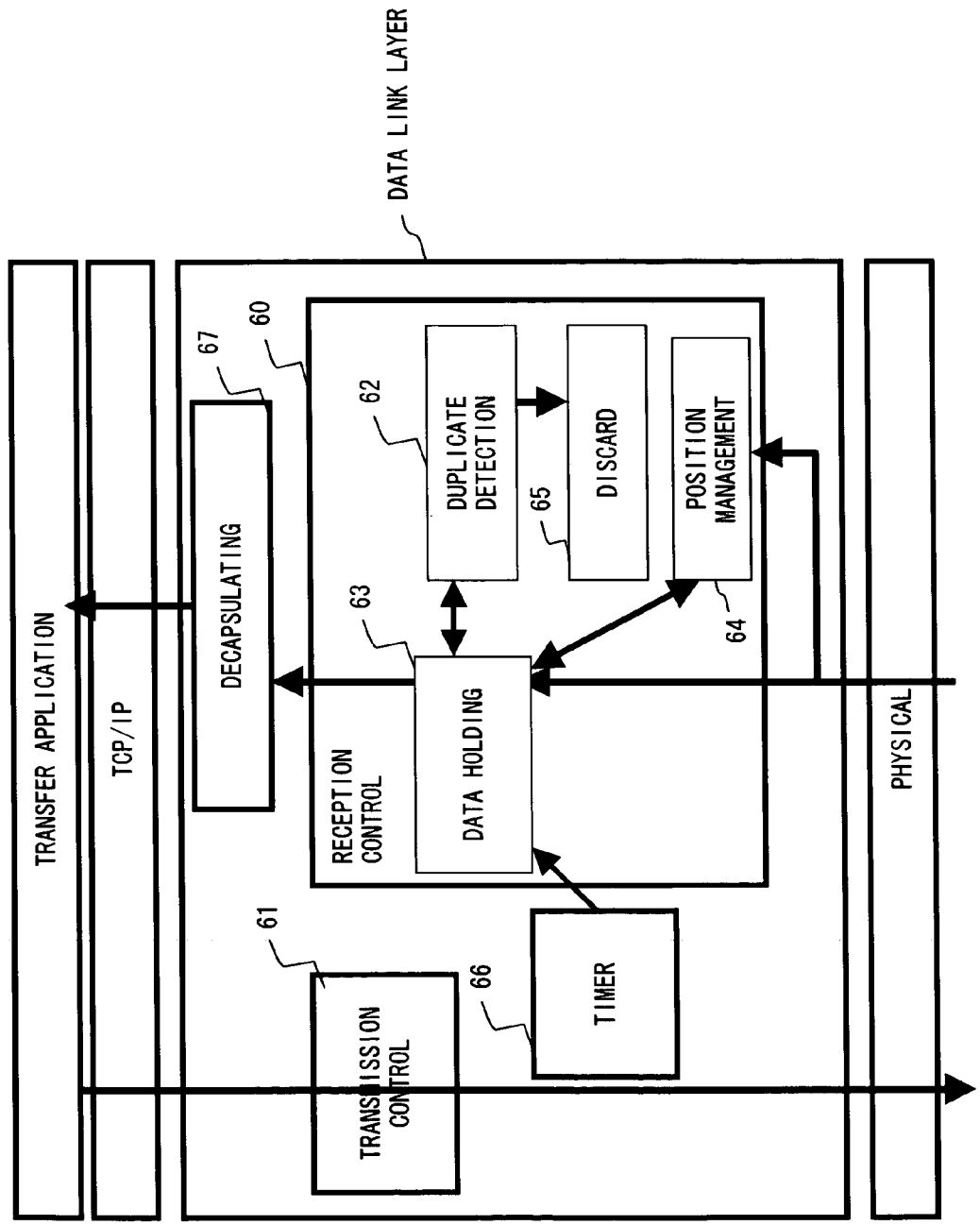
FIG. 23 shows the principle of the relay node according to the present invention.

FIG. 23 shows the principle of the relay node according to the present invention. The relay node is, for example, a home agent of the mobile IPv6, and the data link layer comprises a reception control unit 60 for controlling the reception of a packet transmitted by a mobile node; a transmission control unit 61 for controlling the transmission of a received packet to the corresponding node; a timer unit 66 having a timer function; and a decapsulating unit 67.

The reception control unit 60 controls the reception of packets retransmitted from the mobile node in addition to the control of the reception of packets from the mobile node in the normal communications. The reception control unit 60 comprises a duplicate detection unit 62, a data holding unit 63, a position management unit 64, and a discard unit 65. The duplicate detection unit 62 determines whether or not the packet retransmitted from the mobile node is duplicate with the packet already received in the normal packet receiving process. The data holding unit 63 stores a packet capsulated and transmitted from a mobile node to a corresponding node. The position management unit 64 manages the position registration information indicating to which network the mobile node belongs. The discard unit 65 discards what is determined as unnecessary in the packets received from the mobile node.

The transmission control unit 61 controls the process of transmitting a packet received from a mobile node to a corresponding node. The timer unit 66 manages the time required in performing the process by the reception control unit 60. The decapsulating unit 67 decapsulates a packet which has been capsulated and transmitted, and passes it to an upper layer.

Figure 24:
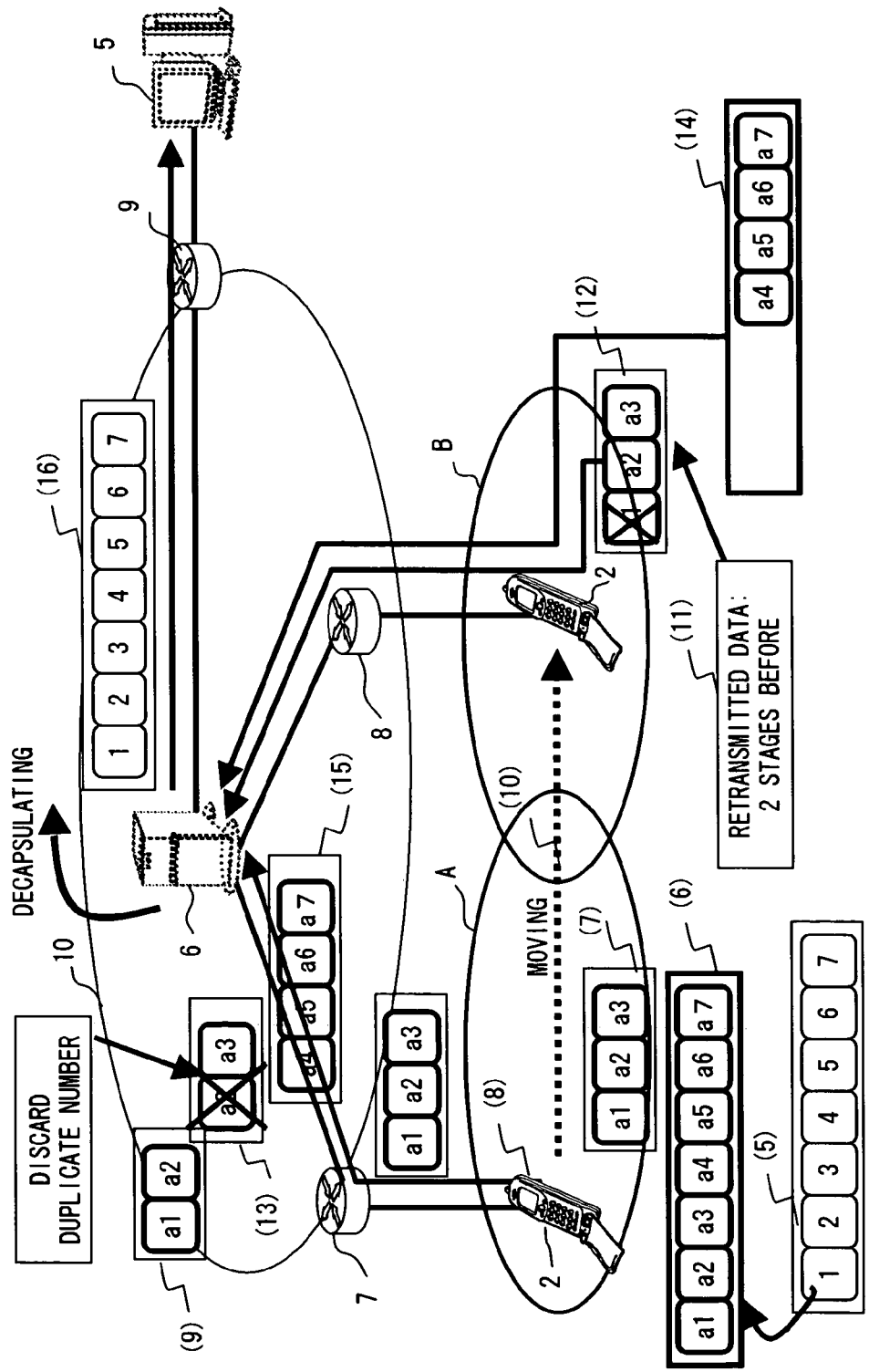
FIG. 24 is an explanatory view of the packet replenishing method according to the eleventh embodiment of the present invention.

FIG. 24 is an explanatory view of the packet replenishing method according to the eleventh embodiment of the present invention. First, the mobile node 2 performs the position registration under the wireless network A. The operation is similar to the operation of the mobile node in (1) through (4) according to the first embodiment. The position registration information under the wireless network A is registered as the position registration information A in the position management unit 64 shown in FIG. 23.

(5) shown in FIG. 24 is the data to be transmitted by the mobile node 2. To transmit data to the relay node 6, the packet in (5) is capsulated. In (6), a capsulated packet is assigned a sequence number. A packet capsulated and assigned a sequence number is transmitted by the mobile node 2 to the relay node 6.

In (7), the capsulated packet to be transmitted to the relay node 6 is buffered in the storage unit in the mobile node 2. In (8), the packets having the sequence numbers a1, a2, and a3 are transmitted to the relay node 6. The relay node 6 receives the packets having the sequence numbers a1 and a2. The received packet is stored in the data holding unit 63 shown in FIG. 22 as in (9). A packet is stored in the data holding unit 63 and the timer is activated by the timer unit 66. The timer activated here has an effective time for restriction of the period in which a packet is stored in the data holding unit 63. When the timer expires, the packet is decapsulated by the decapsulating unit 67.

When the relay node 6 receives the sequence numbers a1 and a2, the mobile node 2 in (10) moves to another network. Under the wireless network B after the transfer, the mobile node 2 performs position registration.

When the mobile node 2 recognizes the occurrence of handover (otherwise, upon receipt of a request to retransmit a packet from the relay node 6), the packets having the sequence numbers a2 and a3 in the packets buffered in the process of (7) are retransmitted in (12).

The duplicate detection unit 62 shown in FIG. 23 of the relay node 6 determines in (13) whether or not a retransmitted packet has been received as a duplicate packet. In this example, since the packet having the sequence number a2 has already been stored in the data holding unit 63, it is discarded by the discard unit 65. When the retransmission of packets is completed, the packet which has not been transmitted and has the sequence number a4 and the subsequent packets is transmitted to the relay node 6 in (14). In (15), the relay node 6 receives the packets having the sequence number a4 and the subsequent packets transmitted by the mobile node 2.

When the relay node 6 receives the packets having the sequence numbers a1 through a7, the transmission control unit 61 shown in FIG. 23 transmits the packets to the mobile node 2 in the process in (16).

In the example shown in FIG. 24, when the first position registration is performed (position registration in the wireless network A), the position management unit 64 generates the position registration information, and determines within a time specified by a timer whether or not a retransmitted packet has been received as a duplicate packet, but the present invention is not limited to this application. For example, when the mobile node first performs the position registration, the position management unit 64 does not have to generate position registration information. In this case, handover occurs, the position registration information is first generated with the timing of performing position registration in the network after the transfer, and is registered in the position management unit 64. When the position registration information is generated and is registered in the position management unit 64, the relay node determines the received packet as a duplicate packet.

When a packet is not received in the ascending order of the data number by the occurrence of handover, the timer is activated, and when a predetermined period passes, the process in and after (13) shown in FIG. 24 can be performed. When packets are retransmitted and the data numbers of the received packets are arranged in the ascending order, the decapsulating process is performed, and a packet can be transmitted to the corresponding node 5. Thus, in the abovementioned procedure, the time required in transferring packets can be shortened.

In the eleventh embodiment, as in the third embodiment, the mobile node 2 can set a duplicate transmission flag in the retransmitted packet. In this case, the duplicate detection unit 62 provided in the relay node 6 determines whether or not only the packet set with the duplicate transmission flag is duplicate in the received packets.

Figure 25:
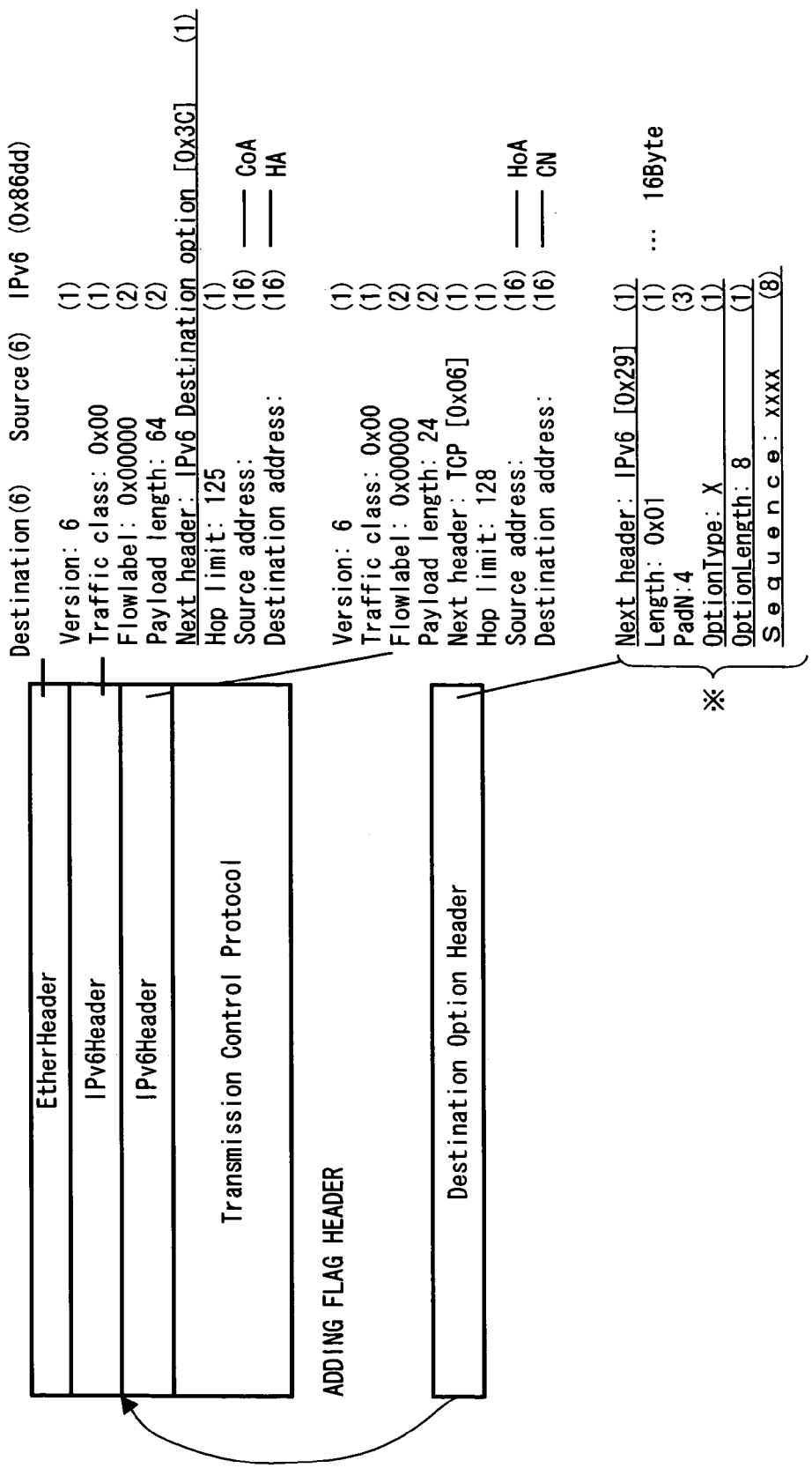
FIG. 25 shows an example of a configuration including a duplicate transmission flag according to the eleventh embodiment of the present invention.

The duplicate transmission flag is further described below. FIG. 25 shows an example of the configuration when the duplicate transmission flag is embedded in the packet transmitted by the mobile node to the relay node. As shown in FIG. 25, the duplicate transmission flag is realized by adding the destination option header between, for example, the IPv6 headers.

The mark * shown in FIG. 25 indicates the contents of the destination option header. Among the contents, the sequence stores the value of "xxxx" in FIG. 25. The option type stores the value of "x" in FIG. 25. The option type uses a code not used elsewhere, and discriminates whether or not the transmitted packet is a retransmitted packet.

Thus, in the packet replenishing method according to the eleventh embodiment, when the mobile node retransmits a packet after the occurrence of handover, the relay node discards the received packet as a duplicate packet, thereby reducing the load of the corresponding node.

Twelfth Embodiment

In the present embodiment, the mobile node detects a change in intensity of a radio wave in a network, and retransmits a packet.

Figure 26:
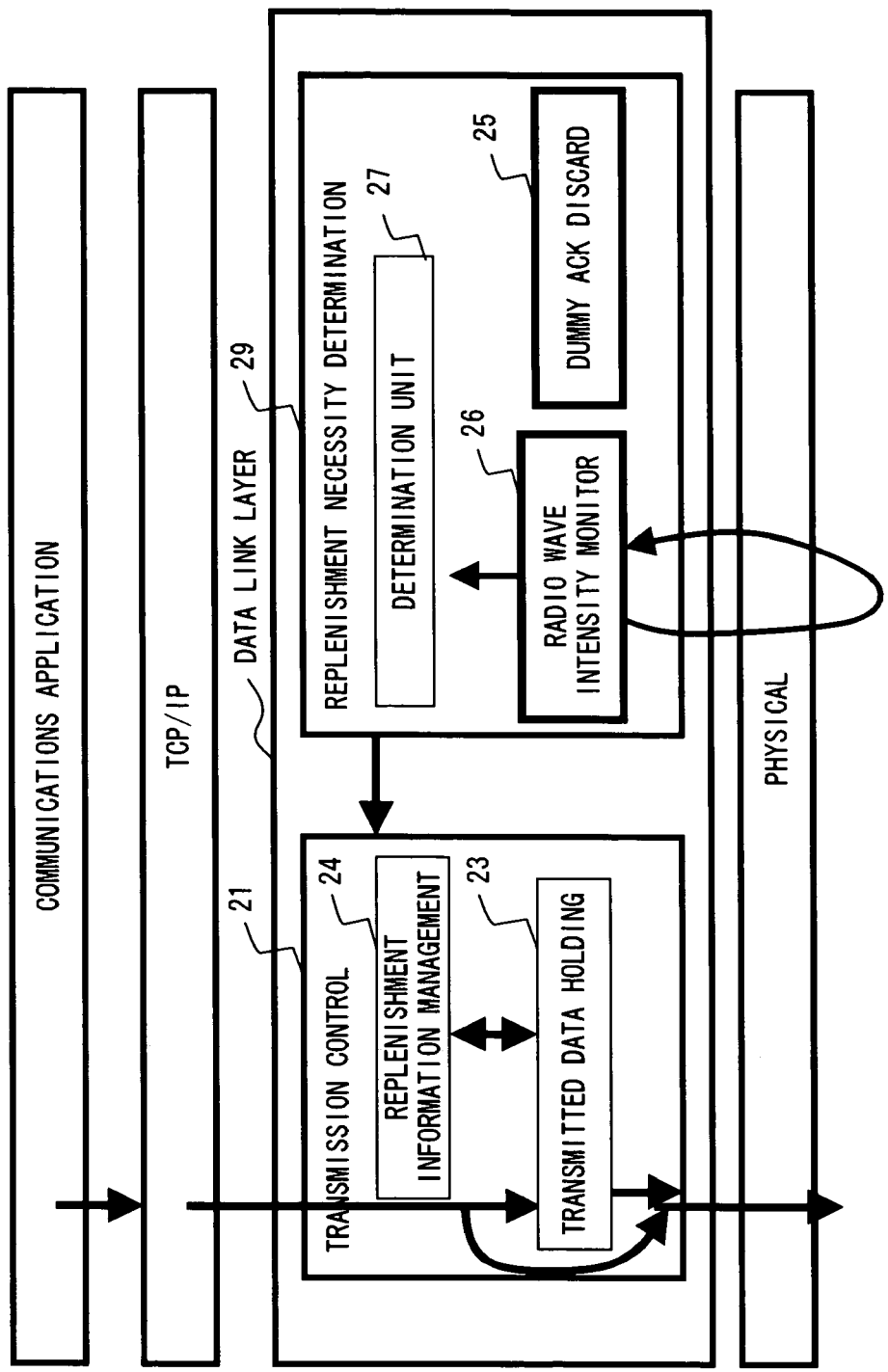
FIG. 26 shows the principle of the mobile node for replenishment of a packet depending on the intensity of a radio wave.

FIG. 26 shows the principle of the mobile node for replenishing a transmitted packet depending on the intensity of a radio wave. The mobile node comprises in the data link layer the transmission control unit 21 and a replenishment necessity determination unit 29. Since the transmission control unit 21 is the same as that shown in FIG. 6, the explanation is omitted here.

The replenishment necessity determination unit 29 comprises in the network movement detection unit 22 shown in FIG. 6 the radio wave intensity monitor unit 26 and a determination unit 27. The radio wave intensity monitor unit 26 monitors the intensity of the radio wave of the network in which the position of the mobile node is registered. The determination unit 27 compares the intensity of a radio wave of the network monitored by the radio wave intensity monitor unit 26 with the threshold.

Figure 27:
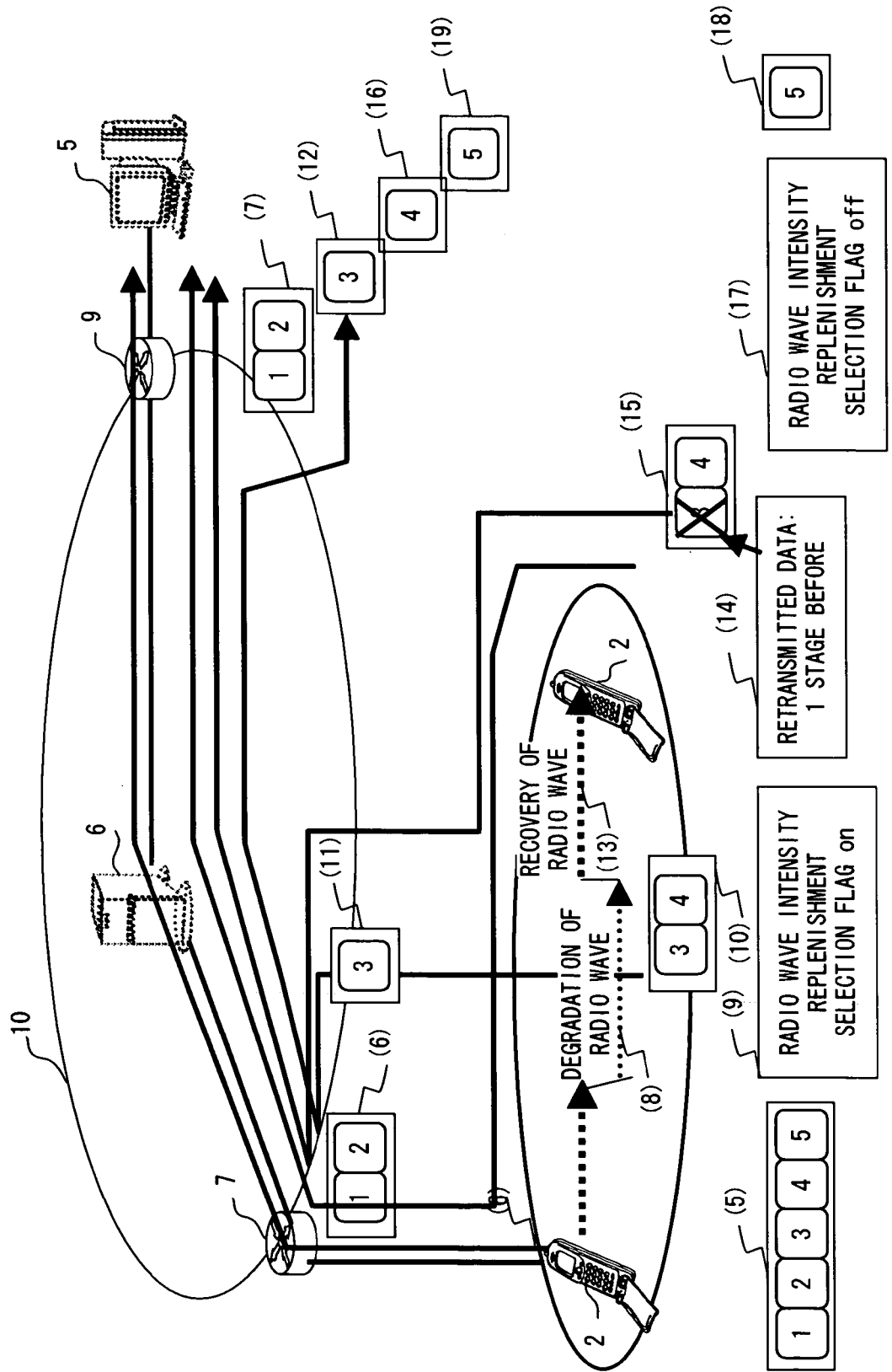
FIG. 27 is an explanatory view of the packet replenishing method according to the twelfth embodiment of the present invention.

FIG. 27 is an explanatory view of the packet replenishing method according to the twelfth embodiment of the present invention. In the wireless network A, the position of the mobile node is registered. The mobile node 2 is transmitting the packets (5) having the data numbers 1 through 5 to the corresponding node 5.

In (6), the mobile node 2 transmits the packets having the data numbers 1 and 2 to the corresponding node 5. In (7), the corresponding node 5 receives the packets having the data numbers 1 and 2. The radio wave intensity monitor unit 26 detects that the intensity of a radio wave has been reduced in the wireless network A. The detection is realized by the 27 comparing a predetermined first threshold with the intensity of a radio wave.

When it is detected that the intensity of a radio wave is smaller than the first threshold, the radio wave intensity replenishment selection flag is set in (9). When the radio wave intensity replenishment selection flag is set, the operations of the replenishment information management unit 24 and the transmitted data holding unit 23 are started.

In the process in (6), the packets up to the packet having the data number 2 have been transmitted. Therefore, the transmission is resumed from the next data having the data number of 3. In (10), since the radio wave intensity replenishment selection flag has been set, the transmitted data having the data numbers 3 and 4 is stored in the transmitted data holding unit 23 shown in FIG. 26.

(11) indicates that the packet having the data number 4 is transmitted when the intensity of a radio wave is low and the packet is lost when it is transmitted from the mobile node 2 to the corresponding node 5. Therefore, as shown in (12), the corresponding node 5 receives only the packet having the data number 3 in the packet transmitted by the mobile node 2 in the process in (10).

In (13), the intensity of a radio wave recovers. In this process, the intensity of a radio wave has exceeded the second threshold higher than the first threshold. Then, as shown in (14), the replenishment information management unit 24 indicates the retransmission of a packet at 1 stage before as retransmitted data. In (15), at an instruction of the replenishment information management unit 24, the packet having the data number 4 at one stage before the packet having the data number 5 which is transmitted in the normal transmitting process is retransmitted. The packet having the data number 4 retransmitted by the mobile node 2 is received by the corresponding node 5 in (16).

In (17), the mobile node 2 turns off the radio wave intensity replenishment selection flag. After resetting the flag, the mobile node 2 transmits the packet having the data number 5 which is data not yet transmitted to the corresponding node 5 in (18). (19) indicates that the packet having the data number 5 is received by the corresponding node 5.

Thus, in the packet replenishing method according to the twelfth embodiment, the mobile node monitors the intensity of a radio wave in a network, and retransmits the packet transmitted in the period in which the intensity of a radio wave recovers to the second threshold from the moment when the intensity of a radio wave becomes lower than the first threshold. Thus, the loss of a packet by the temporarily lowered intensity of a radio wave can be replenished.

The determination of setting the radio wave intensity replenishment selection flag in the ON/OFF position by the comparison between the first or second threshold and the intensity of a radio wave is performed based on the replenishment necessity determination table. The replenishment necessity determination table comprises a medium, a radio wave intensity replenishment selection flag, a replenishment information transmission start radio wave threshold (above-mentioned second threshold) and its radio wave intensity protective number, and a replenishment start radio wave intensity threshold (above-mentioned first threshold) and its radio wave intensity protective number.

The medium stores information about a medium to be monitored by the radio wave intensity monitor unit 26. In this example, for example, the information about the "wireless network A" or "wireless network B" is stored. The radio wave intensity replenishment selection flag identifies whether or not the packet replenishing process is to be performed.

The replenishment information transmission start radio wave threshold is compared with the actually measured intensity of a radio wave in determining after the completion of the packet retransmitting process whether or not the packet transmitting process is to be resumed in (13) shown in FIG. 27. The m stages of radio wave intensity protective number is used as a reference value when it is determined whether or not the transmission of a packet is to be started. If the reduced intensity of a radio wave is recovered, becomes increased, and exceeds the replenishment information transmission start radio wave threshold m times or more consecutively, then it is determined that the transmission of packets are to be resumed.

The

The replenishment start radio wave intensity threshold is compared with the actually measured intensity of a radio wave when it is detected that the intensity of a radio wave in the wireless network A has been reduced in (8) shown in FIG. 27 in the transmission of a packet. The n stages of the radio wave intensity protective number is used as the reference value when it is determined that the retransmission of packets is started. When the intensity of a radio wave is gradually reduced and becomes smaller than the replenishment start radio wave intensity threshold consecutively n times or more, it is determined that the packet retransmitting process is started.

As described above, in the packet replenishing method according to the twelfth embodiment, packets can be appropriately retransmitted.

Figure 29:
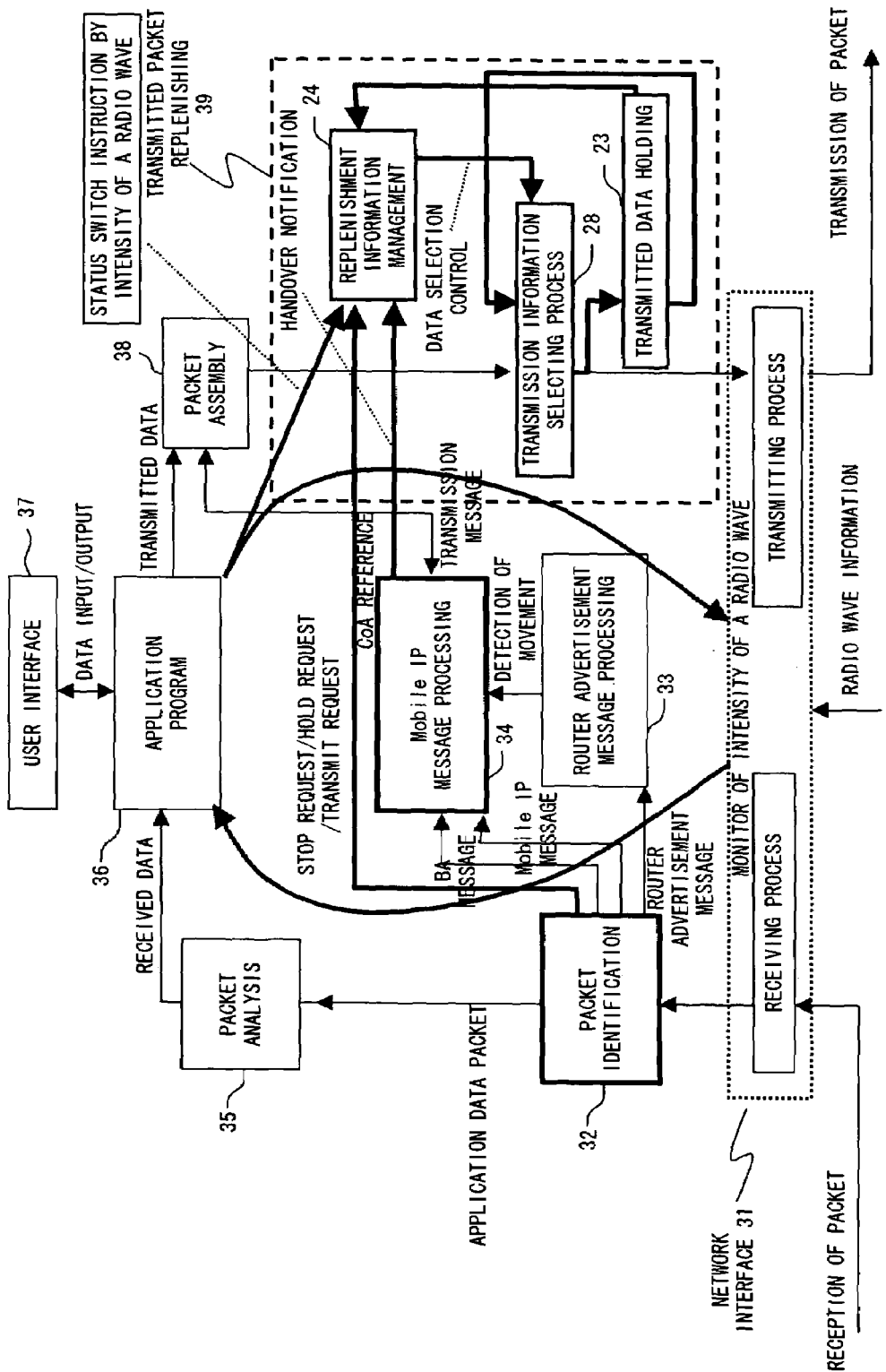
FIG. 29 is a block diagram of a transmitting terminal.
Figure 30:
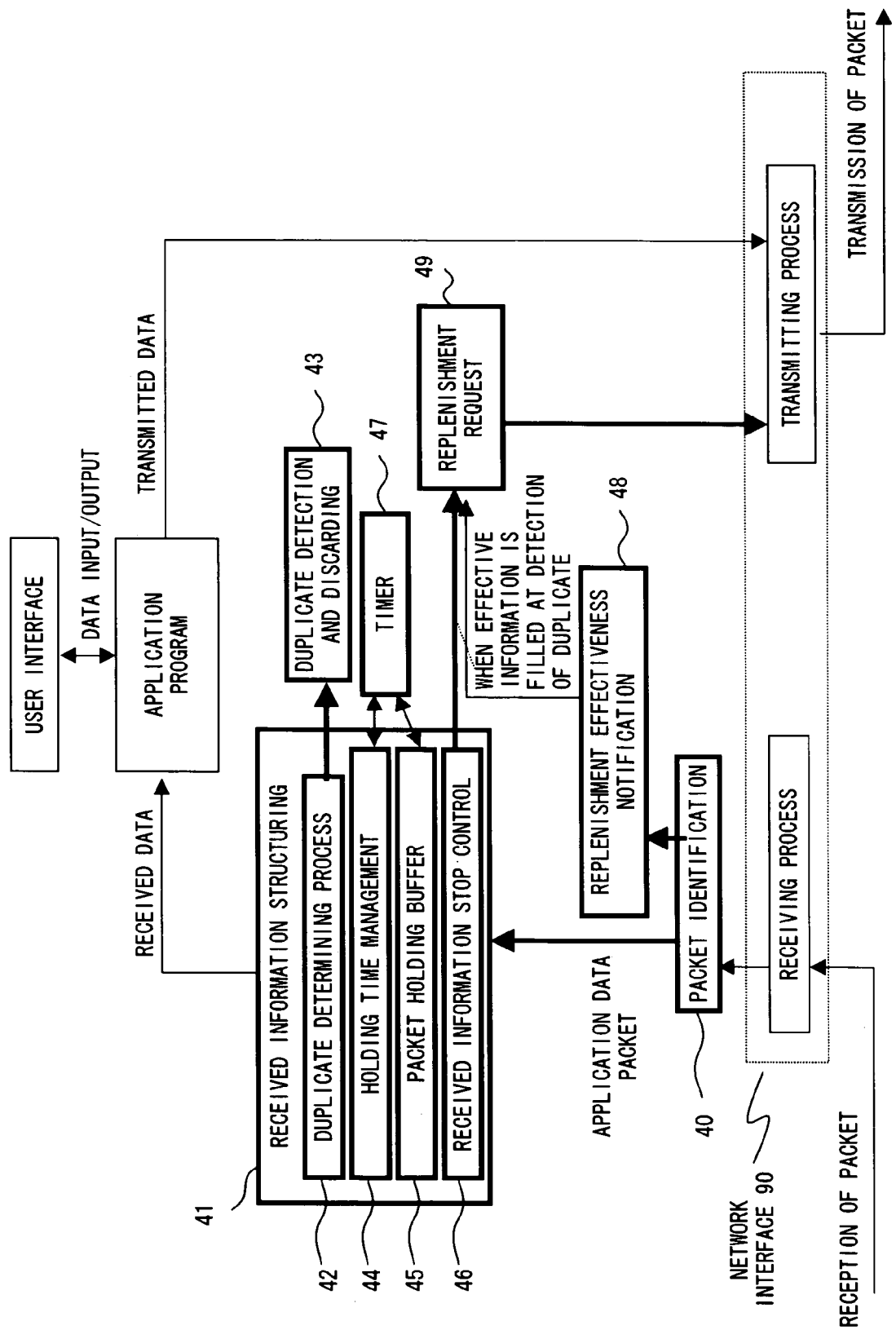
FIG. 30 is a block diagram of a receiving terminal.
Figure 31:
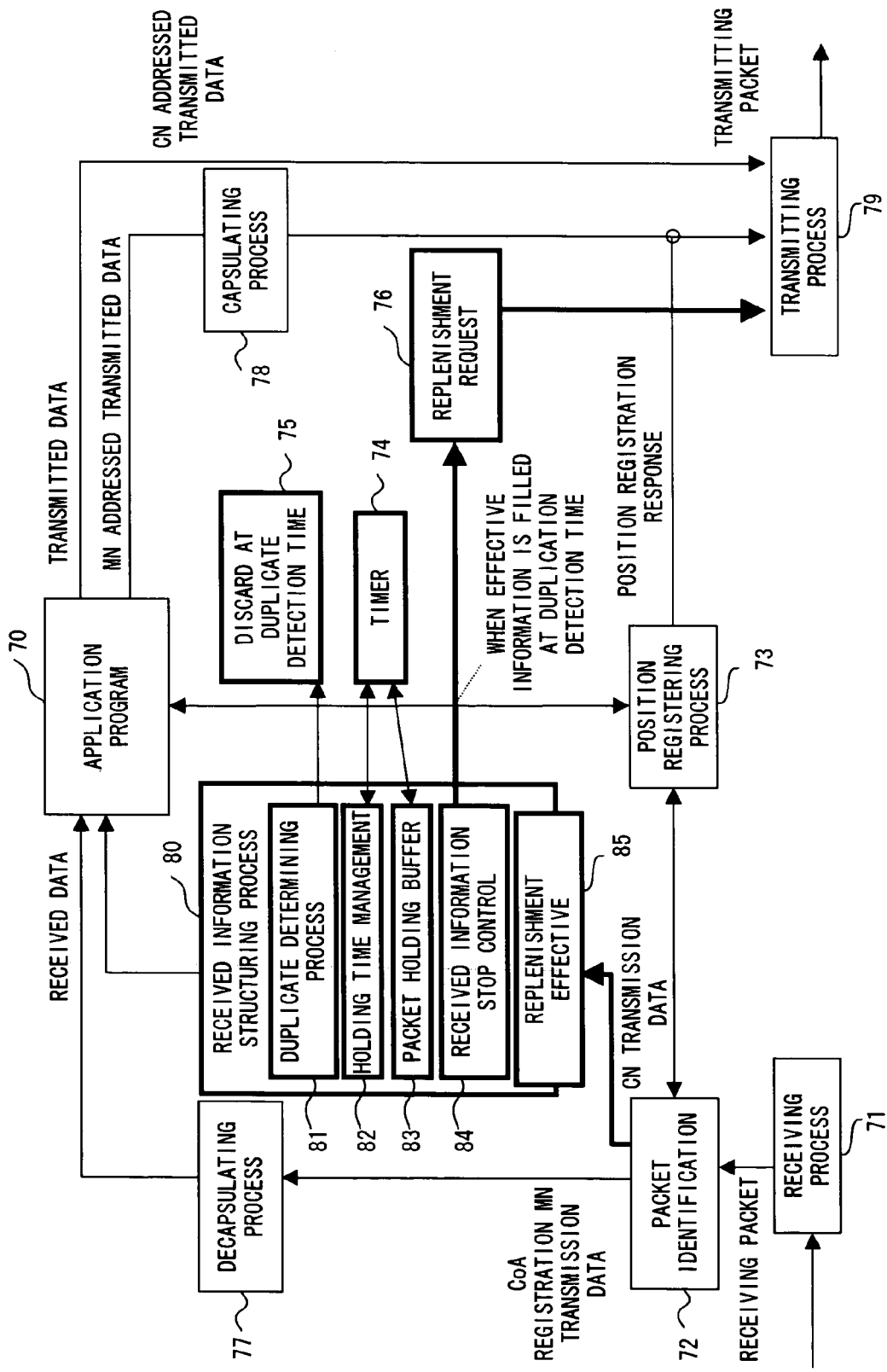
FIG. 31 is a block diagram of a relay node.

Explained above is the embodiment of a packet replenishing method in which a packet is retransmitted to avoid a loss of a packet due to the handover or the change in intensity of a radio wave, and a packet is replenished. The optimum packet replenishing method according to the above-mentioned embodiment is selected and performed using a packet transmitted and received among a mobile node which is a transmitting terminal, a corresponding terminal which is a receiving terminal, and a relay node. FIGS. 29, 30, and 31 are block diagrams of a transmitting terminal, a receiving terminal, and a relay node respectively. By referring to the block diagrams, the process of selecting and performing the optimum packet replenishing method from among the packet replenishing methods relating to the above-mentioned embodiment is explained below.

First, the process of a transmitting terminal is explained. FIG. 29 is a block diagram of the transmitting terminal. A transmitted packet replenishing unit 39 shown in FIG. 29 corresponds to the replenishment information management unit 24, the transmitted data holding unit 23, and the dummy ACK discard unit 25 shown in FIG. 6. By referring to FIG. 29, the process of the transmitting terminal replenishing a packet according to the packet message or the radio wave information about the intensity of a radio wave is explained.

The transmitting terminal receives a packet from the network through a network interface 31. The type of the received packet is identified by a packet identification unit 32.

When the received packet is an application data packet, a packet analysis unit 35 extracts data in the packet. The external device data is passed to an application program unit 36. The application program unit 36 transmits the extracted data to the device through a user interface 37.

When data is transmitted, the transmitted data is passed from the application program unit 36 to a packet assembly unit 38. The packet assembly unit 38 performs necessary process for the transmission of packets by assigning a header to transmitted data, etc. The structured packet is stored in the transmitted data holding unit 23 by a transmission information selecting unit 28, and is transmitted through the network interface 31.

When a received packet is a mobile IP message or a BA message (binding Acknowledgement message) indicating the completion of position registration, a mobile IP message processing unit 34 performs the process.

When the received packet is a router advertisement message, a router advertisement message processing unit 33 performs the process. When the router advertisement message processing unit 33 detects that the mobile node has moved to a communications area of another access router according to the router advertisement message, it notifies the mobile IP message processing unit 34 of it. The mobile IP message processing unit 34 notifies the transmitted packet replenishing unit 39 of the occurrence of handover, and issues an instruction to retransmit a packet.

The replenishment information management unit 24 manages the retransmitted packet number or the retransmission time based on the transmitting terminal replenishment information management table. Based on the value of the replenishment information management unit 24, the transmission information selecting unit 28 specifies the packet to be retransmitted, and reads the specified packet from the transmitted data holding unit 23. The transmission information selecting unit 28 transmits the read packet through the network interface 31.

When the message of the received packet is a stop request, a hold request, or a transmit request respectively referring to the stop of retransmission of packets, storage of packets, or retransmission of packets, the message is passed to the replenishment information management unit 24 of the transmitted packet replenishing unit 39. The replenishment information management unit 24 stores or updates the information relating to the packet retransmitting process (including the stop of retransmitting process) according to the message. When the message is a stop request, the replenishment information management unit 24 stops transmitting packets. When it is a hold request, the packet to be transmitted is stored in the transmitted data holding unit 23 before transmission. When it is a transmit request, the replenishment information management unit 24 instructs the transmission information selecting unit 28 to read the predetermined packet from the transmitted data holding unit 23 and perform a retransmitting process. The transmission information selecting unit 28 reads the specified packet from the transmitted data holding unit 23, and transmits it through the network interface 31.

When a packet is retransmitted due to the change in intensity of a radio wave, and when it is determined that a packet is to be retransmitted due to the reduction in intensity of a radio wave, the application program unit 36 instructs the replenishment information management unit 24 to switch the status (set a radio wave intensity replenishment selection flag). Upon receipt of the instruction, the replenishment information management unit 24 controls to perform the process of stopping the transmission of packets, storing packets, or retransmitting packets as in the case of handover.

The process performed by a receiving terminal is explained below by referring to the block diagram of the receiving terminal shown in FIG. 30. A received information structuring unit 41 and a duplicate detection and discarding unit 43 shown in FIG. 30 respectively correspond to the duplicate detection unit 52 and the discard unit 53 shown in FIG. 8. By referring to FIG. 30, the process performed by a receiving terminal when a packet is replenished due to handover or a change in intensity of a radio wave is explained below.

The receiving terminal which receives a packet from a network through a network interface 90 passes the received packet to a packet identification unit 40. The packet identification unit 40 identifies the type of packet, and transfers the packet to the received information structuring unit 41 or a replenishment effectiveness notification unit 48 depending on the result.

The received information structuring unit 41 performs a process depending on the received message. A duplicate determining process unit 42 determines whether or not the same packet has been received as a duplicate packet. A holding time management unit 44 uses a timer 47 to manage the period in which a received packet is held. A packet holding buffer unit 45 holds a received packet while it is managed by the holding time management unit 44. A received information stop control unit 46 determines whether or not it is necessary to stop retransmitting packets for a transmitting terminal, and allows it to transmit a request message to a replenishment request unit 49.

The duplicate detection and discarding unit 43 discards a packet received as a duplicate packet if the duplicate determining process unit 42 of the received information structuring unit 41 determines that the received packet is a duplicate packet which is the same as an already received packet.

The replenishment effectiveness notification unit 48 sets the duplicate effective number or the determination holding time for the possible replenishment for a receiving terminal, and notifies the transmitting terminal of it. This process is performed when a receiving terminal receives a duplicate protective request according to the seventh embodiment.

The replenishment request unit 49 generates a message such as a stop request, a hold request, a transmit request, etc. The message generated by the replenishment request unit 49 is transmitted to a transmitting terminal through the network interface 90.

Figure 32:
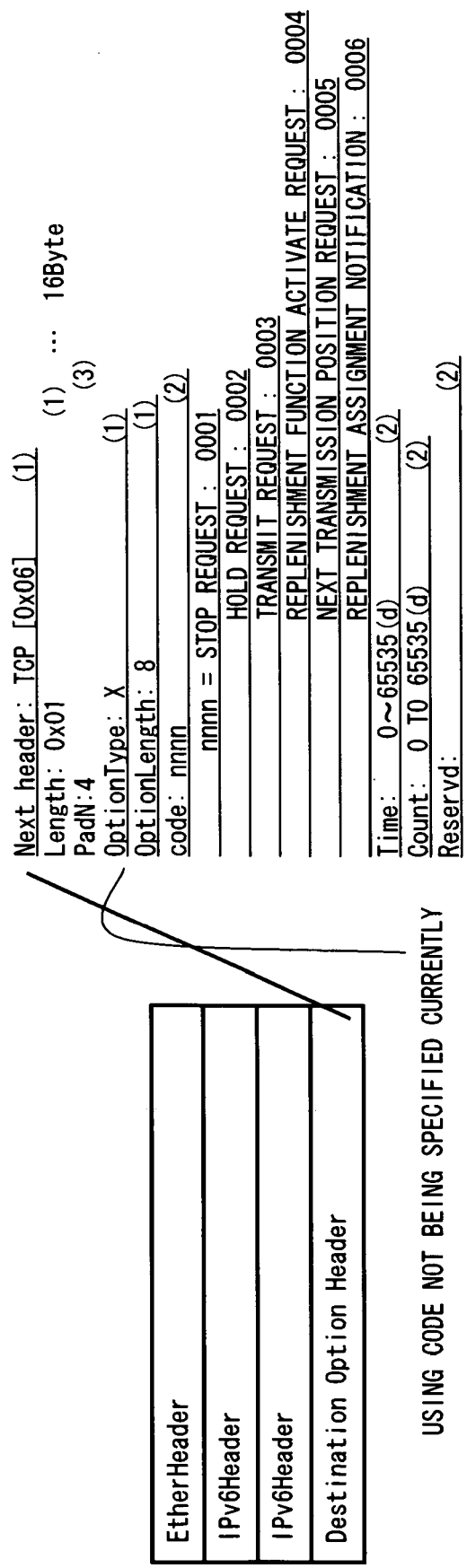
FIG. 32 shows an example of the structure of a request message.

FIG. 32 shows an example of a request message generated by the replenishment request unit 49. The packet identification unit 32 of the transmitting terminal which receives the message determines the contents of the request message according to the code in the destination option header shown in FIG. 32.

The process performed by a relay node is explained below by referring to the block diagram shown in FIG. 31. A received information structuring unit 80 and a duplicate detection time discard unit 75 shown in FIG. 31 correspond to the reception control unit 60 shown in FIG. 23, and a replenishment request unit 76 shown in FIG. 31 is included in the transmission control unit 61 shown in FIG. 23. By referring to FIG. 31, the process of a relay node performed when the position registration of a receiving terminal or a packet replenishing method is performed is explained below.

When the position registration of a transmitting terminal is performed, a transmitting terminal which receives a router advertisement first generates a care-of address (CoA), and transmits it to the relay node. The relay node determines by a packet identification unit 72 the packet received by a receiving unit 71. A position registering unit 73 executes an application program 70, and registers a care-of address CoA associated with a home address HoA using the binding cache. After the completion of the position registration, a position registration reply is transmitted to the transmitting terminal.

When a care-of address CoA is registered, the position registering unit 73 generates a packet including a position registration reply message, and a transmitting unit 79 transmits the packet to a transmitting terminal.

When a packet addressed to a receiving terminal is received, the packet is basically capsulated and transferred to the address of the destination. If the transmitting terminal performs a replenishing process, the process of holding a received packet, detecting the duplicate of the received packet, discarding the duplicate packet, etc. is performed. The configuration and operation of a received information structuring unit 80 are basically the same as those of the received information structure unit provided in the receiving terminal shown in FIG. 30. Therefore, the explanation is omitted here.

Figure 44:
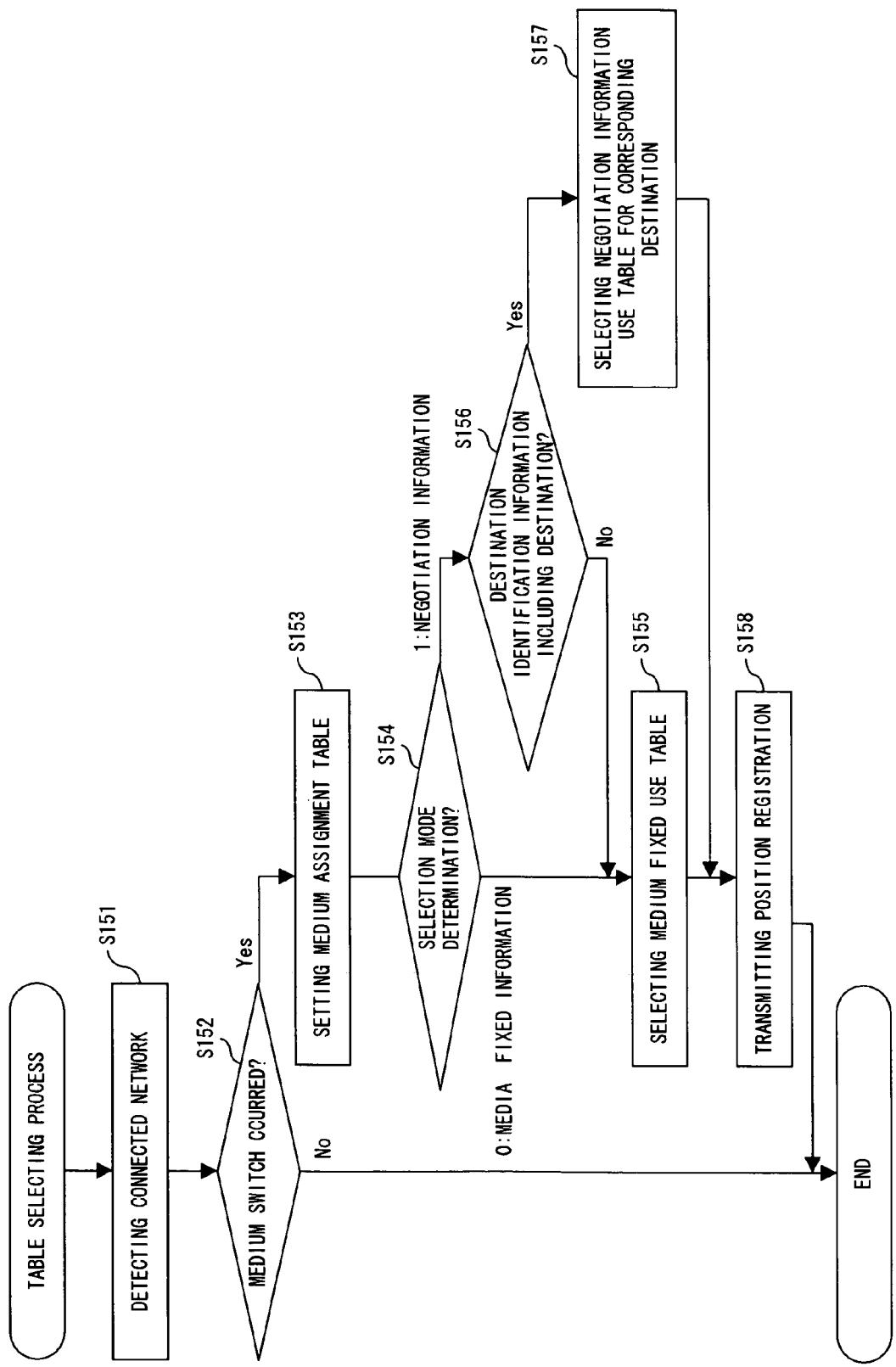
FIG. 44 is a flowchart of the process of selecting a desired table from the transmitting terminal replenishment information management table.

The packet replenishing methods according to the first through twelfth embodiments of the present invention are explained in detail by referring to the flowcharts shown in 33A and 33B through FIG. 44.

Figure 33A:
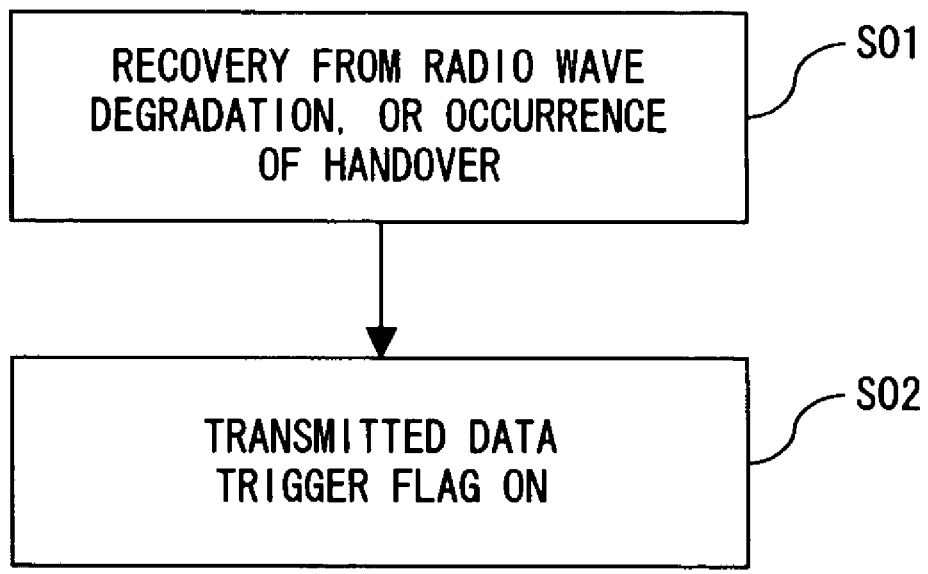

FIGS. 33A and 33B are flowcharts showing the basic operations of the transmitting terminal (mobile node).

FIG. 33A is a flowchart for explanation of the trigger of performing the packet replenishing method according to an embodiment of the present invention. In step S01 shown in FIG. 33A, the transmitting terminal recognizes that handover occurs due to the travel of the transmitting terminal or the intensity of a radio wave exceeding a predetermined threshold. Thus, in step S02, the transmitted data trigger flag is set (1), and the operation mode of replenishing a packet according to the embodiment of the present invention is entered.

FIG. 33B is a flowchart for explanation of a packet retransmitting process or a normal packet transmitting process by a transmitting terminal. When the transmitting terminal receives an instruction to transmit a packet or a transmitted data trigger flag is set, it is determined whether or not the transmitted data trigger flag is set. If the transmitted data trigger flag is not set, control is passed to step S14. In step S14, it is determined that there is transmitted data, and control is passed to step S14-1 and the data is stored in the transmitted data holding information. Then, in S14-2, the packet transmitting process is performed, thereby terminating the process.

When the transmitted data trigger flag is set, control is passed to step S2. In step S2, the transmission information selecting process is performed. The reception information selecting process is performed by the replenishment information management unit 24 shown in FIG. 6, and a packet to be retransmitted is specified. In step S3, it is determined whether or not the packet specified in step S2 has been stored in the transmitted data holding unit 23 shown in FIG. 6. If the packet to be retransmitted has not been stored in the transmitted data holding unit 23, control is passed to step S14. Afterwards, in step S14, the normal transmitting process is performed on a packet not yet transmitted, thereby terminating the process.

If NO in step S3, that is, the packet to be retransmitted is stored in the transmitted data holding unit 23 shown in FIG. 6, control is passed to step S4. In step S4, the transmitted data holding information which is the information about a packet specified in the transmission information selecting process in step S2 is compared with the data number of the leading packet in the packets not yet transmitted. If the transmitted data holding information has exceeded the data number of the packet to be next transmitted in the normal packet transmission (YES in step S4), then control is passed to step S12. In step S12, the transmitted data trigger flag is not set, and control is passed to step S14. In step S14, packets are normally transmitted, thereby terminating the process.

When the transmitted data holding information is smaller than the data number of the packet to be next transmitted in the normal packet transmission (NO in step S4), control is passed to step S5. In step S5, the replenishment information management unit 24 shown in FIG. 6 determines whether or not it is possible to start transmission from the specified data number. If YES in step S5, then control is passed to step S6. In step S6, the transmitted data is set in the specified transmission position so that the retransmission can be started from the packet of the specified data number, thereby passing control to step S8. If NO in step S5, control is passed to step S7. In step S7, the transmitted data is set in the current transmission position so that packets can be transmitted from the packet having the data number to be next transmitted, thereby passing control to step S8. The transmission of packets is assumed to start with the packet having the data number indicated by the transmission position.

In step S8, it is determined whether or not the transmitted data trigger flag is set. If the transmitted data trigger flag is not set in step S8, that is, NO in step S8, control is passed to step S13. In step S13, the packets up to the set transmission position are deleted in the transmitted data holding information stored in the transmitted data holding unit 23 shown in FIG. 6. After the deletion, control is passed to step S14, a normal packet transmission is performed, thereby terminating the process.

If YES in step S8, that is, the transmitted data trigger flag is set, then control is passed to step S9. In step S9, one packet is retransmitted. In step S10, 1 is added to the data number of the transmission position, and the transmitted data number of the packet to be next retransmitted is set.

In step S11, the transmitted data holding information is compared with the information about the packet not yet transmitted in the normal packet transmitting process. When the transmitted data holding information exceeds the data number of the packet to be next transmitted in the normal packet transmission (YES in step S11), control is passed to step S12. The processes in and after step S12 are described above, and the explanation is omitted here.

When the transmitted data holding information is smaller than the data number of the packet to be next transmitted in the normal packet transmission (NO in step S11), control is returned to step S8, and the retransmission of packets is continued.

Thus, when the occurrence of handover or the recovery of the intensity of a radio wave is detected, the processes in steps S8 through S11 are repeated at the frequency specified by the replenishment information management unit if the data is held in the transmission data holding unit, and the packets corresponding to the execution frequency are retransmitted.

Figure 34:
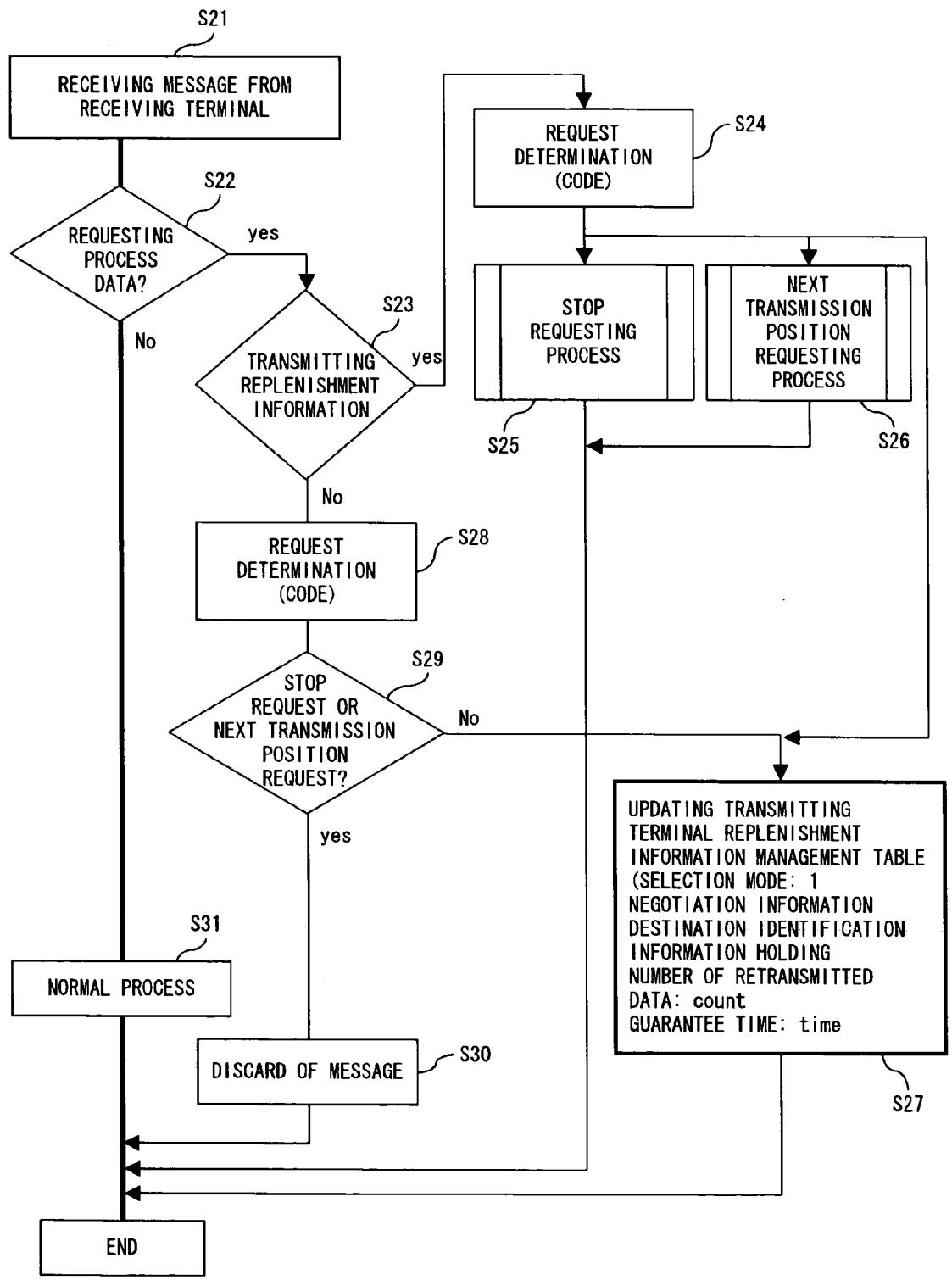
FIG. 34 is a flowchart of the negotiating process between a transmitting terminal and a receiving terminal.

FIG. 34 is a flowchart of the process of the negotiation between the transmitting terminal and the receiving terminal when the transmitting terminal retransmits a packet at a request from the receiving terminal. FIG. 34 shows the process of the transmitting terminal when the transmitting terminal receives a request message from the receiving terminal.

In step S21, the transmitting terminal receives a message from the receiving terminal. Upon receipt of the message, the transmitting terminal determines in step S22 whether or not the received message is a request message requesting the transmitting terminal to perform the process requested by the receiving terminal. If it is not a request message (NO in step S22), control is passed to step S31. n step S31, the process performed when a normal packet is received is performed.

When the received message is a request message (YES in step S22), control is passed to step S23. In step S23, it is determined whether or not the transmitting terminal is transmitting replenishment information, that is, whether or not it is performing the packet retransmitting process. If it is performing the packet retransmitting process, control is passed to step S24. Otherwise, control is passed to step S28. In steps S24 and S28, the contents of the request of the message (code shown in FIG. 32) are determined.

When the request determination shown in step S24 in the packet retransmitting process indicates a stop request, the stop requesting process is performed in step S25. The request is a next transmission position request, the next transmission position requesting process is performed in step S26. Otherwise, according to the contents of the received message, the data in the transmitting terminal replenishment information management table is updated in step S27. When the process is performed in step S25, S26, or S27, the negotiating process is terminated.

If the packet retransmitting process is not being performed, the request determination is performed in step S28. In step S29, it is determined whether or not the request is a stop request or a next transmission position request. If YES in step S29, control is passed to step S30. In step S30, the message is discarded, and the negotiating process is terminated.

If NO in step S29, control is passed to step S27. In step S27, as described above in the explanation of the process performed when the packet retransmitting process is performed, the data of the transmitting terminal replenishment information management table is updated according to the contents of the received message. After the update of data, the negotiating process is terminated.

Figure 35:
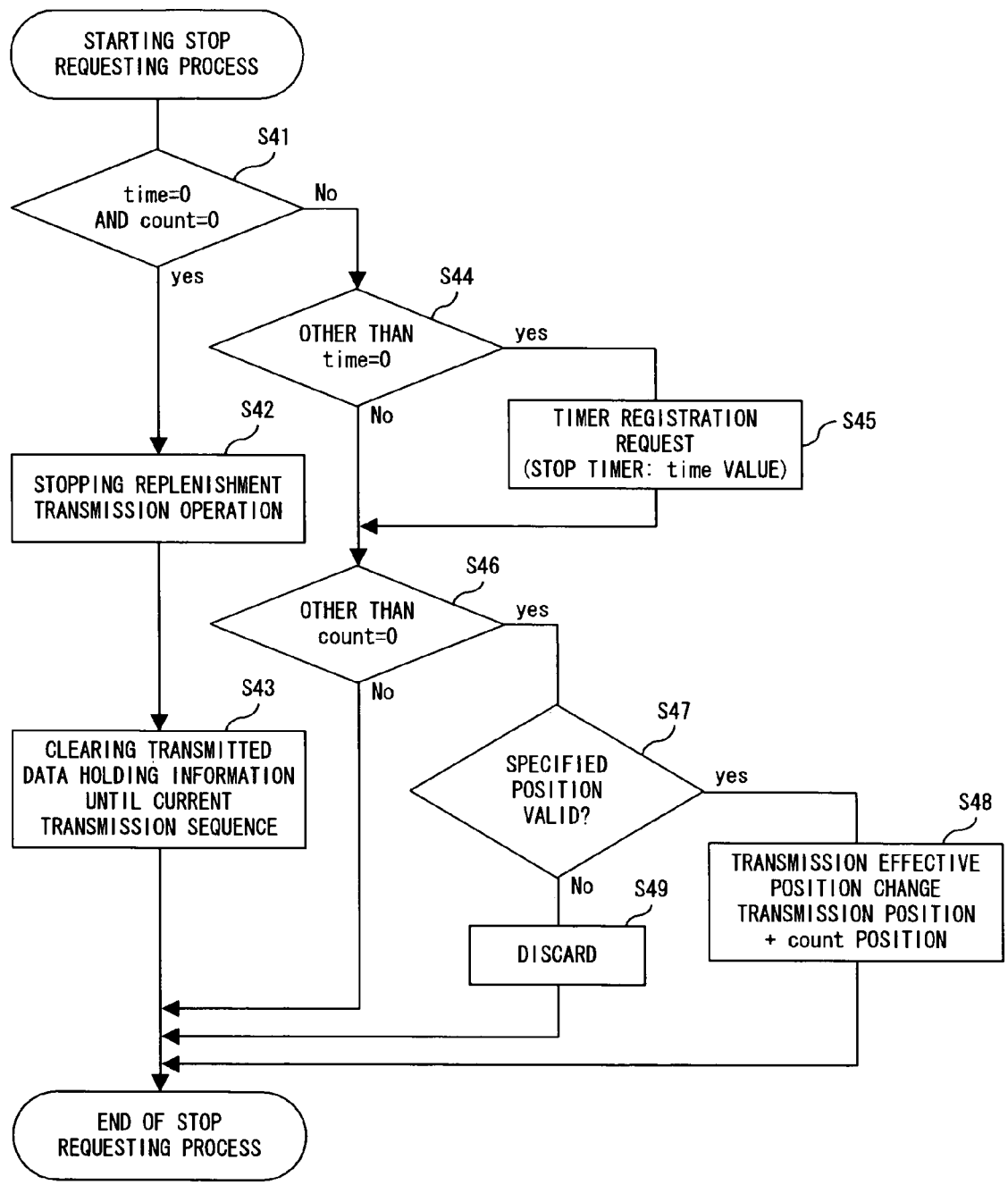
FIG. 35 is a flowchart of the stop requesting process.
Figure 36:
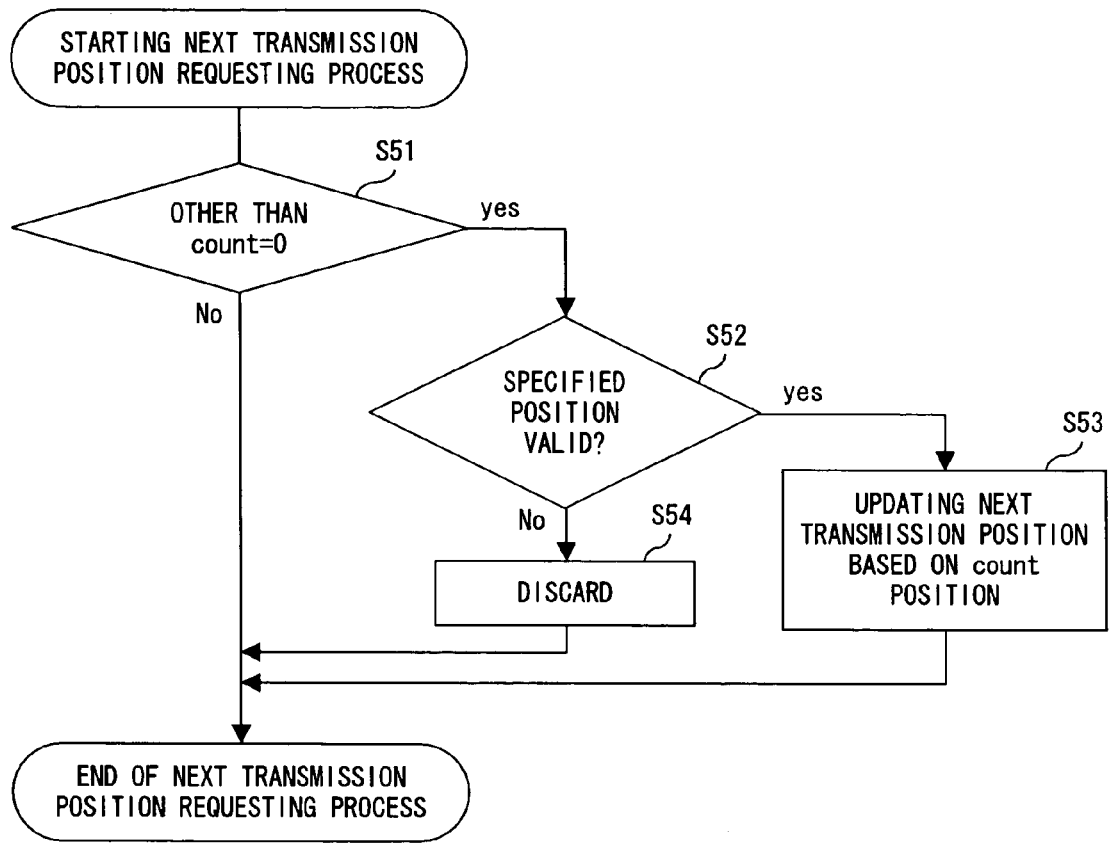
FIG. 36 is a flowchart of the next transmission position requesting process.

The process contents of the stop requesting process in step S25 shown in FIG. 34 and the next transmission position requesting process in step S26 shown in FIG. 34 are explained below. FIG. 35 is a flowchart of the stop requesting process in step S25 shown in FIG. 34, and FIG. 36 is a flowchart of the next transmission position requesting process in step S26 shown in FIG. 34. First, by referring to FIG. 35, the stop requesting process is described below.

When the stop requesting process is started, it is determined whether or not the data "time" and "count" in the message are "time=0 and count=0" in step S41. If YES in step S41, control is passed to step S42. In step S42, the process of stopping the replenishment transmitting operation, that is, the process of stopping the retransmission of packets, is performed. In the next step S43, in the normal packet transmitting process, the transmitted data holding information having a smaller data number than the data number to be next transmitted is deleted. When the corresponding transmitted data holding information is deleted, the stop requesting process is terminated.

If NO in step S41, control is passed to step S44. In step S44, it is determined on time whether or not "time=0". When time has a value other than 0 (YES in step S44), control is passed to step S45. In step S45, the timer registration request process is performed, and control is passed to step S46. When time=0 (NO in step S44), no process is performed, and control is passed to step S46.

In step S46, it is determined on count whether or not "count=0". When count has a value other than 0 (YES in step S46), control is passed to step S47. In step S47, it is determined whether or not the data number indicating the start of the retransmission of a packet specified by a message is valid. If it is possible to retransmit a packet from the data number specified by the message (YES in step S47), control is passed to step S48. In step S48, depending on the contents of the message, the data number for start of retransmission is set, thereby terminating the stop requesting process. It is not possible to retransmit data from the data number specified by the message (NO in step S47), control is passed to step S49. In step S49, it is not possible to perform the contents of the message, and the message is discarded, thereby terminating the stop requesting process.

When count=0 (NO in step S46), no process is performed, thereby terminating the stop requesting process.

The next transmission position requesting process is explained below by referring to FIG. 36.

In step S51 shown in FIG. 36, it is determined whether or not the data of "count" in the received message has a value other than 0. When count=0 (NO in step S51), it is assumed that the message requests to transmit a packet from the current transmission position, and no process is performed here, thereby terminating the next transmission position requesting process.

When count has a value other than 0 (YES in step S51), control is passed to step S52. In step S52, it is determined whether or not packets can be retransmitted from the data number at the transmission position specified by the message. If it is determined that it is impossible (NO in step S52), control is passed to step S54. In step S54, it is assumed that packets cannot be retransmitted from the position specified by the message, and the message is discarded, thereby terminating the next transmission position requesting process.

If it is determined that packets can be retransmitted from the position specified by the message (YES in step S52), control is passed to step S53. In step S53, the value of count in the message is stored as the transmission position in which the next transmission is to start, and the transmission position data is updated. After the update of the transmission position data, the next transmission position requesting process is terminated.

Figure 37:
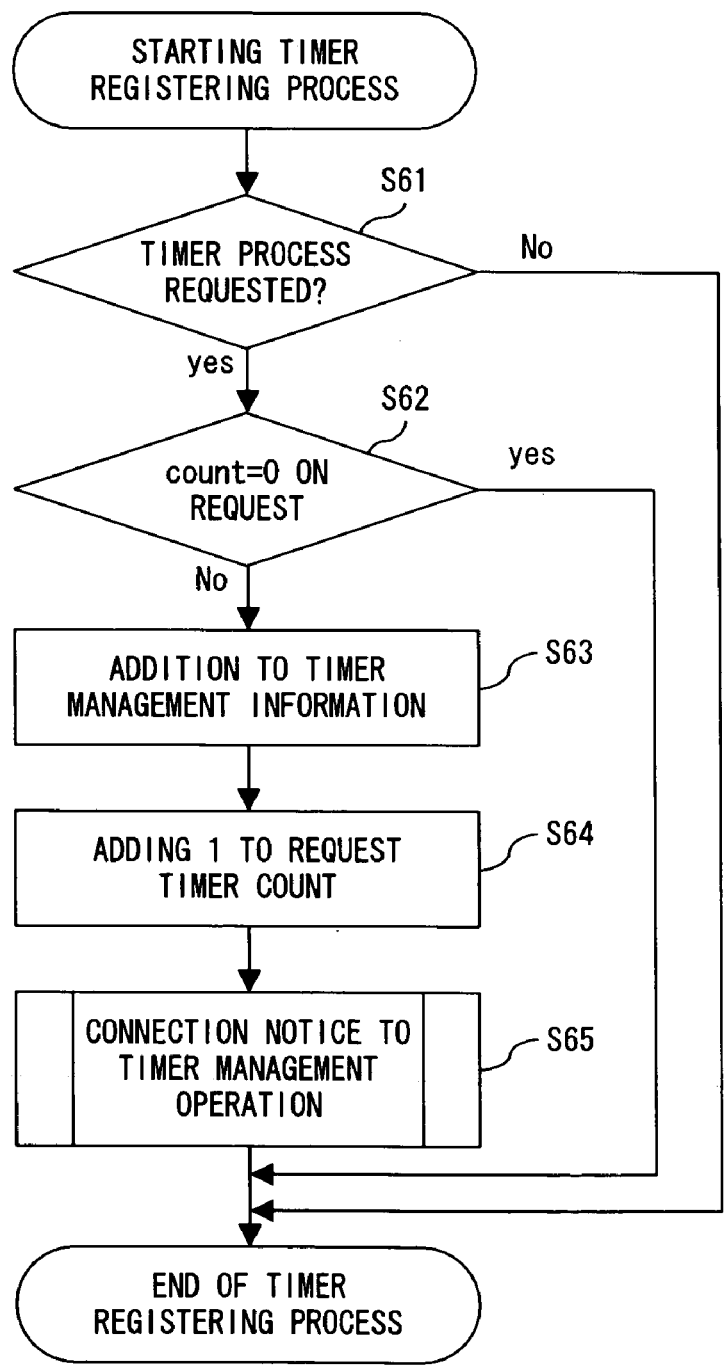
FIG. 37 is a flowchart of the timer registering process.

The timer registration request process in step S45 in the flowchart of the stop requesting process shown in FIG. 35 is practically explained below by referring to FIGS. 37 and 38. FIG. 37 is a flowchart of the timer registering process, and FIG. 38 is a flowchart of the timer managing process.

In step S61 shown in FIG. 37, the timer process request is awaited. When the timer process request is received, control is passed to step S62. In step S62, it is determined whether or not the timer value requested by the message is 0, that is, whether or not count is 0. If YES in step S62, it is assumed that the message does not request a timer value, and the timer registering process is terminated.

If NO in step S62, control is passed to step S63. In step S63, the timer information is added to the timer management information based on the received message. In the next process step S64, 1 is added to the number of requested timers. The number of requested timers refers to the number of timers at the request from the transmitting terminal. After adding 1 to the number of requested timers, a connection notification is issued to a timer management operation in step S65. After the connection notification, the timer registering process terminates.

Figure 38:
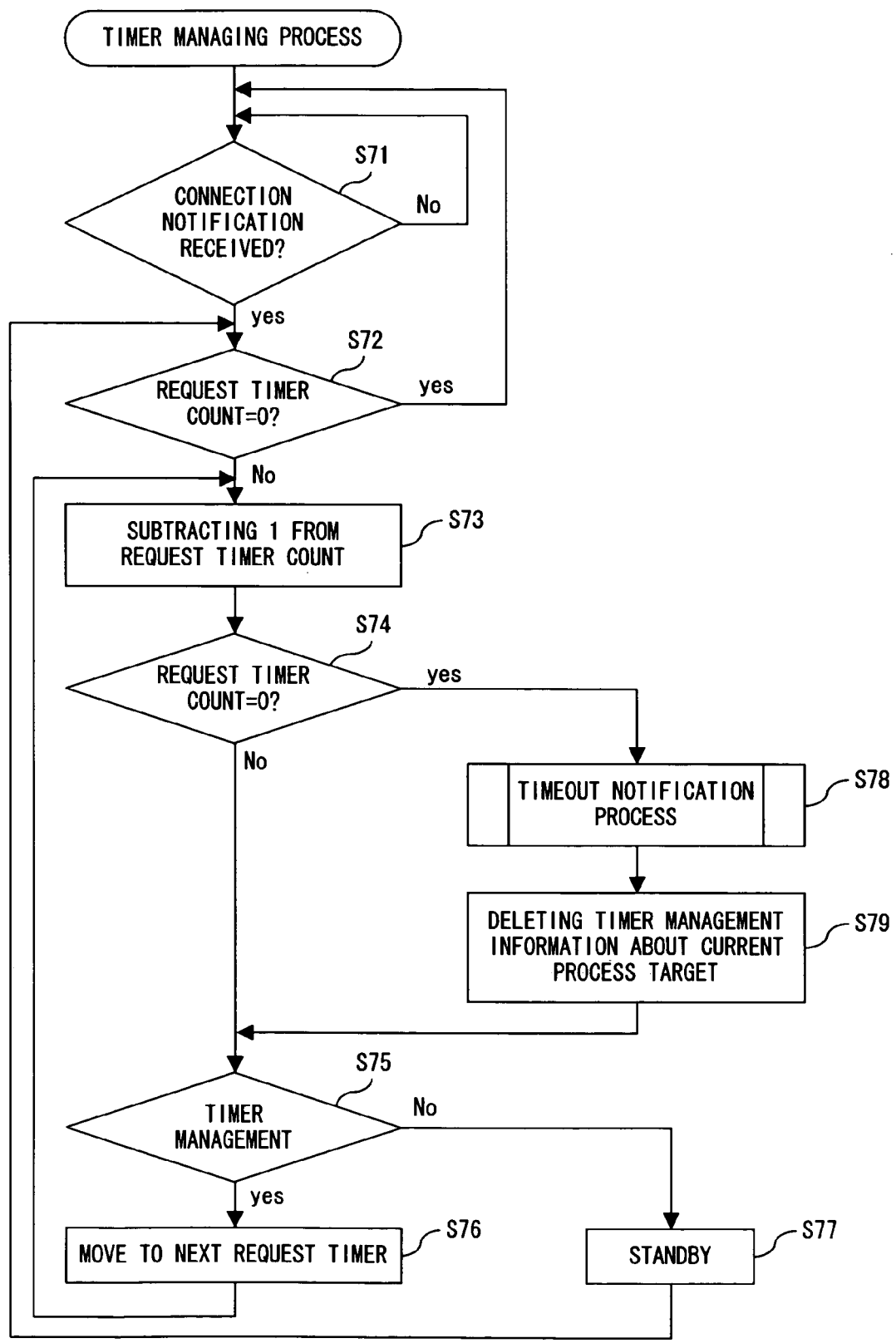
FIG. 38 is a flowchart of the timer managing process.

The flowchart of the timer managing process shown in FIG. 38 indicates the process of managing a plurality of timers that start operations after the completion of the timer registering process shown in FIG. 37.

Step S71 awaits the reception of a connection notification by the process in step S65 of the timer registering process shown in FIG. 37. Upon receipt of a connection notification (YES in step S71), control is passed to step S72. In step S72, it is determined whether or not the number of requested timers is 0. If the number of requested timers is 0 (YES in step S72), it is assumed that the timer set by the current message does not exist, and control is returned to the status of awaiting a connection notification in step S71.

When the number of requested timers has a value other than 0 (NO in step S72), that is, when more than one communication for performing the packet replenishing process is set, control is passed to step S73. For each timer, the processes in steps S73 through 79 are performed for a predetermined interval.

In step S73, in a plurality of requested timer requested by the transmitting terminal, 1 is subtracted from the count, that is, the timer value, from one timer. After the subtraction of 1, control is passed to step S74.

In step S74, it is determined whether or not count=0 for the requested timer from whose count 1 is subtracted. When the count of the timer value is not 0 (NO in step S74), control is passed to step S75. In step S75, it is determined about the presence/absence of the timer management information, that is, whether or not there is a timer for which the processes in steps S73 and S74 in the corresponding period. If an unprocessed timer exists (YES in step S75), the next timer is selected from among the unprocessed requested timers, thereby returning control to step S73. Thus, the processes in steps S73 through 75 are performed on all requested timers.

If the above-mentioned processes are performed on all requested timers, control is passed to step S77 and the standby status is entered. After the passage of a predetermined standby time, control is returned to step S72, and the above-mentioned processes are repeated.

In the process of repeating the steps S73 through S76, the processes in steps S78 and S79 are performed on the timer that has recorded timeout (YES in step S74). That is, in step S78, a timeout notification process is performed. The timeout notification process is described later. After the timeout notification, in step S79, the timer management information about the requested timer that has issued a timeout notification is deleted. Afterwards, control is returned to step S75. The processes in steps S72 through S79 are repeated until the timer management information is deleted for all requested timers.

Figure 39:
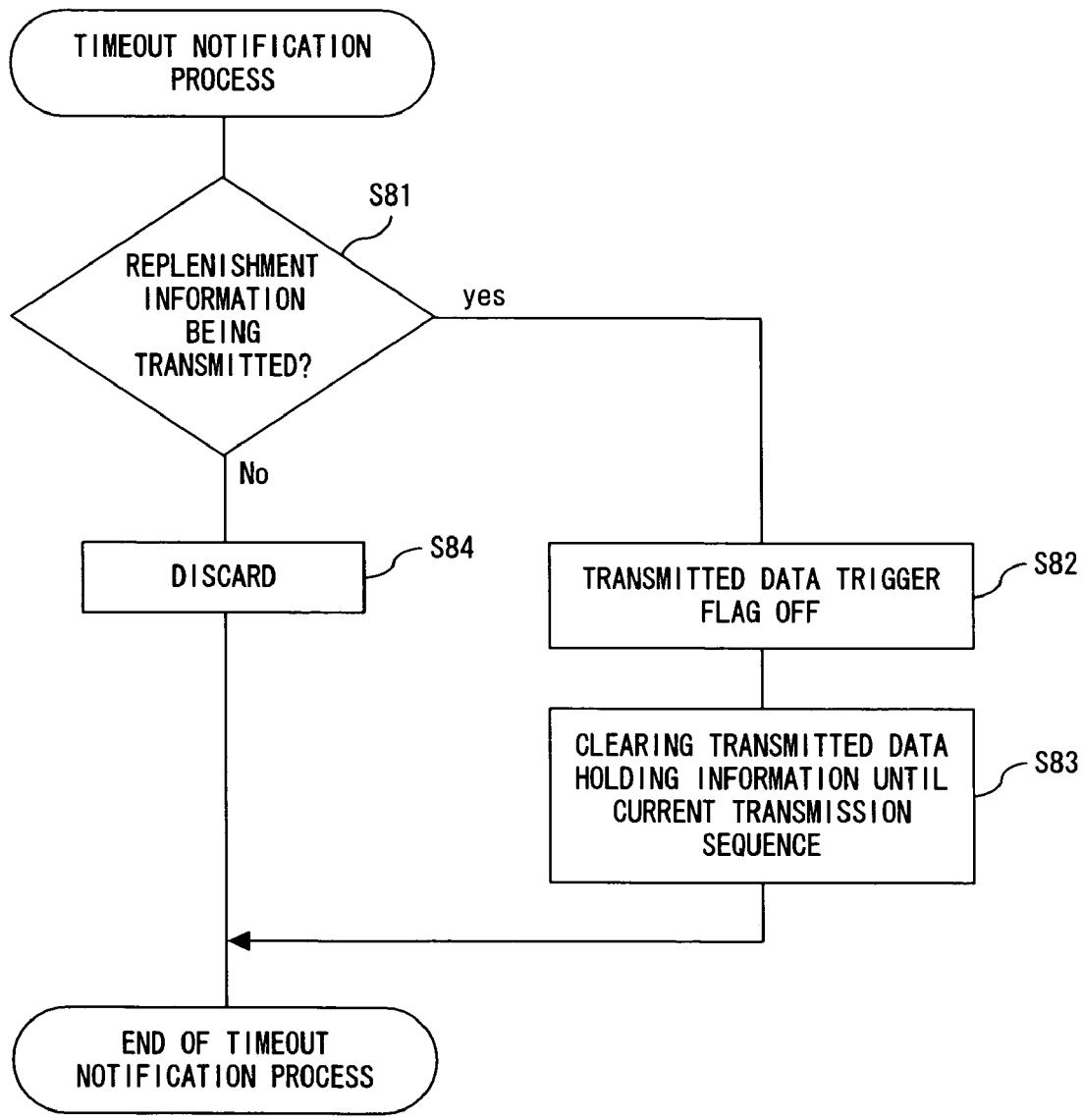
FIG. 39 is a flowchart of the timeout notifying process.

FIG. 39 is a flowchart of the timeout notifying process performed when a timeout occurs on a requested timer and a timeout notification is received, and practically shows the process in step S78 shown in FIG. 38.

In step S81, it is determined whether or not the replenishment information is being transmitted, that is, whether or not packets are being retransmitted. When packets are being retransmitted (YES in step S81), control is passed to step S82. In step S82, the trigger of performing a packet replenishing method, that is, a transmitted data trigger flag, is turned off. In the next step S83, in the normal packet transmitting process, the transmitted data holding information having a data number smaller than the data number to be transmitted next is deleted. When the corresponding transmitted data holding information is deleted, the timeout notifying process is terminated.

If NO in step S81, that is, if packets are not being retransmitted, then control is passed to step S84. In step S84, since packets are not being retransmitted, the received timeout notification is discarded, and no other processes are performed, thereby terminating the timeout notifying process.

Figure 40:
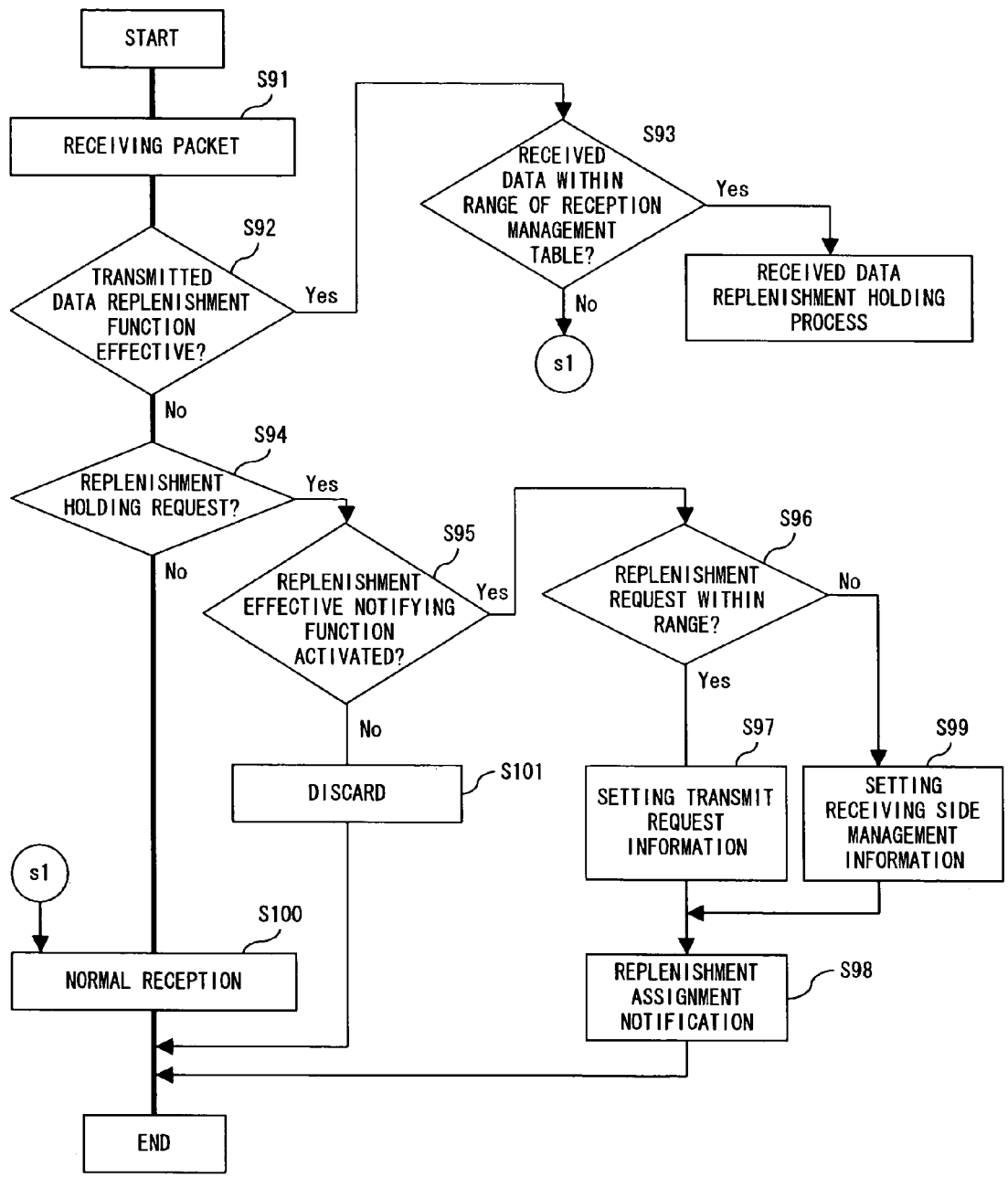
FIG. 40 is a flowchart showing the basic operations of a receiving terminal.

FIG. 40 is a flowchart for explanation of the basic operation of the receiving terminal.

In step S91, a packet is received. In step S92, it is determined whether or not the transmitted data replenishing function is effective. By the transmitted data replenishing function, the receiving terminal stores a received packet, and compares a stored packet with the packet transmitted by the transmitting terminal. When the transmitted data replenishing function is effectively set, control is passed to step S93. If it is nullified, control is passed to step S94.

In step S93, it is determined whether or not a received packet is in the range of the reception management table. If it is in the range of the reception management table (YES in step S93), the received data replenishment holding process is performed. The received data replenishment holding process is explained later by referring to FIG. 41. If it is not in the range of the reception management table (NO in step S93), the process corresponding to the embodiment is not performed, but a normal packet receiving process is performed (step S100). In step S93, for example, the time difference is determined, or it is determined whether or not the number of valid duplicate packets, that is, the number of packets for determination of a duplicate packet, is exceeded by comparing the packet received before with the packet currently received.

In step S94, it is determined whether or not the message of the received packet indicates a replenishment hold request. If it is not a replenishment hold request (NO in step S94), control is passed to step S100, and a normal packet receiving process is performed. In this case, the process corresponding to the embodiment is not performed. If the received packet is a replenishment hold request message (YES in step S94), control is passed to step S95.

In step S95, it is determined whether or not the valid replenishment notification function has been activated. The valid replenishment notification function is the function of notifying the transmitting terminal of the replenishment effective time or the number of pieces of retransmitted data which the receiving terminal can set.

When the valid replenishment notification function is activated, control is passed to step S96, and it is determined whether or not the replenishment request from the transmitting terminal is in the range which can be set by the receiving terminal. If it is a possible range (YES in step S96), then control is passed to step S97. In step S97, the transmission request information is set based on the contents of the request message from the transmitting terminal. After the setting, the replenishment assignment notification is transmitted to the transmitting terminal in step S98, thereby terminating the process.

In step S96, if the replenishment request from the transmitting terminal cannot be set by the receiving terminal side, control is passed to step S99. In step S99, based on the replenishment effective time or the number of pieces of retransmitted data, etc. which can be set by the receiving terminal, the receiving side management information is set. After the setting, the replenishment assignment notification is transmitted to the transmitting terminal in step S98, thereby terminating the process.

If NO in step S95, that is, if the valid replenishment notification function is not activated, control is passed to step S101. In step S101, the request message from the transmitting terminal is discarded, thereby terminating the process.

Figure 41:
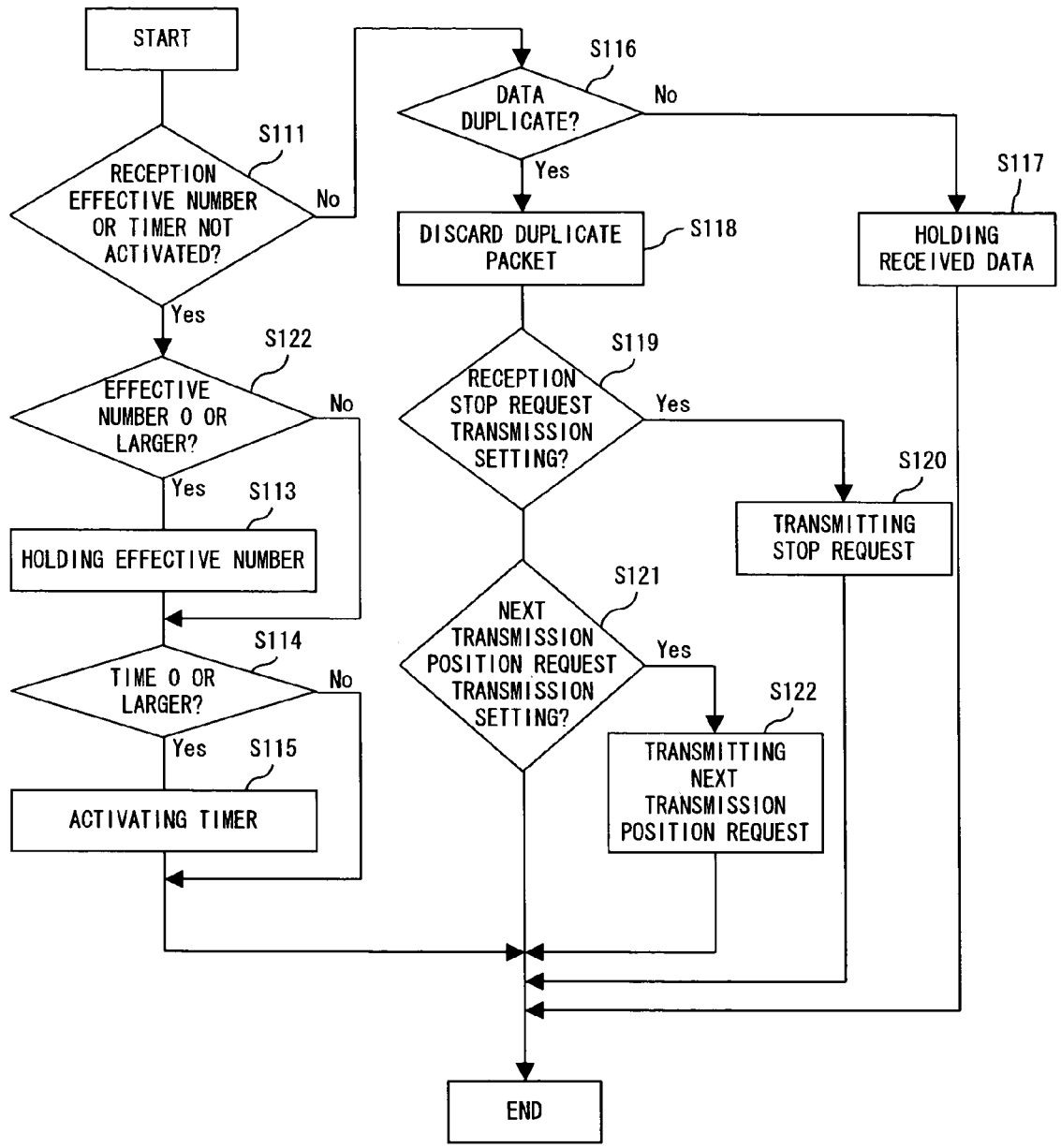
FIG. 41 is a flowchart of the received data replenishment holding process.

FIG. 41 is a flowchart of the received data replenishment holding process performed if YES in step S93 shown in FIG. 40. The received data replenishment holding process is explained below by referring to FIG. 41.

In step S111, it is determined whether or not a timer which has the number of valid received packets or has not yet been activated is set in the receiving terminal management table shown in FIG. 20. The number of valid received packets shown in FIG. 41 and the timer value of the time are stored in the number of pieces of retransmitted data and the guarantee time respectively in the receiving terminal management table shown in FIG. 20. If YES in step S111, control is passed to step S112. In step S112, it is determined whether or not the number of valid received packets is set. If YES, control is passed to step S113, and the packets of the number of valid received packets are stored, and control is passed to step S114. If the number of valid received packets is not set (NO in step S112), no process is performed, and control is passed to step S114.

In step S114, it is determined whether or not a value is stored as a timer value. If YES in step S114, control is passed to step S115. In step S115, the process of activating a timer is performed, thereby terminating the process. The timer activating process in step S115 can be replaced with the process similar to the timer registering process on the receiving side shown in FIG. 38 on the receiving terminal side. When a valid value is not stored as a timer value (NO in step S114), no process is performed, thereby terminating the process.

If NO in step S111, control is passed to step S116. In step S116, it is determined whether or not the retransmitted packet is duplicate with an already received packet. If NO in step S116, that is, it is determined that it is not a packet received as a duplicate packet, control is passed to step S117. In step S117, the received packet is stored on the receiving terminal side.

If YES in step S116, that is, if it is determined that a retransmitted packet is a packet received by the receiving terminal as a duplicate packet, control is passed to step S118. In step S118, the duplicate packet received as a retransmitted packet is discarded, and control is passed to step S119.

In step S119, it is determined whether or not the transmission of a stop request to the transmitting terminal has been set when the receiving terminal determines that the retransmission of a packet is not necessary. If YES in step S119, control is passed to step S120. In step S120, a stop request is transmitted to the transmitting terminal, thereby terminating the process. The transmitting terminal which receives a stop request performs the process shown in FIG. 35.

If NO in step S119, control is passed to step S121. In step S121, it is determined whether or not the data number of a packet retransmitted by the transmitting terminal is set for transmission as necessary at a next transmission position request to be indicated to the transmitting terminal. If YES in step S121, control is passed to step S122. In step S122, the next transmission position request is transmitted to the transmitting terminal, thereby terminating the process. The transmitting terminal which receives the next transmission position request performs the process shown in FIG. 36. If NO in step S121, the received data replenishment holding process is terminated.

Figure 42:
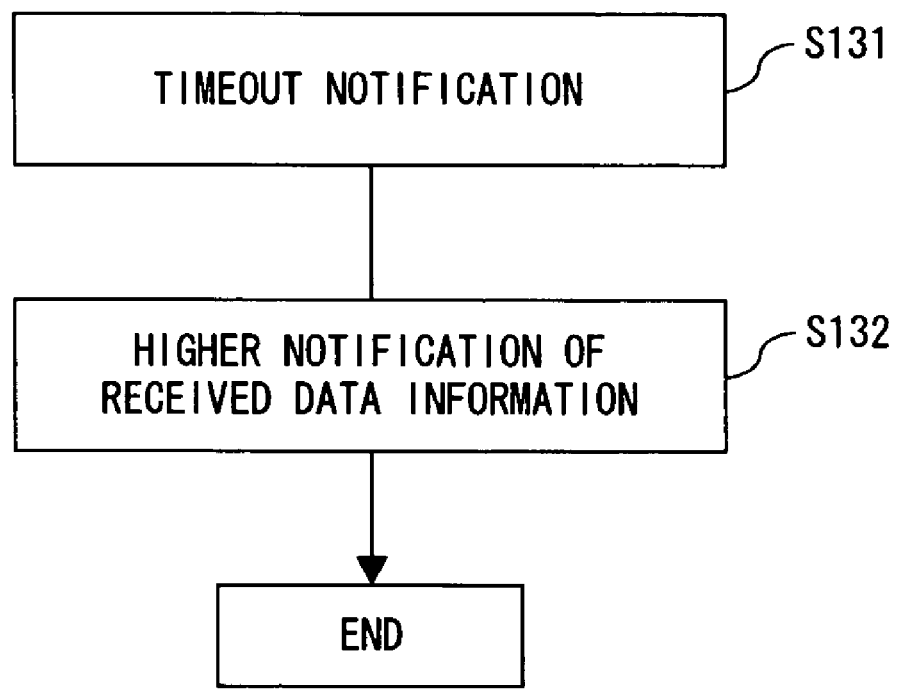
FIG. 42 is a flowchart of the process performed at the timeout on the receiving terminal side.

Described below is the process performed when a timer is operating in the received data replenishment holding process shown in FIG. 41, and a timeout occurs on the timer. FIG. 42 is a flowchart of the process performed when the timeout occurs on the receiving terminal side.

First, when the timeout of the timer is announced (step S131), the process in step S132 is performed. In step S132, an received data information upper notification is issued. In the received data information upper notification, a notification is issued about the packet in which a timeout has occurred during the communications to the TCP/IP layer in the upper layer shown in FIG. 8. After the received data information upper notification process, the process terminates.

Figure 43:
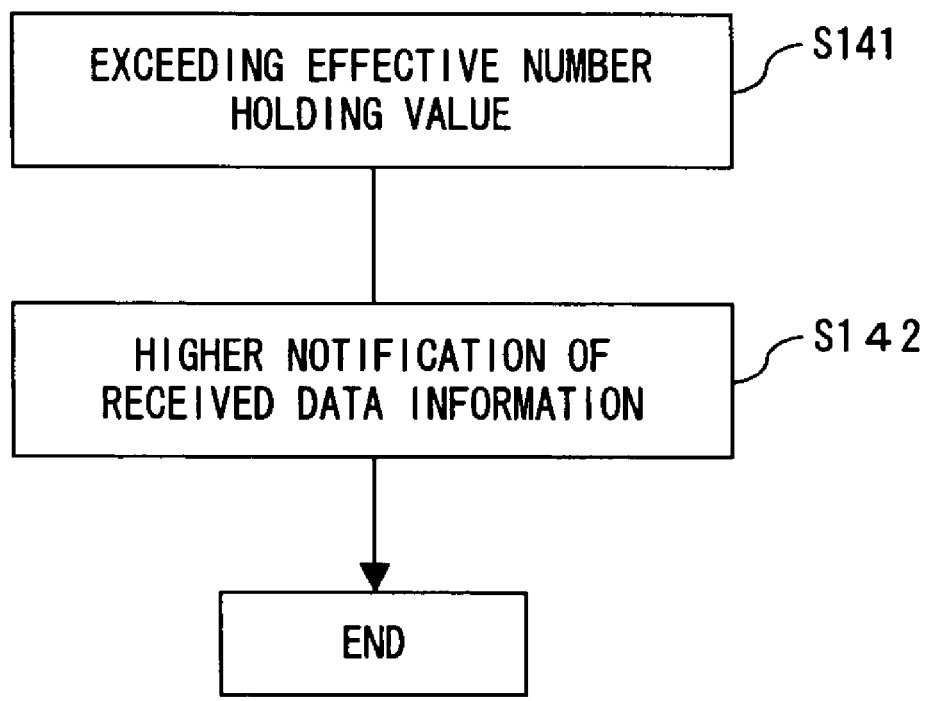
FIG. 43 is a flowchart of the process performed when the number of stored retransmitted packets exceeds the number of effectively held packets on the receiving terminal side.

As with the process performed when a timeout occurs, the process performed when the number of stored packets exceeds the number of valid received packets on the receiving terminal side in step S117 shown in FIG. 41 is explained by referring to FIG. 43. FIG. 43 is a flowchart of the process performed when the number of retransmitted packets stored on the receiving terminal exceeds the number of valid stored packets.

First, when the number of retransmitted packet stored in the receiving terminal exceeds the number of valid stored packets (step S141), the process in step S142 is performed. In step S142, an received data information upper notification is issued. The received data information upper notification is the same as that in step S132 shown in FIG. 42, and a notification is issued to the TCP/IP layer shown in FIG. 8. After the received data information upper notification process, the process terminates.

The processes of the flowchart shown in FIG. 40 through 43 are performed in the receiving apparatus. The receiving apparatus is not only the corresponding node 5, but also the relay node 6 in the above-mentioned embodiment.

The transmitting terminal and the receiving terminal perform the packet replenishing method according to the above-mentioned embodiments in the processes shown in FIGS. 33A and 33B through FIG. 43. In the eleventh embodiment among them, packets are retransmitted depending on the network. In the packet replenishing method depending on the network a set value can be read for each network in advance from the transmitting terminal replenishment information management table shown in FIG. 19, or a value can be determined in the negotiation between a transmitting terminal and a receiving terminal and is stored in a table so that the value determined in the negotiation can be used. By referring to FIG. 44, the process of setting a necessary value for the retransmission of packets depending on the network is explained below.

FIG. 44 is a flowchart of the process of selecting a desired table from the transmitting terminal replenishment information management table.

When a desired table is selected, first in step S151, a connected network is detected. Then, in step S152, it is determined whether or not a switch of media has occurred. If not switch has occurred (NO in step S152), the process of selecting a table is not performed, and the process terminates.

When a switch of media occurs (YES in step S152), control is passed to step S153. In step S153, a medium assignment table is set. Setting a medium assignment table is, for example, to assign a table for a network medium after the switch to the transmitting terminal replenishment management table. After assigning a table, control is passed to step S154.

In step S154, a selection mode is determined. In the process in step S154, a mode is selected from between the mode in which packet is replenished using the data fixed to a network medium after a switch and a mode in which a packet is replenished using the data determined by the negotiation between a transmitting terminal and a receiving terminal as in the eleventh embodiment.

When packet is replenished according to the media fixed use information, control is passed to step S155. In step S155, in the assigned table, the data stored in the media fixed use information shown in FIG. 19 is selected. The number of pieces of retransmitted data or the guarantee time, etc. in the media fixed use information are used when the packet replenishing process is performed.

When a packet is replenished according to the negotiation information, control is passed from step S154 to S156. In step S156, it is determined whether or not a destination is included in the destination identification information data about the negotiation information in the assigned table. If no destination is included in the destination identification information data in the negotiation information, the negotiation information table cannot be used, control is passed to step S155, and the media fixed use information is used when packets are retransmitted.

When a destination is included in the destination identification information about the negotiation information, control is passed to step S157. In step S157, a negotiation information table about the destination is selected. The selected negotiation information stores a value in the negotiating process according to the eleventh embodiment.

When the media fixed use information table or the negotiation information table about the destination is selected, in step S158, position registration information is transmitted from the transmitting terminal to the relay node, thereby terminating the table selecting process.

In above-mentioned processes, the process performed by the receiving terminal can also be performed by a relay node.

As described above, in the packet replenishing method according to the present invention, when handover occurs or the intensity of a radio wave is reduced, a predetermined packet is retransmitted. Therefore, a loss of a packet can be avoided. Since the execution of flow control (packet retransmission procedure) can be avoided by the control in an upper layer, the degradation of throughput can be suppressed. Furthermore, since the number of retransmitted packets and the retransmission time can be set depending on the status of the receiving terminal or network, the retransmission of packets can be performed depending on the communications environment.

According to the present invention, a loss of a packet due to the handover or the degradation of intensity of a radio wave can be replenished. If the replenishment information is appropriately set, the number of retransmitted packets can be reduced. Therefore, the degradation of throughput due to the replenishment of packets can be minimized.

What is claimed is:

1. A transmitted packet replenishing method, comprising in a mobile IP network:

storing a packet transmitted by a mobile node in a storage device in the mobile node;

managing replenishment information indicating how far in the past the packet is to be retransmitted to in the mobile node;

transmitting a packet stored in the storage device according to the replenishment information when the mobile node detects occurrence of a handover;

transmitting a packet retransmission stopping request to the mobile node to stop retransmitting a packet when it is recognized in a transmitting apparatus that a packet retransmitting process by the mobile node is not necessary; and stopping retransmission of a packet when receiving the packet retransmission stopping request; wherein a loss of a packet caused by the handover is replenished by retrieving a packet transmitted in the past from the storage device and retransmitting the packet transmitted in the past, and the replenishment information defines how far in the past the packet is to be retransmitted.

2. The method according to claim 1, further comprising in a receiving apparatus discarding a packet received as a duplicate packet.

3. The method according to claim 2, further comprising in the mobile node setting a duplicate transmission flag for a retransmitted packet, wherein during discarding of the packet, it is determined whether or not a packet for which the duplicate transmission flag is set has been received as a duplicate packet.

4. The method according to claim 2, wherein the receiving apparatus is a relay node for relaying a packet transmitted from the mobile node to a destination.

5. The method according to claim 4, wherein the relay node is a home agent of a mobile IP.

6. The method according to claim 1, wherein:

a receiving apparatus notifies the mobile node of a sequence number of a packet to be retransmitted; and said mobile node retransmits a packet stored in said storage device based on the notified sequence number.

7. The method according to claim 1, wherein:

said mobile node notifies a receiving apparatus of duplicate protective information about a timer or an amount for buffering received packets; and a receiving apparatus determines whether or not each packet is duplicate while buffering a packet received according to the duplicate protective information.

8. The method according to claim 1, wherein said replenishment information is set depending on the status of a network.

9. The method according to claim 8, wherein the status of the network refers to a transmission rate of the mobile node.

10. The method according to claim 8, wherein the status of the network refers to communications quality of the network.

11. The transmitted packet replenishing method for use in a mobile IP network for transferring a packet transmitted from a mobile node according to claim 1, wherein when the mobile node recognizes occurrence of a packet loss, an operation mode of the mobile node is switched to a mode in which a packet replenishing procedure is used.

12. The transmitted packet replenishing method for use in a mobile IP network for transferring a packet transmitted from a mobile node according to claim 1, wherein when a receiving apparatus transmits a packet replenishment request to the mobile node, an operation mode of the mobile node is switched to a mode in which a packet replenishing procedure is used.

13. A transmitted packet replenishing method, comprising in a mobile IP network:

monitoring intensity of a radio wave by a mobile node;

storing a packet transmitted by the mobile node in a storage device in the mobile node when it is detected that intensity of a radio wave is smaller than a predetermined threshold;

managing replenishment information indicating how far in the past the packet is to be retransmitted to in the mobile node;

transmitting a packet stored in the storage device according to the replenishment information when the mobile node detects a recovery of the intensity of a radio wave;

transmitting a packet retransmission stopping request to the mobile node to stop retransmitting a packet when it is recognized in a transmitting apparatus that a packet retransmitting process by the mobile node is not necessary; and stopping retransmission of a packet when receiving the packet retransmission stopping request; wherein a loss of a packet transmitted during the period of a degrading of a radio wave is replenished, by retrieving a packet transmitted in the past, and transmitting the packet transmitted in the past, and the replenishment information defines how far in the past the packet is to be retransmitted.

14. A mobile node apparatus for use in a mobile IP network, comprising:

a storage device storing a transmitted packet;

a management device managing replenishment information indicating how far in the past the packet is to be retransmitted to; and a transmission device transmitting a packet stored in the storage device according to the replenishment information when detecting occurrence of a handover; wherein the transmission device transmits a packet retransmission stop request to the mobile node apparatus to stop retransmitting a packet when it is recognized in the transmission device that a packet retransmitting process by the mobile node apparatus is not necessary;

the mobile node apparatus stops retransmitting a packet when receiving the packet retransmission stopping request; and a loss of a packet caused by the handover is replenished by retrieving a packet transmitted in the past from the storage device and retransmitting the packet transmitted in the past, and the replenishment information defines how far in the past the packet is to be retransmitted.

15. A mobile node apparatus for use in a mobile IP network, comprising:

a monitor for monitoring intensity of a radio wave;

a storage device storing a transmitted packet when intensity of a radio wave is smaller than a predetermined threshold;

a management device managing replenishment information indicating how far in the past the packet is to be retransmitted to;

a transmission device transmitting a packet stored in the storage device according to the replenishment information when detecting a recovery of the intensity of a radio wave; wherein the transmission device transmits a packet retransmission stop request to the mobile node apparatus to stop retransmitting a packet when it is recognized in the transmission device that a packet retransmitting process by the mobile node apparatus is not necessary;

the mobile node apparatus stops retransmitting a packet when receiving the packet retransmission stopping request; and a loss of a packet transmitted during the period of a degrading of a radio wave is replenished, by retrieving a packet transmitted in the past, and transmitting the packet transmitted in the past, and the replenishment information defines how far in the past the packet is to be retransmitted.

16. A receiving terminal apparatus for use in a mobile IP network, comprising:

a discard device discarding a packet received as a duplicate packet from a mobile node apparatus, wherein said mobile node apparatus for use in the mobile IP network includes:

a storage device storing a transmitted packet;

a management device managing replenishment information indicating how far in the past the packet is to be retransmitted to; and a transmission device transmitting a packet stored in the storage device according to the replenishment information when detecting occurrence of a handover; wherein the transmission device transmits a packet retransmission stop request to the mobile node apparatus to stop retransmitting a packet when it is recognized in the transmission device that a packet retransmitting process by the mobile node apparatus is not necessary;

the mobile node apparatus stops retransmitting a packet when receiving the packet retransmission stopping request; and a loss of a packet caused by the handover is replenished by retrieving a packet transmitted in the past from the storage device and retransmitting the packet transmitted in the past, and the replenishment information defines how far in the past the packet is to be retransmitted.

17. A relay node for use in a mobile IP network, comprising:

a discard device discarding a packet received as a duplicate packet from a mobile node apparatus, wherein said mobile node apparatus for use in the mobile IP network includes:

a storage device storing a transmitted packet;

a management device managing replenishment information indicating how far in the past the packet is to be retransmitted to; and a transmission device transmitting a packet stored in the storage device according the replenishment information when detecting occurrence of a handover; wherein the transmission device transmits a packet retransmission stop request to the mobile node apparatus to stop retransmitting a packet when it is recognized in the transmission device that a packet retransmitting process by the mobile node apparatus is not necessary;

the mobile node apparatus stops retransmitting a packet when receiving the packet retransmission stopping request; and a loss of a packet caused by the handover is replenished by retrieving a packet transmitted in the past from the storage device and retransmitting the packet transmitted in the past, and the replenishment information defines how far in the past the packet is to be retransmitted.

18. A transmitted packet replenishment system for use in a mobile IP network, comprising:

a storage device, in a mobile node, storing a packet transmitted by the mobile node;

a management device managing replenishment information indicating how far in the past the packet is to be retransmitted to;

a transmission device transmitting a packet stored in the storage device according to the replenishment information when the mobile node detects occurrence of a handover of the mobile node; and a discard device discarding a packet received as a duplicate packet in a receiving apparatus; wherein the transmission device transmits a packet retransmission stop request to the mobile node apparatus to stop retransmitting a packet when it is recognized in the transmission device that a packet retransmitting process by the mobile node apparatus is not necessary;

the mobile node apparatus stops retransmitting a packet when receiving the packet retransmission stopping request; and a loss of a packet caused by the handover is replenished by retrieving a packet transmitted in the past from the storage device and retransmitting the packet transmitted in the past, and the replenishment information defines how far in the past the packet is to be retransmitted.

19. A transmitted packet replenishment system in a mobile IP network, comprising:

a monitor device monitoring intensity of a radio wave in a mobile node;

a storage device storing a transmitted packet when intensity of a radio wave is smaller than a predetermined threshold;

a management device managing replenishment information indicating how far in the past the packet is to be retransmitted to;

a transmission device transmitting a packet stored in the storage device according to the replenishment information when the mobile node detects a recovery of intensity of a radio wave; and a discard device discarding a packet received as a duplicate packet in a receiving apparatus; wherein the transmission device transmits a packet retransmission stop request to the mobile node to stop retransmitting a packet when it is recognized in the transmission device that a packet retransmitting process by the mobile node is not necessary;

the mobile node stops retransmitting a packet when receiving the packet retransmission stopping request; and a loss of a packet transmitted during the period of a degrading of a radio wave is replenished, by retrieving a packet transmitted in the past, and transmitting the packet transmitted in the past, and the replenishment information defines how far in the past the packet is to be retransmitted.

20. A transmitted packet replenishing method for use in a wireless network for transferring a packet, comprising:

storing a packet transmitted by a mobile node in a storage device in the mobile node;

managing replenishment information indicating how far in the past the packet is to be retransmitted to in the mobile node;

transmitting a packet stored in the storage device according to the replenishment information when the mobile node detects occurrence of handover of the mobile node;

transmitting a packet retransmission stopping request to the mobile node to stop retransmitting a packet when it is recognized in a transmitting apparatus that a packet retransmitting process by the mobile node is not necessary; and stopping to retransmit a packet when receiving the packet retransmission stopping request; wherein a loss of a packet caused by the handover is replenished by retrieving a packet transmitted in the past from the storage device and retransmitting the packet transmitted in the past, and the replenishment information defines how far in the past the packet is to be retransmitted.

21. A transmitted packet replenishing method for use in a wireless network for transferring a packet, comprising:

monitoring intensity of a radio wave by a mobile node;

storing a packet transmitted by the mobile node in a storage device in the mobile node when it is detected that intensity of a radio wave is smaller than a predetermined threshold;

managing replenishment information indicating how far in the past the packet is to be retransmitted to in the mobile node; and transmitting a packet stored in the storage device according to the replenishment information when the mobile node detects a recovery of intensity of a radio wave;

transmitting a packet retransmission stopping request to the mobile node to stop retransmitting a packet when it is recognized in a transmitting apparatus that a packet retransmitting process by the mobile node is not necessary; and stopping to retransmit a packet when receiving the packet retransmission stopping request; wherein a loss of a packet transmitted during the period of a degrading of a radio wave is replenished, by retrieving a packet transmitted in the past, and transmitting the packet transmitted in the past, and the replenishment information defines how far in the past the packet is to be retransmitted.

* * * * *